US010046313B2

United States Patent
Suib et al.

(10) Patent No.: US 10,046,313 B2
(45) Date of Patent: *Aug. 14, 2018

(54) MESOPOROUS MATERIALS AND PROCESSES FOR PREPARATION THEREOF

(71) Applicant: UNIVERSITY OF CONNECTICUT, Farmington, CT (US)

(72) Inventors: Steven L. Suib, Storrs, CT (US); Altug Suleyman Poyraz, Willington, CT (US); Lei Jin, Unionville, CT (US); Chung-hao Kuo, Willington, CT (US)

(73) Assignee: University of Connecticut, Farmington, CT (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/891,228

(22) PCT Filed: May 8, 2014

(86) PCT No.: PCT/US2014/037292
§ 371 (c)(1),
(2) Date: Nov. 13, 2015

(87) PCT Pub. No.: WO2014/186210
PCT Pub. Date: Nov. 20, 2014

(65) Prior Publication Data
US 2016/0151768 A1    Jun. 2, 2016

Related U.S. Application Data

(60) Provisional application No. 61/822,685, filed on May 13, 2013, provisional application No. 61/822,682, filed on May 13, 2013.

(51) Int. Cl.
*B01J 27/14* (2006.01)
*C01G 11/00* (2006.01)
(Continued)

(52) U.S. Cl.
CPC .............. *B01J 27/14* (2013.01); *B01J 21/066* (2013.01); *B01J 21/18* (2013.01); *B01J 23/10* (2013.01);
(Continued)

(58) Field of Classification Search
None
See application file for complete search history.

(56) References Cited

U.S. PATENT DOCUMENTS

| 5,108,725 A | 4/1992 | Beck et al. | |
| 5,786,294 A * | 7/1998 | Sachtler | B01J 37/033 502/217 |

(Continued)

FOREIGN PATENT DOCUMENTS

| WO | 2008068332 A1 | 6/2008 |
| WO | 2012168957 A | 12/2012 |

OTHER PUBLICATIONS

International Search Report dated Apr. 6, 2015 from corresponding PCT/US2014/037292, pp. 6.
(Continued)

*Primary Examiner* — Melvin C Mayes
*Assistant Examiner* — Michael Forrest
(74) *Attorney, Agent, or Firm* — Bryan D. Zerhusen; Locke Lord LLP

(57) ABSTRACT

A process for preparing a mesoporous material, e.g., transition metal oxide, sulfide, selenide or telluride, Lanthanide metal oxide, sulfide, selenide or telluride, a post-transition metal oxide, sulfide, selenide or telluride, and metalloid oxide, sulfide, selenide or telluride. The process comprises providing a micellar solution comprising a metal precursor, an interface modifier, a hydrotropic or lyotropic ion precursor, and a surfactant; and heating the micellar solution at a temperature and for a period of time sufficient to form the
(Continued)

mesoporous material. A mesoporous material prepared by the above process. A method of controlling nano-sized wall crystallinity and mesoporosity in mesoporous materials. The method comprises providing a micellar solution comprising a metal precursor, an interface modifier, a hydrotropic or lyotropic ion precursor, and a surfactant; and heating the micellar solution at a temperature and for a period of time sufficient to control nano-sized wall crystallinity and mesoporosity in the mesoporous materials. Mesoporous materials and a method of tuning structural properties of mesoporous materials.

31 Claims, 70 Drawing Sheets

(51) Int. Cl.

| | |
|---|---|
| B01J 35/10 | (2006.01) |
| B01J 37/04 | (2006.01) |
| B01J 37/08 | (2006.01) |
| C01B 33/12 | (2006.01) |
| C01F 17/00 | (2006.01) |
| C01G 37/033 | (2006.01) |
| C01G 45/02 | (2006.01) |
| B01J 23/30 | (2006.01) |
| B01J 27/053 | (2006.01) |
| H01B 1/02 | (2006.01) |
| B01J 35/00 | (2006.01) |
| B01J 35/02 | (2006.01) |
| C01B 19/00 | (2006.01) |
| B01J 37/00 | (2006.01) |
| B01J 29/04 | (2006.01) |
| B01J 29/03 | (2006.01) |
| B01J 27/057 | (2006.01) |
| B01J 21/18 | (2006.01) |
| B01J 21/06 | (2006.01) |
| B01J 37/10 | (2006.01) |
| C01G 33/00 | (2006.01) |
| C01G 25/02 | (2006.01) |
| C01G 35/00 | (2006.01) |
| C01G 19/02 | (2006.01) |
| C01G 11/02 | (2006.01) |
| C01G 9/08 | (2006.01) |
| C01G 1/12 | (2006.01) |
| C01G 1/02 | (2006.01) |
| C01G 41/00 | (2006.01) |
| C01G 37/02 | (2006.01) |
| B82Y 30/00 | (2011.01) |
| C01B 31/00 | (2006.01) |
| C01G 27/02 | (2006.01) |
| B01J 23/10 | (2006.01) |
| B01J 23/14 | (2006.01) |
| B01J 23/20 | (2006.01) |
| B01J 23/24 | (2006.01) |
| B01J 23/34 | (2006.01) |
| B01J 27/04 | (2006.01) |
| B01J 29/40 | (2006.01) |

(52) U.S. Cl.
CPC ............... *B01J 23/14* (2013.01); *B01J 23/20* (2013.01); *B01J 23/24* (2013.01); *B01J 23/30* (2013.01); *B01J 23/34* (2013.01); *B01J 27/04* (2013.01); *B01J 27/053* (2013.01); *B01J 27/057* (2013.01); *B01J 29/0341* (2013.01); *B01J 29/045* (2013.01); *B01J 35/0013* (2013.01); *B01J 35/023* (2013.01); *B01J 35/1014* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1057* (2013.01); *B01J 35/1061* (2013.01); *B01J 37/0018* (2013.01); *B01J 37/04* (2013.01); *B01J 37/08* (2013.01); *B01J 37/084* (2013.01); *B01J 37/10* (2013.01); *B82Y 30/00* (2013.01); *C01B 19/002* (2013.01); *C01B 19/007* (2013.01); *C01B 31/00* (2013.01); *C01B 33/12* (2013.01); *C01F 17/0043* (2013.01); *C01G 1/02* (2013.01); *C01G 1/12* (2013.01); *C01G 9/08* (2013.01); *C01G 11/00* (2013.01); *C01G 11/006* (2013.01); *C01G 11/02* (2013.01); *C01G 19/02* (2013.01); *C01G 25/02* (2013.01); *C01G 27/02* (2013.01); *C01G 33/00* (2013.01); *C01G 35/00* (2013.01); *C01G 37/02* (2013.01); *C01G 37/033* (2013.01); *C01G 41/00* (2013.01); *C01G 45/02* (2013.01); *H01B 1/02* (2013.01); *B01J 29/40* (2013.01); *B01J 2229/37* (2013.01); *C01P 2002/72* (2013.01); *C01P 2002/74* (2013.01); *C01P 2002/85* (2013.01); *C01P 2004/03* (2013.01); *C01P 2004/62* (2013.01); *C01P 2004/64* (2013.01); *C01P 2006/12* (2013.01); *C01P 2006/14* (2013.01); *C01P 2006/16* (2013.01); *C01P 2006/17* (2013.01); *C01P 2006/37* (2013.01); *C01P 2006/40* (2013.01)

(56) References Cited

U.S. PATENT DOCUMENTS

| | | | |
|---|---|---|---|
| 5,958,367 A * | 9/1999 | Ying | ............... C01B 13/32 423/701 |
| 9,452,933 B2 * | 9/2016 | Suib | ............... C01G 1/02 |
| 2011/0045350 A1 | 2/2011 | Amos et al. | |
| 2012/0034169 A1 | 2/2012 | Schoenfisch et al. | |

OTHER PUBLICATIONS

International Written Opinion dated Apr. 6, 2015 from corresponding PCT/US2014/037292, pp. 10.
Mahoney et al., Exploration of the role of anions in the synthesis of Cr. containing mesoporous materials at room temperature, Microporous and Mesoporous Materials 170 (2013) 211?225, Available online Dec. 8, 2012.

* cited by examiner

| Metal | Metal Amount (mol) | Butanol (g-mol) | HNO₃ (g-mol) | P123 (g-mol) | Reaction Temperature T°C | Reaction time (h) | Heating Cycles* | Observations |
|---|---|---|---|---|---|---|---|---|
| Sn t-butoxide (MW: 411 g/mol) | 0.012 mol | 15 g – 0.201 mol | 1 g – 0.016 mol | 1.5 g – 2.6*10⁻⁴ mol | RT (1h) and then 120° | 4 h | Calcined at 500°C for 1 h (1°/min) | Made the gel first in a glove bag. Diluted acid in 5 g butanol prior to adding on clear gel. The gel turned opaque immediately. Stirred at RT for 1 h. Gel got thicker. Aged in oven for 3-4 h. Synersis (gel sweats). Removed and calcined at 500°C. Longer aging in oven caused partial burn of material. Poor quality. |
| Carbon | | | | | | | 900°C for 2 h under Ar | Made the Silica Gel and converted surfactant to carbon by firing in an inert atmosphere. Etched the Si out in warm 0.5 M NaOH solution. |
| Zirconia (Zr-Butoxide in butanol 8bw%) | 0.02 mol | | 2 g – 0.032 mol | 2 g – 3.4*10⁻⁴ mol | 120° | 4-5 h | 500°C or 600°C (1h) (1°C/min heating rate) | Similar to Si and Ti. After aging transparent greenish film directly calcined. Optionally film can be first washed by ethanol to remove surfactant which will shorten the calcination time. |
| Hafnium HfCl₄ | 0.01 mol | 15 g – 0.201 mol | 2 g – 0.032 mol | 2 g – 3.4*10⁻⁴ mol | 120° | 4-5 h | Calcined at 500°C for 1 h (1°/min) | After aging a thick gel obtained. Metal amount was half of regular. |
| Niobium NbCl₄ | 0.01 mol | 15 g – 0.201 mol | 2 g – 0.032 mol | 2 g – 3.4*10⁻⁴ mol | 120° | 4-5 h | Calcined at 500°C for 1 h (1°/min) | After aging a thick gel obtained. Metal amount was half of regular. |

FIG. 1

| | | | | | | |
|---|---|---|---|---|---|---|
| Chromium Cr(NO₃)₃·9H₂O | 0.015 mol | 70 g – 0.945 mol | 2 g – 0.032 mol | 2 g – 3.4*10⁻³ mol | 60-70° (4-5 d) + 120° | 2h | Calcined at 250°C for 4 h or 350°C for 3 h or 450°C for 2 h | After several hours the solution turned green. After 1 day a green, transparent film was formed. During final 2 d gel got rigid and formed a transparent film. The film washed with warm ethanol to remove surfactant and dried in vacuum oven prior to calcination. |
| Neodymium Nd(NO₃)₃·6H₂O | 0.01 mol | 15g – 0.201 mol | 2 g – 0.032 mol | 2 g – 3.4*10⁻³ mol | 60-70° (3-5 d) + 120° | 1-2 h | Calcined at 500°C for 1 h (1°/min) | Purple like thick flakes after aging. After calcination the flakes turned light blue as a fine powder. |
| Samarium Sm(NO₃)₃·6H₂O | 0.01 mol | 15g – 0.201 mol | 2 g – 0.032 mol | 2 g – 3.4*10⁻³ mol | 60-70° (3-5 d) + 120° | 1-2 h | Calcined at 500°C for 1 h (1°/min) | Yellowish thick flakes after aging. After calcination the flakes turned light blue as a fine powder. |
| Gadolinium Gd(NO₃)₃·6H₂O | 0.01 mol | 15g – 0.201 mol | 2 g – 0.032 mol | 2 g – 3.4*10⁻³ mol | 60-70° (3-5 d) + 120° | 1-2 h | Calcined at 500°C for 1 h (1°/min) | Yellowish thick flakes after aging. After calcination the flakes turned light blue as a fine powder. |
| Manganese Mn(NO₃)₂·4H₂O | 0.01 mol | 7 g – 0.094 mol | 1 g – 0.016 mol | 1 g – 1.7*10⁻² mol | 120° for 1 h at 1 bar (aging) | 120° for 6 h @ 1-20 bar | No further heating was done | A yellow gel was formed after 1 h aging in a conventional oven. Then gel was transferred in an autoclave and pressurized up to 20 bar under flowing UHP air. The obtained brown powder washed with ethanol and dried in vacuum oven. For UCT 42 samples, UCT 18 gel was used with the same procedure. |

FIG. 1 (Continued)

| | | | | | |
|---|---|---|---|---|---|
| ZSM-5 | 0.0099 mol (TEOS) | 7 g – 0.094 mol | 7 g (Butanol)+ 1 g – 0.016 mol (HNO$_3$) | 1 g – 1.7*10$^{-3}$ mol | 120° (4-6 h) in an open container + 200° (12 h) @ 20 bar (UHP air) | 550°C (1h) (1°C/min heating rate) | Yellow transparent film formed after heating in an open container. The film was transferred to an autoclave. 5 mL water + 5 mL 0.5 M NH$_4$OH was added and pressured at 200°C and at 20 bar overnight. The resulting white powder was washed with ethanol, dried and calcined at 550°C for 1 h. |
| Sulfated Zirconia (post-treatment) | 0.5 g of mesoporous ZrO$_2$ (UCT-17) calcined at 450°C for 4 h placed in a crucible with a stirring bar. 30 ml 1 M H$_2$SO$_4$ was added and stirred at RT till the entire solvent is evaporated. The final powder is calcined at 600°C with 1°C/min heating rate and kept for 1 h at same temperature. | | | | | | Removing impregnation solvent temperatures at higher than room temperature resulted in formation of zirconia sulfate salt. |
| Zirconia (washing) (Zr-Butoxide in butanol 80w%) | 0.02 mol | 15 g – 0.201 mol | 2 g – 0.032 mol | 2 g – 3.4*10$^{-4}$ mol | 120° | 150°C (12h) – 250°C (4h) – 450°C (1h) | 4-5 h | The obtained greenish-yellow transparent film was washed with 90 methanol+ 10 mL water for 2-3 h at RT to remove the surfactant and condensed the inorganic framework. The film was shrunk in size and became more rigid after washing. The rigid chunk was ground in a mortar and heating cycles were applied. The powder became very fluffy and light. |
| Sulfated Zirconia (in-situ) (Zr-Butoxide in butanol 80w%) | 0.02 mol | 15 g – 0.201 mol | 2 g – 0.032 mol + H$_2$SO$_4$ (10$^{-3}$ – 0.01 mol) | 2 g – 3.4*10$^{-4}$ mol | 120° | Calcined at 600°C for 1 h (1°/min) | 4-5 h | Similar to Si and Ti. After aging transparent greenish film directly calcined. Optionally film can be first washed by ethanol to remove surfactant, which will shorten the calcination time. |

FIG. 1 (Continued)

| | | | | | | |
|---|---|---|---|---|---|---|
| Sulfated Titania (in-situ) Ti(OCH(CH₃)₂)₄ | 0.018 mol | 14 g – 0.18 mol | 14g (Butanol)+ 2 g – 0.032 mol (HNO₃)+ H₂SO₄(10⁻³ – 0.01 mol) | 2 g – 3.4*10⁻⁴ mol | 120° | 3-5h | Calcined at 600°C for 1 h (1°/min) | Orange transparent film. Directly calcined @600°C for 1 h. |
| Phosphated Zirconia (in-situ) (Zr-Butoxide in butanol 80w%) | 0.02 mol | 15g – 0.201 mol | 2 g – 0.032 mol + H₃PO₄ (10⁻³ – 0.01 mol) | 2 g – 3.4*10⁻⁴ mol | 120° | 4-5 h | Calcined at 600°C for 1 h (1°/min) | Similar to Si and Ti. After aging transparent greenish film directly calcined. Optionally film can be first washed by ethanol to remove surfactant, which will shorten the calcination time. |
| Tungstated Zirconia (in-situ) (Zr-Butoxide in butanol 80w%) (NH₄)₆H₂W₁₂O₄₀·xH₂O | 0.02 mol of Zr + C*10⁻⁴ – 0.006 mol) W in 2 ml EtOH + 2 ml Water mixture | 15g – 0.201 mol | 2 g – 0.032 mol | 2 g – 3.4*10⁻⁴ mol | 120° | 3-4 h | Calcined at 600°C for 1 h (1°/min) | After making homogeneous Zr solution as in UCT 17, ammonium metatungstate solution (in ethanol-water mixture) was added at RT and under vigorous stirring. Solution immediately turned to opaque white color and instantly froze. The rigid white gel was placed in an oven running at 120°C for 4 h. The gel sweats (syneresis) and shrinks. The final white rigid chunks were calcined at 600°C for 1 h. |
| W-Zn oxide (9:1) (NH₄)₆H₂W₁₂O₄₀·xH₂O SnCl₄ | 0.002 mol of Sn + 0.018 mol W in 2 ml EtOH + 2 ml Water mixture | 15g – 0.201 mol | 2 g – 0.032 mol | 2 g – 3.4*10⁻⁴ mol | 70° | 24 h | Calcined at 600°C for 1 h (1°/min) | Similar to Si, Zr and Ti. After aging the transparent greenish film was directly calcined. Optionally the film can be first washed with ethanol to remove surfactant which will shorten the calcination time. |

FIG. 1 (Completed)

| Metal Sulfides | Nomenclature | Band Gap (eV) | BJH Des. Pore Volume (cc/g) | Surface Area (m²/g) | DFT Pore Diameter (nm) | Low-Angle XRD peak positions (nm) | Crystal Structure |
|---|---|---|---|---|---|---|---|
| ZnS (65°C) | UCT-28 | 3.52 | 0.064 | 85.7 | 1.4 | 4.0 | ZnS |
| ZnS (75°C) | UCT-28 | 3.17 | 0.201 | 108.5 | 3.8 | 6.4 | ZnS |
| CdS (65°C) | UCT-29 | 2.37 | 0.097 | 27.1 | 3.8 | 6.2 | CdS (Greenockite) |
| CdS (75°C) | UCT-30 | 2.42 | 0.215 | 36.6 | 3.8 | 6.2 | CdS (Hawleyite) |

| Metal Sulfides | Nomenclature | Band Gap (eV) | EDAX (structure) | Low-Angle XRD peak positions (nm) | Sample Name |
|---|---|---|---|---|---|
| $Zn_{0.33}Cd_{0.25}S$ (75°C) | UCT-31 | 2.39 | $Zn_{0.03}Cd_{0.96}S$ | 6.0 | mms-6 |
| $Zn_{0.75}Cd_{0.25}S$ (75°C) | UCT-31 | 2.51 | $Zn_{0.19}Cd_{0.80}S$ | 5.6 | mms-7 |
| $Zn_{0.75}Cd_{0.25}S$ (75°C) | UCT-31 | 2.56 | $Zn_{0.17}Cd_{0.83}S$ | 5.6 | mms-8 |
| $Zn_{0.75}Cd_{0.25}S$ (75°C) | UCT-31 | 2.61 | $Zn_{0.05}Cd_{0.95}S$ | 5.6 | mms-9 |
| $Zn_{0.85}Cd_{0.25}S$ (75°C) | UCT-31 | 2.63 | $Zn_{0.65}Cd_{0.35}S$ | 5.6 | mms-10 |
| $Zn_{0.95}Cd_{0.05}S$ (75°C) | UCT-31 | 2.68 | $Zn_{0.75}Cd_{0.14}S$ | 5.6 | mms-11 |

FIG. 2

| Metal | Nomenclature | Heat Treatment T (°C) | BJH Des. Pore Diameter (nm) | Surface Area (m²/g) | Low-Angle XRD peak position (nm) | Crystal Structure |
|---|---|---|---|---|---|---|
| Tin | UCT-32 | 4 h @120°C + 3h @ 450°C | 8.5 | 93.7 | 9.9 | SnO |
| Tin | UCT-33 | 12 h @120°C + 1h @500°C | --- | --- | 4.6 | SnO |
| Carbon | UCT-34 | 900°C (Ar) for 2 h | 3.7 | 290.0 | 10.3 | NA |
| Hafnium | UCT-35 | 4 h @120°C + 1h @ 500°C | 3.6 | 79.8 | 6.9 | HfO₂ |
| Niobium | UCT-36 | 4 h @120°C + 1h @ 500°C | 6.1 | 116.7 | 8.3 | Amorphous |
| Chromium | UCT-37 | Fresh | NA | NA | 10.5 | Amorphous |
|  |  | 250° C for 4 h | 3.5 | 324.7 | 9.6 | Amorphous |
|  | UCT-38 | 350° C for 3 h | 3.4 | 265.8 | 6.9 | Cr₂O₃ |
|  |  | 450° C for 2 h | --- | --- | 11.3 | Cr₂O₃ |
| Neodymium | UCT-39 | 60-70° (3-5d) + 120° (1-2 h) + 500° C for 1 h | 12.2 | 61.3 | 12.6 | Nd₂O₃ |
| Samarium | UCT-40 | 60-70° (3-5d) + 120° (1-2 h) + 500° C for 1 h | --- | 41.7 | 10.6 | Sm₂O₃ |
| Gadolinium | UCT-41 | 60-70° (3-5d) + 120° (1-2 h) + 500° C for 1 h | 4.0 | 38.2 | 10.1 | Gd₂O₃ |
| Manganese (high pressure) | UCT-42 | 120° (4 h) @ 5 bar | --- | --- | 2.8 | Amorphous |
|  |  | 120° (4 h) @ 10 bar | --- | --- | 2.8 | Amorphous |

FIG. 2 (Continued)

| | | | | | |
|---|---|---|---|---|---|
| Manganese + K (high pressure) (Mn:K = 10:1) | UCT-43 | 120° (1 h) @ 1 atm + 120° (6 h) @ 10 bar; 120° (1 h) @ 1 atm + 120° (6 h) @ 20 bar | --- | Not-mesostructured; 10.5 | $K_{2-x}Mn_8O_{16}$ + $K_3MnO_4$ + $MnO_2$; $MnO_2$ + $Mn_2O_3$ + $Mn_3O_4$ |
| Meso-ZSM-5 (Si:Al 100:1) | UCT-44 | 120° (5 h) @ 1 atm + 200° (12 h) @ 20 bar (under air) | 2.3, 4.0, 23.9 | 336.2 | 4.4 | ZSM-5 |
| Sulphated Zirconia (post-treatment) | UCT-45 | 120° (4 h) + 600° (1 h) (after sulphuric acid impregnation) | 3.4 nm | 138.0 | 7.5 | $ZrO_2$ Tazheranite |
| Zirconia (washing) | UCT-46 | 150° (12 h); 150° (12 h) + 250° (4 h) | 2.1; 3.5 | 93.0; 272.0 | 7.4, 1.7; 8.0 | Amorphous; Amorphous |
| | UCT-47 | 150° (12 h) + 250° (4 h) + 450° (1 h) | 3.5 | 147.0 | 6.7 | $ZrO_2$ Tazheranite |

FIG. 2 (Continued)

| Metal | Nomenclature | % Loading (X/M(mol)* 100) | Heat Treatment T (°C) | BJH Des. Pore Diameter (nm) | Surface Area (m²/g) | Low-Angle XRD peak position (nm) | Crystal Structure |
|---|---|---|---|---|---|---|---|
| Sulphated Zirconia (in-situ) | UCT-48 | 1 | 600° for 1 h | | | 9.6 | ZrO₂ Tazheranite |
| | | 3 | 600° for 1 h | | | 6.9 | ZrO₂ Tazheranite |
| | | 5 | 600° for 1 h | | | 6.9 | ZrO₂ Tazheranite |
| | | 7 | 600° for 1 h | | | 6.7 | ZrO₂ Tazheranite |
| | | 10 | 600° for 1 h | | | 6.0 | ZrO₂ Tazheranite |
| Sulphated Ti (in-situ) | UCT-49 | 5 | 450° C for 4 h | 3.45 | 186.8 | 11.0 | TiO₂ (Anatase) |
| Phosphated Zirconia (in-situ) | UCT-50 | 1 | 600° for 1 h | | | 11.6 | ZrO₂ Tazheranite |
| | | 3 | 600° for 1 h | | | 9.6 | ZrO₂ Tazheranite |
| | | 5 | 600° for 1 h | | | 7.2 | ZrO₂ Tazheranite |
| | | 7 | 600° for 1 h | | | 7.0 | ZrO₂ Tazheranite |

FIG. 2 (Continued)

| | | | | | | ZrO₂ Tazheranite |
|---|---|---|---|---|---|---|
| Tungstated Zirconia (in-situ) | UCT-51 | 10 | 600° for 1 h | | | ZrO₂ (t and m; tetragonal and monoclinic, respectively) |
| | | 1 | 600° for 1 h | | | ZrO₂ (t and m) |
| | | 3 | 600° for 1 h | 3.39 | 207.4 | ZrO₂ (t and m) |
| | | 5 | 600° for 1 h | 3.45 | 109.8 | ZrO₂ (t and m) |
| | | 10 | 600° for 1 h | 3.77 | 79.9 | ZrO₂ (t and m) |
| | | 20 | 600° for 1 h | 3.45 | 73.0 | ZrO₂ (t and m) |
| | | 30 | 600° for 1 h | 3.42 | 60.2 | ZrO₂ (t and m) |
| W-Sn (9:1) Tin loaded Zirconia | UCT-52 UCT-53 | 9:1 | 600° for 1 h | | 9.2 | ZrO₂ (t and m) |
| | | 1 | 600° for 1 h | | 14.7 | ZrO₂ (t and m) |
| | | 3 | 600° for 1 h | | 14.7 | ZrO₂ (t and m) |
| | | 5 | 600° for 1 h | | 14.7 | ZrO₂ (t and m) |
| | | 10 | 600° for 1 h | | 13.0 | ZrO₂ (t and m) |
| | | 20 | 600° for 1 h | | 13.0 | ZrO₂ (t and m) |
| | | 30 | 600° for 1 h | | 11.5 | ZrO₂ (t and m) |

FIG. 2 (Completed)

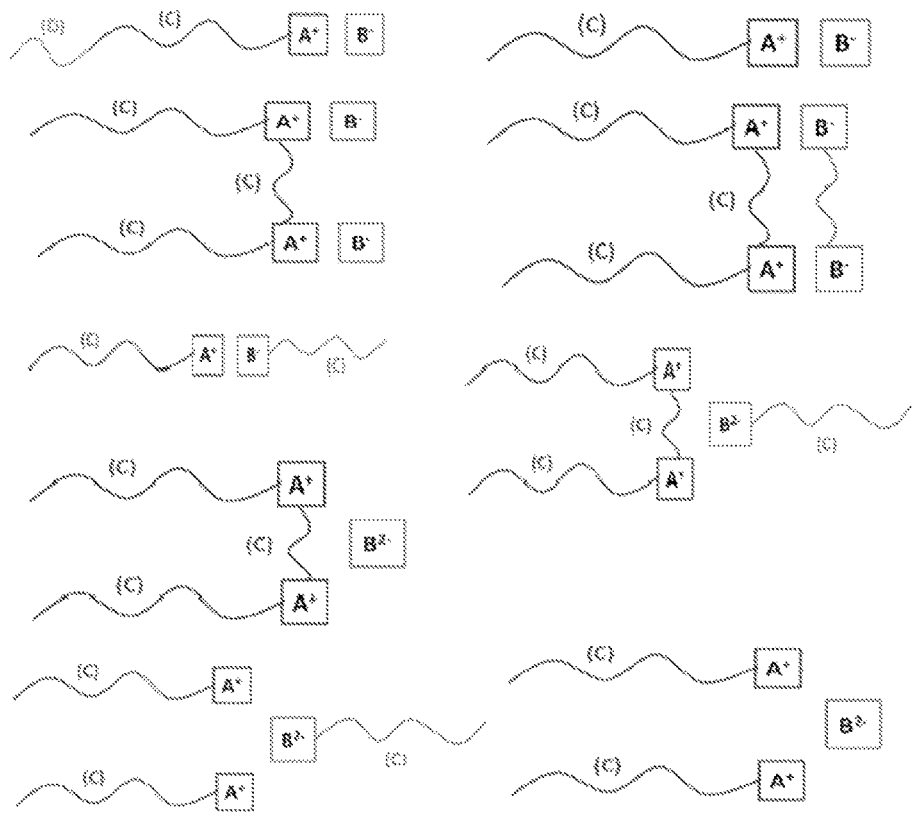

FIG. 60

| A⁺ | Metallo head group (Co, Cu), imidazolium, pyridinium, 3R-ammonium, guanidinium |
| --- | --- |
| B⁻ | F⁻, Cl⁻, Br⁻, I⁻, SO₄²⁻, SCN⁻, HPO₄²⁻, acetate, NO₃⁻, ClO₄⁻, tosylate, carboxyl |
| C | [CH₂]ₙ, [CF₂]ₙ, [CHₓFᵧ]ₙ (partially florinated), [CH₂]ₘ-[CF₂]ₙ, poly phenylene ethynylene, 3-(OR)benzene, [CRH]ₙ, chitosan, maltoside, polystyrene, bi-block (any combination of C), -O-benzene, fatty acids, PPO, PEO |
| D | Si(OR)₃, [CH₂]ₙ, [CF₂]ₙ, [CHₓFᵧ]ₙ (partially florinated), poly phenylene ethynylene, 3-(OR)benzene, [CRH]ₙ, chitosan, maltoside, polystyrene, -O-benzene, fatty acids, PPO, PEO |

| | | |
|---|---|---|
| A | Relatively hydrophobic to B | $[CH_2]_n$, $[CF_2]_n$, $[CH_xF_y]_n$ (partially fluorinated), $[CH_2]_m-[CF_2]_n$, poly phenylene ethynylene, 3-(OR)benzene chain, $[CRH]_n$, chitosan, maltoside, polystyrene, bi-block (any combination of C), -O-benzene, fatty acids, PPO, PEO, poly-methacrylic acid, poly-acrylic acid |
| B | Relatively hydophilic to A | PPO, PEO, $[CRH]_n$, gluepyronaside, poly-methacrylic acid, poly-acrylic acid |
| C | Relatively hydophilic or hydrophobic to A or B | $[CH_2]_n$, $[CF_2]_n$, $[CH_xF_y]_n$ (partially fluorinated), $[CH_2]_m-[CF_2]_n$, poly phenylene ethynylene, 3-(OR)benzene, $[CRH]_n$, chitosan, maltoside, polystyrene, bi-block (any combination of C), -O-benzene, fatty acids, PPO, PEO, poly-methacrylic acid, poly-acrylic acid |
| D | Π-Π interaction | aromatic molecules forming Π-Π interaction, benzene, substituted benzene, furan pyrone, styrene, azo-benzene, naphthalene. Can be single molecule or can exist as block |
| E | Branching point | Any substituted or aromatic ring (e.g., benzene, hexane, pentane, etc.) |

FIG. 62 (Completed)

MESOPOROUS MATERIALS AND PROCESSES FOR PREPARATION THEREOF

RELATED APPLICATIONS

This application claims the benefit, and is the U.S. national phase application under § 371, of International Application No. PCT/US14/37292, filed on May 8, 2014, which claims the benefit of U.S. Patent Application Ser. No. 61/822,685, filed May 13, 2013, and U.S. Patent Application Ser. No. 61/822,682, filed May 13, 2013, all of which are incorporated herein by reference in their entirety.

BACKGROUND

1. Field of the Disclosure

This disclosure relates to mesoporous materials and processes for making mesoporous materials, in particular, the synthesis of thermally stable mesoporous materials with controllable nano-sized wall crystallinity and mesoporosity. This disclosure also relates to a method of tuning structural properties of mesoporous materials, and a method of controlling nano-sized wall crystallinity and mesoporosity in mesoporous materials.

2. Discussion of the Background Art

Porous materials consist of micropores (<2 nm), mesopores (2-50 nm), macropores (>50 nm) and sometimes combinations of these. Considerable interest in the control of pore sizes and pore size distributions of such materials has been a focus for quite some time. Nano-size materials can have markedly different properties than similar compositions that are bulk size (μm and above). Control of morphologies of porous materials such as hollow spheres, rods, helices, spirals, and many other shapes has been a major focus of researchers over at least the last 10 years.

Such control comes from specific synthetic methods such as use of templates, structure directors, surfactants, core shell, self assembly, epitaxial growth, size reduction, capping agents, sol gel, and other methods. Morphologies can be controlled by compositions including dopants. The conditions during syntheses such as use of heat, humidity, light, pH, point of zero charge, stirring, high pressure, and others are also important.

Mesoporous materials with varied pore sizes and pore size distributions can be obtained for some systems such as silicon and titanium based oxide materials. However, control of pore size distributions to make single size pores and to systematically control such pore sizes and uniformity is difficult. Control of the structure of the material is also an issue. Many systems have both micropores and mesopores and pore interconnectivity is of interest with these materials. Enhanced mass transport for catalytic reactions might be realized by fine-tuning the porosity of such systems. Incorporation of biomolecules larger than the micropore regime also might be done using well ordered crystalline mesoporous materials.

Most studies of mesoporous materials have focused on mesoporous transition metal oxide (MTMO) materials of groups I-IV including Y, Ti, Hf, Zr, V, Nb, Ta, Cr, Mo, and W. These have low angle X-ray diffraction peaks indicative of mesostructural ordering and Type IV $N_2$ sorption isotherms. These syntheses have focused on use of water or alcohol or water plus alcohol or various other organic solvents which yield micelle formation by selectively dissolving one part of surfactant. Acidity or basicity is precisely adjusted by adding acid or base or a compound that slowly decomposes to alter pH such as urea. Neutral surfactants (S) or a charged surfactant (S+ and S−) or any combination of these surfactants can be used to form strong S-I interaction. There are either strong Coulombic interactions ($S^+$; $I^-$; $S^-I^+$; $S^+X^-I^+$; $S^-X^+I^-$) or strong ligand metal interactions (I:S<2, very thin walls), and such systems have limited thermal stability and amorphous walls, where I=inorganic species, and X is a mediator. Such syntheses are open to air and various aging times and environmental conditions can influence the porosity of these materials.

Water content is a critical parameter with the synthesis of porous materials, e.g., porous transition metal oxides. Water competes with surfactants' ethoxy and other alkoxy groups for coordination to the metal or vice versa and also significantly affects hydrolysis and condensation rates. Since most syntheses are open to the air the water content is very difficult to control. On the other hand, water is essential for reaction. When the number of water molecules per metal atom (H) is >1 then phase separation and nonporous oxides result. When H is <1, ordered mesoporous materials are formed when the metal has empty $t_{2g}$ orbitals. These materials obtain water from the environment during synthesis. When H is <<1, strong surfactant/transition metal interactions occur with weak surfactant surfactant interactions and there is no reaction.

Thermodynamic interactions in such syntheses and factors influencing each term are given in Table 1 below. Table 1 sets forth thermodynamic parameters of surfactant (S) transition metal (M) mesopore syntheses.

TABLE 1

| $\Delta G_m = \Delta G_{org} + \Delta G_I + \Delta G_{inter} + \Delta G_{sol}$ [1] | | | |
|---|---|---|---|
| S-S Interaction determines mesostructure formed (Lamellar, Hexagonal, Cubic) | High Lewis acidity Unsaturated Coordination H (Hydrolysis Ratio H<<1), Condensation hindering molecules (carboxyl, amine, ethylene glycol) | Strong S-M interaction at interface (Coulombic, Covalent bonding, Hydrogen bonding) | Unknown and unpredictable |

In Equation 1 above, $\Delta G_m$ is the formation energy of the mesostructured material; $\Delta G_{org}$ is the surfactant-surfactant interaction; $\Delta G_I$ is the inorganic-inorganic interaction; $\Delta G_{inter}$ is the surfactant-metal interaction at interface; and $\Delta G_{sol}$ is the solvent interaction. It would be desirable to develop a process that minimizes the effects of $\Delta G_I$ and $\Delta G_{sol}$, in order to make well ordered mesoporous materials. The absence of totally empty d orbitals restricts the strong interaction between surfactant and metal (ligand to metal charge transfer) which is generally accepted as essential for the formation of ordered materials. Filled $t_{2g}$ orbitals such as in systems containing Mn, Fe, Co, and others are difficult to make with the above methods since charge transfer reactions do not occur.

The present disclosure provides many advantages over the prior art, which shall become apparent as described below.

SUMMARY OF THE DISCLOSURE

This disclosure relates in part to thermally stable mesoporous materials, e.g., metal oxides, sulfides, selenides, tellurides, and the like, and to controlling physicochemical properties of the mesoporous materials by the use of co-surfactants, organic and inorganic additives, mixed metal oxides, solvents and solvent mixtures, and acid mixtures, in the synthesis thereof. The mesoporous materials can be prepared by mixing one or more transition metal precursors with one or more of the co-surfactants, organic and inorganic additives, solvents and solvent mixtures, and acid mixtures. Physicochemical properties of the mesoporous materials such as unit cell size, pore size, pore type, pore volume, mesostructure type, and surface morphology, can be controlled by the use of co-surfactants, organic and inorganic additives, mixed metal oxides, solvents and solvent mixtures, and acid mixtures. These mesoporous materials preserve their unique properties such as crystalline wall structure, pore size, and unit cell expansion, upon heat treatment.

The inverted micelle controlled formation of the mesoporous materials of this disclosure makes the tuning of physicochemical properties of the materials possible by controlling micellization and inter-micellar interaction by using additives, i.e., co-surfactants, organic and inorganic additives, mixed metal oxides, solvents and solvent mixtures, and acid mixtures. This disclosure demonstrates fine tuning of these parameters by the use of co-surfactants, organic and inorganic additives, mixed metal oxides, solvents and solvent mixtures, and acid mixtures, in the synthesis of the mesoporous materials.

This disclosure also relates in part to a process for preparing a mesoporous material, said process comprising:

providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous material.

This disclosure further relates in part to a process for preparing a mesoporous material, said process comprising:

preparing an acidic mixture by mixing one or more metal precursors, one or more surfactants, one or more interface modifiers, one or more hydrotropic or lyotropic ion precursors, and optionally one or more organic and/or inorganic additives;

aging the acidic mixture at a temperature and for a period of time sufficient to form a powder, film or gel; and heating the powder, film or gel at a temperature and for a period of time sufficient to form the mesoporous material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure yet further relates in part to a process for preparing a mesoporous material, said process comprising:

providing an acid unmodified mesoporous material prepared by the micellization process described herein;

treating the acid unmodified mesoporous material with an acid to form an acid modified mesoporous material; and heating the acid modified mesoporous material at a temperature and for a period of time sufficient to form the mesoporous material.

This disclosure also relates in part to a process for preparing a mesoporous material, said process comprising:

providing an acid unmodified mesoporous material having a first mesoporosity and crystalline structure, wherein the acid unmodified mesoporous material is prepared by the micellization process described herein;

treating the acid unmodified mesoporous material with an acid to form an acid modified mesoporous material having a second mesoporosity and crystalline structure; and heating the acid modified mesoporous material at a temperature and for a period of time sufficient to form the mesoporous material having a third mesoporosity and crystalline structure;

wherein the second mesoporosity and crystalline structure is essentially the same as the first mesoporosity and crystalline structure, and the third mesoporosity and crystalline structure is essentially the same as the second mesoporosity and crystalline structure.

This disclosure further relates in part to a one step process for preparing a mesoporous material, said process comprising treating an acid unmodified mesoporous material with an acid to form said mesoporous material; wherein the treating is sufficient to preserve mesoporosity and crystalline structure of the mesoporous material; and wherein the acid unmodified mesoporous material is prepared by the micellization process described herein.

This disclosure yet further relates in part to a process for preparing mesoporous carbon, said process comprising:

providing a mesoporous metal oxide, sulfide, selenide or telluride material containing a surfactant; wherein the mesoporous metal oxide, sulfide, selenide or telluride material is prepared by the micellization process described herein;

heating the mesoporous metal oxide, sulfide, selenide or telluride material containing a surfactant at a temperature and for a period of time sufficient to form a powder; and treating the powder to remove metal oxide, sulfide, selenide or telluride and to form the mesoporous carbon.

This disclosure also relates in part to a process for preparing mesoporous carbon, said process comprising:

providing a mesoporous $SiO_2$ material containing a surfactant; wherein the mesoporous $SiO_2$ material is prepared by the micellization process described herein;

heating the mesoporous $SiO_2$ material containing a surfactant at a temperature and for a period of time sufficient to form a powder; and treating the powder to remove silica and to form the mesoporous carbon.

This disclosure further relates in part to a process for preparing a mesoporous material, said process comprising:

preparing an acidic mixture by mixing one or more metal precursors, one or more surfactants, one or more interface modifiers, one or more hydrotropic or lyotropic ion precursors, and optionally one or more organic and/or inorganic additives;

aging the acidic mixture at a temperature and for a period of time sufficient to form a gel;

mixing the gel with urea in a urea:gel weight ratio of from about 0.5:1 to about 1.5:1; and heating the mixture at a temperature and for a period of time sufficient to form the mesoporous material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure yet further relates in part to a process for preparing a mesoporous material, said process comprising:

providing a metal source material;

stabilizing the metal source material with a tetrahedrally coordinated transition metal or post transition metal to form a gel; and heating the gel at a temperature and for a period of time sufficient to form the mesoporous material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure also relates in part to a process for preparing mesoporous tungsten material, said process comprising:

providing a metatungstate source material;

stabilizing the metatungstate source material with a tetrahedrally coordinated transition metal or post transition metal to form a gel; and heating the gel at a temperature and for a period of time sufficient to form the mesoporous tungsten material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure further relates in part to a process for preparing a mesoporous rigid film, said process comprising:

providing a mesoporous film containing a surfactant; wherein the mesoporous film is produced from the mesoporous material by the micellization process described herein;

washing the mesoporous film containing a surfactant with an alcohol:water mixture; wherein the alcohol:water volume ratio is from about 1:1 to about 20:1; and heating the washed mesoporous film at a temperature and for a period of time sufficient to form the mesoporous rigid film.

This disclosure yet further relates in part to a process for preparing a mesoporous material, said process comprising:

preparing an acidic mixture by mixing one or more metal precursors, one or more surfactants, one or more interface modifiers, one or more hydrotropic or lyotropic ion precursors, and optionally one or more organic and/or inorganic additives;

aging the acidic mixture at a temperature and for a period of time sufficient to form a gel; and heating the gel at a pressure, temperature and for a period of time sufficient to form the mesoporous material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure also relates in part to a process for preparing a mesoporous material, said process comprising:

preparing a mixture by mixing one or more metal precursors, one or more surfactants, one or more interface modifiers, one or more hydrotropic or lyotropic ion precursors, and optionally one or more organic and/or inorganic additives;

adding an acid to the mixture to form a gel;

aging the gel at a temperature and for a period of time sufficient to promote condensation of inorganic framework and removal of solvent; and heating the gel at a temperature and for a period of time sufficient to form the mesoporous material;

wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

This disclosure further relates in part to a mesoporous material produced by a process comprising:

providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous material.

This disclosure yet further relates in part to a method of controlling nano-sized wall crystallinity and mesoporosity in mesoporous materials, said method comprising:

providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to control nano-sized wall crystallinity and mesoporosity in the mesoporous materials.

This disclosure also relates in part to a method of tuning structural properties of mesoporous materials, said method comprising:

selecting one or more metal precursors, one or more surfactants, one or more interface modifiers, one or more hydrotropic or lyotropic ion precursors, and optionally one or more organic and/or inorganic additives;

providing a micellar solution comprising said one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous materials.

This disclosure further relates in part to a process for preparing methyl levulinate or methyl lactate, said process comprising:

providing a carbohydrate or biomass source material;

providing a solid acid catalyst comprising an acid modified mesoporous material; and reacting the carbohydrate or biomass source material in the presence of the solid acid catalyst at a temperature and pressure and for a period of time sufficient to form the methyl levulinate or methyl lactate;

wherein the mesoporous material is prepared by the micellization process described herein.

Several advantages result from the processes of this disclosure. This disclosure provides a unique approach and method for the synthesis of thermally stable mesoporous metal (e.g., Cr, Zr, Nb, Hf, Ta, Nd, Sm, Ce, Gd and Sn) oxides, sulfides, selenides, tellurides, and the like, with controllable mesopore size (e.g., 2 nm-13 nm) and nano-sized crystalline walls for various sorptive, conductive, structural, catalytic, magnetic and optical applications. This disclosure not only makes the synthesis of mesoporous (metal, transition metal, Lanthanide metal, post-transition metal, metalloid) oxides, sulfides, selenides, tellurides, and the like, possible, but also allows one to precisely tune the structural properties of synthesized porous materials with simple heat treatment cycles. Moreover, the method of this disclosure is applicable to all transition metals, Lanthanide metals, post-transition metals and metalloids with modifications as appropriate in the synthesis procedure.

The high surface area mesoporous materials of this disclosure can have applications in catalysis, drug delivery systems, electrochemistry, HPLC, optical materials, semiconductors, and the like. The performance of a mesoporous material in various applications does not only depend on the metal system or systems used but also physicochemical properties of these materials such as mesostructure, pore size and pore volume. These physicochemical properties of mesoporous materials are the main determinants in performance. In accordance with this disclosure, the physicochemical properties of the mesoporous materials such as unit cell size, pore size, pore type, pore volume, mesostructure type, and surface morphology, can be controlled by the use of co-surfactants, organic and inorganic additives, mixed metal oxides, solvents and solvent mixtures, and acid mixtures.

In comparison with conventional mesoporous silica such as MCM-41, it has been surprisingly found that the mesoporous materials of this disclosure have totally different porous structures than the typical 2D hexagonal and cubic Si and Ti oxide systems, and are more stable for calcination. Traditional Si and Ti oxide materials have long tube channels, whereas the mesoporous materials of this disclosure are formed by assembly of nanoparticles. For Ti materials, the mesoporous materials of this disclosure have crystalline walls in which crystallinity can be controlled by various calcination procedures by preserving porosity. In comparison with conventional mesoporous silica such as MCM-41, the mesoporous materials of this disclosure exhibit pore expansion by calcination, thermal stability, and ability to incorporate various metals by preserving porosity and mesostructure.

Further objects, features and advantages of the present disclosure will be understood by reference to the following drawings and detailed description.

BRIEF DESCRIPTION OF THE DRAWINGS

FIG. 1 is a table that sets forth process parameters and conditions for making the mesoporous materials of this disclosure, specifically the amounts of chemicals used, aging time and temperature, and heating time and duration, along with the visual observations.

FIG. 2 is a table that sets forth structural parameters of mesoporous materials of this disclosure (UCT-28-UCT-53).

FIG. 60 shows an illustrative list of cationic surfactant types which can be used in the synthesis of mesoporous materials of this disclosure, as either a co-surfactant or major surfactant.

DETAILED DESCRIPTION OF THE PREFERRED EMBODIMENT

Figure 3:
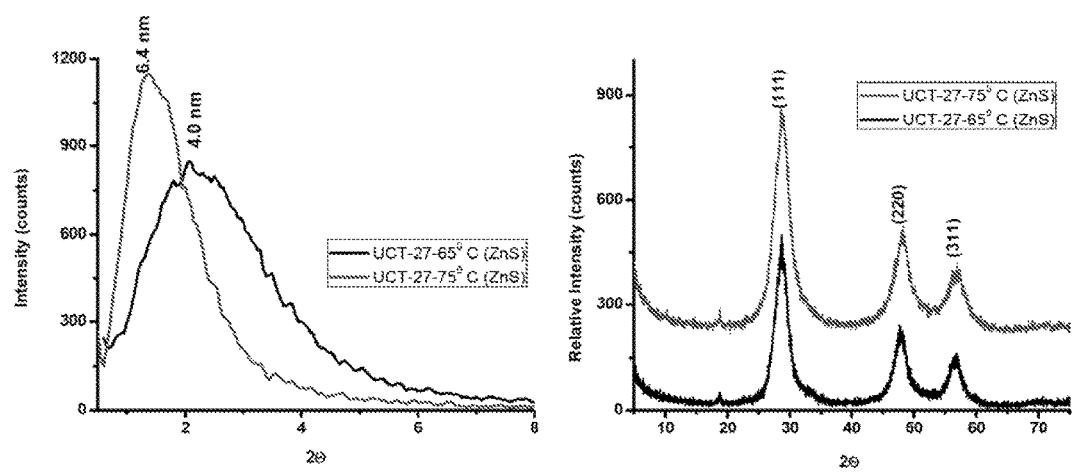
FIG. 3 shows low-angle and wide-angle powder X-ray diffraction (PXRD) diffraction patterns of synthesized mesoporous ZnS samples (UCT-28) at two different temperatures.

All numerical values within the detailed description and the claims herein are modified by "about" or "approximately" the indicated value, and take into account experimental error and variations that would be expected by a person having ordinary skill in the art.

The process of the present disclosure for making mesoporous materials, e.g., metal oxides, sulfides, selenides, tellurides, and the like, affords a high degree of control with respect to nano-sized wall crystallinity and mesoporosity. The mesoporous materials are useful in various applications including, but not limited to, catalytic, magnetic and optical applications. In particular, the metal oxides, sulfides, selenides, tellurides, and the like, are useful as catalysts, sensors, batteries and energy production, optical displays, environmental and sorbent applications.

In particular, this disclosure relates to new mesoporous materials including semiconductors (CdS, ZnS, $Cd_xZn_yS$ (x+y=1)), non-metals (C), post-transition metals (Sn), $1^{st}$ (Cr, Zr), $2^{nd}$ (Nb) and $3^{rd}$ (Hf) row transition metal oxides, Lanthanides (Nd, Sm, Gd), high pressure oxides (Mn), high pressure acids (ZSM-5), solid acids (tungstated zirconia (WZr), phosphated zirconia (PZr), sulphated zirconia (SZr) and sulfated titania (STi)). These new materials show both desired mesostructure and mesoporosity.

This disclosure offers a new type of porous metal oxide, sulfide, selenide, telluride, and the like, family. It not only makes use of wide range of metals, e.g., transition metals, Lanthanide metals, post-transition metals and metalloids, but also provides more control on the structural properties of synthesized mesoporous metal oxides, sulfides, selenides, tellurides, and the like.

The method of this disclosure eliminates contribution of critical thermodynamic parameters such as strength of interaction at interface, hydrolysis and condensation rates of metal precursor and water content of reaction medium, thereby yielding totally reproducible porous metal oxides, sulfides, selenides, and tellurides. For example, thermodynamically solvation by water is eliminated or minimized by eliminating or minimizing the amount of water in the system. This in turn limits hydrolysis.

The present disclosure provides a simple wet-chemical process that enables the synthesis of nanometer-sized particles (50-300 nm) with tunable pore sizes in the range of 2-30 nm, preferably 2-20 nm, and more preferably 2-13 nm. This surfactant-mediated synthesis may be generalized to achieve various pore structures, including 3-D cubic Im3m, 3-D cubic Fm3m, 2-D hexagonal P6m, foam-like and worm-like pores, as well as different material compositions. The synthesis can produce ultrafine particles with well-defined mesopores, regular particle morphology and excellent pore accessibility. The mesopores are adjustable in size and have high structural ordering. The process uses a surfactant that may act as a supramolecular template for formation of the periodic mesostructure.

One of the unique features of the porous materials synthesized with this method is the tunable porosity. The pore diameter can be controlled between the super micropore range (e.g., about 2 nm) and the mid-mesopore range (e.g., about 13 nm) without losing available pore volume. A pore size of 13 nm is quite unusual for the mesoporous materials synthesized with various surfactant systems. The pore size of the synthesized materials increases with heat treatments applied which is also a unique discovery of this disclosure. This is a contradiction of pore size by heat treatment because of further condensation of wall structure and collapse of the structure with increased heat treatment duration and temperature applied. Tunable pore size might be useful for various catalytic applications in terms of size selective reactions and enhanced ion mobility for battery applications, etc.

Another unique advantage of this method is controlling the crystal structure of the nano-sized metal oxide, sulfide, selenide, and telluride walls. For instance, amorphous, bixbyite, hausmannite and manganite structures can be obtained for the manganese system. That makes possible the synthesis of target crystal structures for specific applications. Different crystal structures of metals show different optical, magnetic and catalytic properties which indicate that the method described herein is highly desirable for designing unique porous materials.

Other illustrative crystal structures of the nano-sized metal oxide, sulfide, selenide, and telluride walls include, for example, $Cr_2O_3$, $ZrO_2$, $Nb_2O_5$, $HfO_2$, $Ta_2O_5$, $SnO_2$, $CeO_2$, $Nd_2O_3$, $Sm_2O_3$ and $Gd_2O_3$, and the like. The method of this disclosure provides for controllable nano-sized wall crystallinity and the synthesis of target crystal structures for specific applications.

In accordance with this disclosure, well ordered crystalline mesoporous metal oxide, sulfide, selenide, and telluride systems can be prepared that can result in enhanced sorptive, conductive, structural, catalytic, magnetic and optical properties, in particular, enhanced catalytic activity and selectivity from better transport properties.

The mesoporous materials of this disclosure show tunable mesostructure and mesoporosity, controlled crystal structure, nano-sized crystallinity, and high thermal stability. The mesoporous materials of this disclosure are mesoporous analogues of some oxides (solid acids, oxidation and polymerization catalysts), non-metals (adsorbents), and sulfides (semiconductors) which are proven to be very promising in a variety of applications. Making these materials mesoporous offers improvement for desired applications.

The mesoporous materials of this disclosure can be synthesized with cheap precursors with high reproducibility and quality. All mesoporous materials can be synthesized in a short time and in one step reactions (except mesoporous carbon).

The process of this disclosure can serve as single step, fast synthesis route for mesoporous materials for the entire periodic table. The process of this disclosure is not limited to single metal systems but also can also be used to synthesize solid heterogeneous catalysts, semi-conductors, and adsorbent materials. These materials can be mixed oxides, sulfides, surface modified solid acids, and the like.

Figure 44:
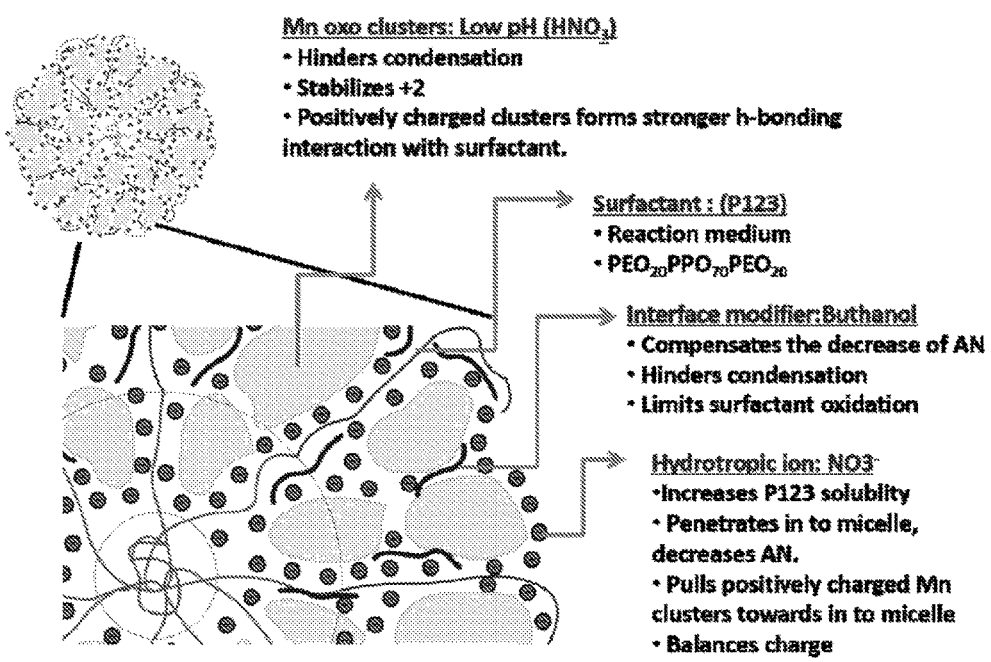
FIG. 44 depicts the sol gel micelle process for preparing well ordered metal oxide mesoporous materials with monomodal uniform pore sizes in accordance with this disclosure.

The process of this disclosure involves a sol-gel micelle based method as depicted in FIG. 44. In an embodiment, the process for preparing $Mn_2O_3$ uses $HNO_3$ at low pH to increase metal precursor solubility, stabilize lower oxidation states, and hydrate the core of the micelles. Mn oxo clusters are stabilized in the $2^+$ oxidation state. Stronger hydrogen bonding interactions with surfactants occur. In FIG. 44, the surfactant species is Pluronic® P123, which is also the reaction medium. Minimization of water in these syntheses limits the aggregation of metal oxide, sulfide, selenide, or telluride clusters and confines the entire reaction to the core. An interface modifier like butanol hinders the condensation and limits oxidation of surfactant molecules present in the micelle once the critical micelle concentration (CMC) has been reached. The hydrotropic nitrate ion increases solubility of the Pluronic® P123 surfactant, penetrates into the micelle and decreases the aggregation number (AN), pulls the positively charged manganese oxide clusters into the micelle and balances charge. Referring to Equation 1 herein above, in these syntheses, $\Delta G_{inter}$ (everything is in the micelle) and $\Delta G_{sol}$ (no solvent) are not a concern, $\Delta G_I$ is controlled (confinement in the micelle), and $\Delta G_{org}$ is adjusted with $NO_3^-$ and butanol. The $NO_3^-$ ion is critical and can be monitored with Fourier Transform Infrared (FTIR) spectroscopy. On coordination of $NO_3^-$ to $Mn^{2+}$, symmetry is lowered from $D_{3h}$ to $C_{3v}$, the asymmetric stretching mode (E') splits and a stretching mode at 1060 $cm^{-1}$ appears that is also Raman active. In free nitrate, the asymmetric stretching mode of water is near 1360 $cm^{-1}$. In solid environments, nitrate ions balance positive charges and shifts to lower frequencies. This also brings a further stability to formed nano-crystals by covering the surface of these particles.

During this process, surfactant is oxidized at long reaction times and formed carboxyl groups coordinated to oxomanganese clusters and competes with nitrate to exist in the micelles, although in some systems this is not the case. All samples regardless of reaction time show thermal stability up to 250° C. During the synthesis, carboxylate bands increase while nitrate bands decrease. Spectra are normalized with respect to the Mn—O stretching band (584 $cm^{-1}$). The surfactant C—O stretching mode is between 1050 $cm^{-1}$-1200 $cm^{-1}$. The carboxyl groups are formed due to oxidation of the surfactant at long reaction times. These carboxyl groups are oxidized at 150° C. with a concomitant color change of the solution from black to brown. $NO_3^-$ ions do not fully disappear until 200° C. The carboxyl groups need to be removed to preserve the mesoporous structure. Failure to remove the carboxylate groups leads to unstable mesoporous materials. Depending on reaction conditions, different manganese oxide structures (crystalline walls) can be formed.

In accordance with this disclosure, during thermal treatment, the d-spacings increase. The unit cell expands during heat treatment. The exact position of the d(100) peak depends on the heating temperature and time. Corresponding BET surface area (100-200 m²/g), pore size distributions, and pore volumes (up to 0.22 cc/g) show that mesoporous materials are produced with excellent control of pore size distributions (monomodal). These materials are stable up to 550° C. Such control of pore size distribution, enhanced pore volumes, and thermal stabilities are significant advantages afforded with metal oxide, sulfide, selenide, and telluride mesoporous compositions prepared in accordance with the process of this disclosure.

As used herein, "thermal stability" means no, or essentially no, degradation of structure at a designated temperature. As used herein, "monomodal" means one, or essentially one, mode as in pore size distribution. As used herein, "control of mesoporosity" means uniform, or essentially uniform, control of pore size, pore size distribution, and shape.

Figure 45:
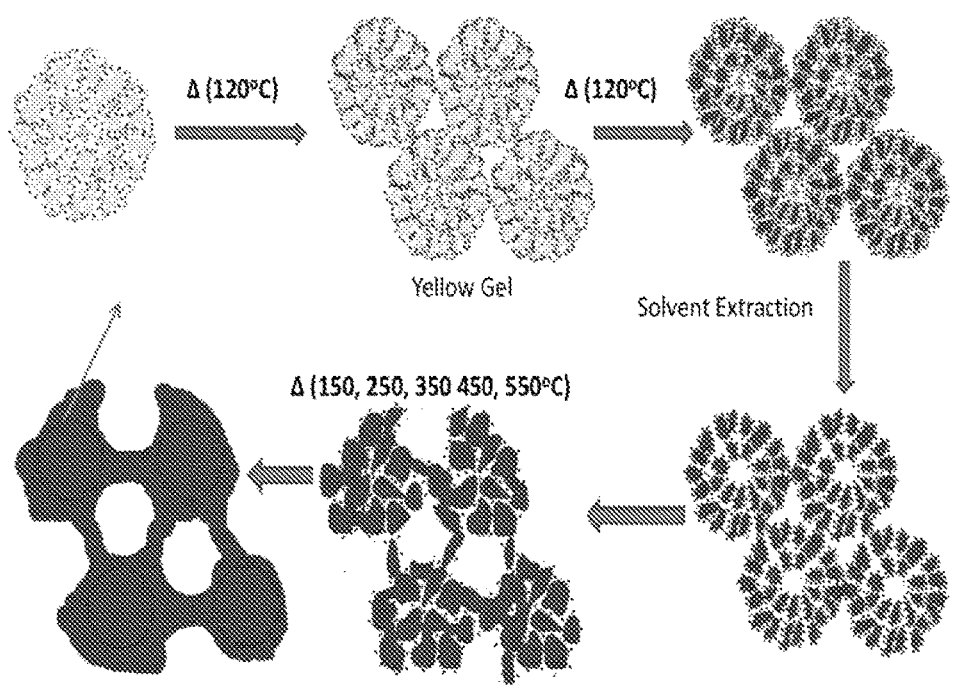
FIG. 45 depicts a proposed mechanism for the formation of highly ordered mesoporous $Mn_2O_3$ in accordance with this disclosure.

Referring to FIG. 45, a proposed mechanism of formation of ordered mesopores is shown. There is pore expansion up to 350° C. Mesopores merge to form larger ordered mesoporous materials between 350° C. and 450° C. The crystalline walls are made up of nanoparticles of manganese oxide that order as observed by X-ray diffraction (XRD), transmission electron microscopy (TEM), and electron diffraction (ED) methods.

In the process of this disclosure, the acidic mixture may comprise water, and may be an aqueous mixture. The mixture may be a solution, a dispersion or an emulsion, a micellar solution, and may be a microemulsion. The mixture may have a pH between about 0.5 and about 5, or between about 1 and about 3. The surfactant may be anionic, cationic, non-ionic, zwitterionic, or mixtures thereof. The surfactant may be a polymeric surfactant, and may be a copolymer surfactant, for example a block copolymer surfactant. The surfactant may be an alkylene oxide block copolymer surfactant, e.g. an EO/PO block copolymer surfactant. The surfactant may be miscible or immiscible with the interface modifier.

In the process of this disclosure, the micellar solution may comprise water, and may be an aqueous solution. This may also be a solution, a dispersion or an emulsion, and may be a microemulsion. This solution may have a pH between about 0.5 and about 5, or between about 1 and about 3. The surfactant may be anionic, cationic, non-ionic, zwitterionic, or mixtures thereof. This may be a polymeric surfactant, and may be a copolymer surfactant, for example a block copolymer surfactant. The surfactant may be an alkylene oxide block copolymer surfactant, e.g. an EO/PO block copolymer surfactant. The surfactant may be miscible or immiscible with the interface modifier.

The metal precursors useful in the processes of this disclosure can be any water soluble metal salt, preferably metal salts with hydrotropic counter anions and alkoxide sources of any metal. The metal precursors also exhibit moderate alcohol solubility. The metal precursors are conventional materials known in the art and are commercially available.

One or more metal precursors are useful in the processes of this disclosure. Physicochemical properties of the mesoporous materials of this disclosure can be controlled by the use of mixed metal precursors in the synthesis thereof. The inverted micelle controlled formation of the mesoporous materials of this disclosure makes the tuning of physicochemical properties of the materials possible by controlling micellization and inter-micellar interaction using additives such as mixed metal precursors.

Illustrative metal precursors include, for example, metal halides, metal phosphates, metal acetates, metal nitrates, metal alkoxides, and $M_xO_y$ oxides that are capable of dissolving in $HNO_3$. More particularly, metal precursors include, for example, metal halides such as $HfCl_4$ or $NbCl_4$, $M(NO_3)_x \cdot yH_2O$ (M=Mn, Fe, Co, Cu, Zn, Si), tetraethyl orthosilicate (TEOS), tetramethyl orthosilicate (TMOS), titanium isopropoxide, zirconium n-propoxide, zirconium butoxide, $Ce(NO_3)_3 \cdot 6H_2O$, $Gd(NO_3)_3 \cdot 6H_2O$, $Sm(NO_3)_3 \cdot 6H_2O$, and the like.

Other metal precursors useful in the process of this disclosure include, for example, metal $Cl^-$, $I^-$, $SCN^-$, $SO_4^{2-}$, $F^-$ salts, and the like. Preferably, any metal and metal oxide, sulfide, selenide, tellurides, and the like, which $HNO_3$ can dissolve can be used. Any metal salt which does not form insoluble nitrate salts can be used.

The metal precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni, Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal precursors used in the process of this disclosure can vary over a wide range and need only be at a concentration sufficient to form the mesoporous metal oxides, sulfides, selenides, and tellurides. The metal precursors can be present in a molar concentration ratio of from about $1 \times 10^{-2}$ M to about 10 M, preferably from about $1 \times 10^{-1}$ M to about 5 M, and more preferably from about $5 \times 10^{-1}$ M to about 1 M (based on a total volume of 10 milliliters).

The interface modifiers useful in the processes of this disclosure can be any aliphatic, alicyclic or aromatic hydrocarbons of between about 1 and about 20 carbon atoms, e.g., butanol. The interface modifiers are conventional materials known in the art and are commercially available. Any organic solvents that allow the surfactant to organize itself into inverse micelles are useful in the processes of this disclosure.

One or more interface modifiers, e.g., organic solvents, are useful in the processes of this disclosure. Physicochemical properties of the mesoporous materials of this disclosure can be controlled by the use of mixed interface modifiers in the synthesis thereof. The inverted micelle controlled formation of the mesoporous materials of this disclosure makes the tuning of physicochemical properties of the materials possible by controlling micellization and inter-micellar interaction using additives such as mixed interface modifiers.

Illustrative interface modifiers include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, trimethyl benzene (TMB), acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

The role of butanol is multiple and one role is to occupy the interface, since the butanol occupation is thermodynamically favored in the hydrophobic-hydrophilic interface of Pluronic® surfactants. However, an interface modifier (or co-surfactant in this context) may not be required and can be replaced by another surfactant.

In accordance with this disclosure, the use of butanol in different solvent systems can be replaced with other smaller alcohols, water, or a hydrotropic ion. The main purpose of butanol is to increase the surfactant solubility. In the absence of butanol, Pluronic® surfactants are not fully soluble in higher order alcohols. One can avoid the use of other additives to see the solvent effect and prevent possible confusion about observed physicochemical properties which can also be affected by additives.

Using higher order alcohols than ethanol yields formation of inverse micelles for the Pluronic® type surfactants. Considering that the inverse micelle formation is essential for mesoporous materials of this disclosure, one can use higher order alcohols or alcohol mixtures as solvents for the synthesis of the mesoporous materials. In theory, one can choose any organic solvent or solvent mixture or modified solvents yielding Pluronic® inverse micelles to synthesize the mesoporous materials of this disclosure.

The use of butanol as a co-surfactant helps all Pluronic® surfactants to be in uniform inverse micellar form by increasing its solubility. It is also possible to replace butanol by either charged or neutral co-surfactants in various solvent systems to increase Pluronic® surfactant solubility. Addition of more butanol to the system reverses the effect of pentanol since butanol is thermodynamically more stable in the interface. The necessity of the co-surfactant role can be satisfied by adding more butanol into the hexanol system. Butanol-hexanol mixtures can be considered as a pentanolic solution meaning that in a certain ratio mixing butanol and hexanol the solution behaves like pentanol.

In different solvents, butanol can be added to the system as a co-surfactant and hydrolysis-condensation regulator. The use of butanol is essential for Pluronic® surfactant systems in solvents or solvent mixtures, since butanol satisfies three critical roles in a given transition metal-Pluronic® surfactant system. First, butanol is an alcohol and helps controlling sol-gel chemistry of the transition metal. Secondly, butanol has a role as solvent to form an inverse micelle. The third role is being a co-surfactant in Pluronic® systems. Simply, butanol makes the micelle more thermodynamically stable which is also known as a geometric requirement. Further, the boiling point of butanol is just above the reaction temperatures. Chaotic environments created by boiling of solvents generally result in inhomogeneous condensation rates and perturbs the liquid crystal phase. Pressure-temperature relationships may be useful to eliminate boiling when using a high boiling point solvent.

One can eliminate or replace the use of butanol in the synthesis of the mesoporous materials of this disclosure as long as the new system satisfies the following requirements: the role of butanol as a co-surfactant can be replaced with a different alcohol or smaller chain length surfactant; the role as solvent can be replaced with any organic solvent as long as a suitable alcohol is picked (for sol-gel chemistry) and reaction temperature adjusted considering the new solvent; and the use of a different surfactant which does not require co-surfactant or another co-surfactant to fulfill this requirement.

The concentration of the interface modifiers used in the process of this disclosure can vary over a wide range and need only be a concentration sufficient to form the mesoporous materials. The interface modifiers can be present in a molar concentration ratio of from about 1 M to about 40 M, preferably from about 2 M to about 15 M, and more preferably from about 5 M to about 10 M (based on a total volume of 10 milliliters).

The concentration of the interface modifiers used in the process of this disclosure can vary over a wide range depending on the interface modifier type. More hydrotropic or lyotropic ions should be used in smaller amounts of interface modifiers and vice versa. This ratio can reach 5-50 M since the interface modifier is evaporated and its upper limit can be varied. Also, scaling up the reaction can be done by varying this ratio.

The hydrotropic ion precursors, e.g., acids, useful in the processes of this disclosure can be any hydrotropic anion beyond chloride in the Hoffmeister series, including mixtures thereof. The hydrotropic and lyotropic ion precursors are conventional materials known in the art and are commercially available. Suitable acids include, for example, nitric acid, hydrochloric acid, sulfuric acid, and mixtures thereof.

One or more hydrotropic or lyotropic ion precursors are useful in the processes of this disclosure. Physicochemical properties of the mesoporous materials of this disclosure can be controlled by the use of mixed hydrotropic or lyotropic ion precursors in the synthesis thereof. The inverted micelle controlled formation of the mesoporous materials of this disclosure makes the tuning of physicochemical properties of the materials possible by controlling micellization and inter-micellar interaction using additives such as mixed hydrotropic or lyotropic ion precursors.

The acid is one of the main components of the method for the synthesis of mesoporous materials of this disclosure. The main role of the acid is to keep metals in their lowest possible oxidation state and prevent the condensation reaction until an intermediate liquid crystal phase has been achieved. Controlling the pH allows one to decide the path of condensation. The reactions conducted below the point of zero charge follow the cationic route and the pH values above this point follow the anionic route. The use of the acidic route is more pronounced then the basic route in synthesis of porous materials of transition metals by sol-gel chemistry. In principle, the synthesis of mesoporous materials of this disclosure is possible by following the basic route if a controlled condensation reaction environment is achieved. The rate control can be achieved by temperature decrease, aging times prior to the heating step, co-solvent, and some organic and inorganic additives.

Nitrate ion is another important and essential component of the method for the synthesis of mesoporous materials of this disclosure. Nitrate has multiple roles in the synthesis. The first role is the hydrotropic nature of this ion. Hydrotropic nitrate ions increase the surfactant solubility by hydrating the core of the inverted Pluronic® surfactant so the metal precursors use this water rich environment in the core either satisfying its water coordination or enhancing solvation of the oxo-metal clusters. The use of other metal sources with different counter anions rather than nitrate decreases the surfactant solubility and destroys the micelles. However, the use of more soluble smaller surfactants allows one to use other metal salts. The second role of nitrate is to adjust the pH of the reaction media.

In accordance with this disclosure, the right combinations of an acid source and hydrotropic ions can be chosen to mimic the same effect. In other words, the method allows the use of other acids such as HCl, $H_2SO_4$, $H_3PO_4$, $HClO_4$ or a combination and other hydrotropic anions such as $SCN^-$, $ClO_4^-$ or ion combinations. The other parameter which can also effect the possible acid and ion combinations and amounts is the surfactant type and amount. This is so since, even in same class of surfactants or surfactant combinations the critical micelle concentration (CMC) and critical micelle temperature (CMT) vary.

The effect of nitrate on control of the pH can also be mimicked by careful titration or supplying oxygen or sulfur or selenide or hydrogen sulfide or air (any gas oxidizes the metal, helping to speed up the condensation reaction) reaction media to promote the condensation reaction yielding the final mesoporous material.

Illustrative hydrotropic ion precursors include, for example, $HNO_3$, $NaNO_3$, $KNO_3$, metal iodides, metal thiocyanides, and the like. Illustrative hydrotropic ions include, for example, $NO_3^-$, $SCN^-$, $Br^-$, $I^-$, an organic modifier such as ethylene glycol, and the like. A modifier can be used to modify the hydrotropic part such as $F^-$, 3,3',5,5'-tetramethylbenzidine (TMB), aromatic compounds, $Cl^-$, $SO_4^{2-}$, and the like.

The concentration of the hydrotropic or lyotropic ion precursors used in the process of this disclosure can vary over a wide range and need only be a concentration sufficient to form the mesoporous materials. The hydrotropic or lyotropic ion precursors can be present in a molar concentration ratio of from about $1\times10^{-2}$ M to about 15 M, preferably from about $1\times10^{-1}$ M to about 10 M, and more preferably from about 1 M to about 5 M (based on a total volume of 10 milliliters).

The replacement of nitrate ions with a material that can gradually decrease the pH under process conditions may be useful in the process of this disclosure. Atmospheres of urea vapor or ammonia or other volatile bases may be useful in accomplishing the above. Hydrocyanation may be used, or HF or other acids. The concepts of the use of an acid or a base and controlling pH are embodiments of this disclosure.

The surfactants useful in the processes of this disclosure can be any anionic, cationic, non-ionic, zwitterionic surfactant, or mixtures thereof. The surfactants are conventional materials known in the art and are commercially available.

One or more surfactants, e.g., a surfactant and co-surfactant, are useful in the processes of this disclosure. Physicochemical properties of the mesoporous materials of this disclosure can be controlled by the use of mixed surfactants in the synthesis thereof. The inverted micelle controlled formation of the mesoporous materials of this disclosure makes the tuning of physicochemical properties of the materials possible by controlling micellization and intermicellar interaction using additives such as mixed surfactants.

The use of a co-surfactant in the synthesis of mesoporous materials synthesized with Pluronic® P123 surfactant:co-surfactant significantly affects the inverted micelles obtained as well as the physicochemical properties obtained for the resulting mesoporous materials. Addition of a co-surfactant which is smaller than the major surfactant Pluronic® P123 mostly affects the hydrophilic interactions inside the micelle. The increase in the hydrophilic interaction converts the spherical micelles to elongated micelles. The increase in the hydrophilic interaction in the core region is not the only contribution of the co-surfactants. The smaller co-surfactants also satisfy the geometrical requirement and also limit the interface volume by increasing the hydrophilic-hydrophobic gradient between the core and outer corona region. Limiting the interface volume and swelling the core region results in bigger and monodisperse nano-crystals which can be realized from the position and relative sharpness of the low angle diffraction patterns.

Illustrative surfactants include, for example, anionic, cationic, non-ionic, zwitterionic, or mixtures thereof. This may be a polymeric surfactant, and may be a copolymer surfactant. The copolymer surfactant may be a block copolymer, or may be a random copolymer, an alternating copolymer or some other type of copolymer. The block copolymer may be a diblock, triblock or other copolymer. The block copolymer may have between 2 and 5 blocks or more than 5 blocks. The material may have an odd or an even number of blocks, and may have 2, 3, 4 or 5 blocks. The block copolymer may have hydrophilic blocks alternating with hydrophobic blocks. The terminal blocks may be hydrophobic, or may be hydrophilic, or one may be hydrophilic and one hydrophobic. The copolymer surfactant may have 2, 3, 4, 5 or more than 5 different types of blocks (i.e. different monomers). The material may be an alkylene oxide block copolymer surfactant. The system may be an EO/PO copolymer surfactant, e.g. an EO/PO block copolymer surfactant. Suitable surfactants include Pluronic® P65 ($HO(CH_2CH_2O)_{20}(CH_2CH(CH_3)O)_{30}(CH_2CH_2O)_{20}H$) or (EO20PO30EO20), Pluronic® P85 ($HO(CH_2CH_2O)_{26}(CH_2CH(CH_3)O)_{40}(CH_2CH_2O)_{26}H$) or (EO26PO40EO26), Pluronic® 25R4 (PO19EO33PO19), Pluronic® F108 ($HO(CH_2CH_2O)_{129}(CH_2CH(CH_3)O)_{56}(CH_2CH_2O)_{129}H$) or (EO129PO56EO129), Pluronic® P123 ($HO(CH_2CH_2O)_{20}(CH_2CH(CH_3)O)_{70}(CH_2CH_2O)_{20}H$) or (EO20PO70EO20) and Pluronic® F127 ($HO(CH_2CH_2O)_{97}(CH_2CH(CH_3)O)_{69}(CH_2CH_2O)_{97}H$) or (EO97PO69EO97). The surfactant may be miscible or immiscible, or may be partially miscible, with the interface modifier.

Preferred surfactants useful in the process of this disclosure can be represented by the formula

$(HO(CH_2CH_2O)_n(CH_2CH(CH_3)O)_m(CH_2CH_2O)_nH)$ wherein m is a value from about 10 to about 150, preferably from about 20 to about 100, and more preferably from about 20 to about 70, and n is a value from about 5 to about 150, preferably from about 10 to about 70, and more preferably from about 10 to about 30.

Other preferred surfactants useful in the process of this disclosure can be represented by the formula

$(PPO)_x(PEO)_y(PPO)_z$ wherein PPO is polypropylene oxide, PEO is polyethylene oxide, and x, y and z are values sufficient for the surfactant to have a hydrophilic-lipophilic balance (HLB) from about 1 to about 18, preferably from about 1 to about 12, and more preferably from about 3 to about 7.

Other illustrative surfactants useful in the process of this disclosure include, for example, a Triton® surfactant, a Tween® surfactant, a star type branched surfactant, glucose, or an AB or BC polymer surfactant, wherein A is polyisoprene butylene, B is styrene, and C is selected from glucose, amine, carboxyl group-containing compound, and polyethylene glycol (PEG).

Still other illustrative surfactants include an ethoxylated castor oil, an ethoxylated coconut fatty acid, or an amidified, ethoxylated coconut fatty acid. Natural surfactants and gemini (dimeric) surfactants can be useful in the process of this disclosure.

An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE(20) castor oil; POE (20) castor oil (ether, ester); POE(3) castor oil, POE(40) castor oil, POE(50) castor oil, POE(60) castor oil, or polyoxyethylene (20) castor oil (ether, ester).

An ethoxylated coconut fatty acid can include, for example, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate.

An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

The surfactant can be, for example, one or more of Alfoterra® 123-8S, Alfoterra® 145-8S, Alfoterra® L167-7S, Ethox® HCO-5, Ethox® HCO-25, Ethox® CO-40, Ethox® ML-5, Ethal® LA-4, AG-6202, AG-6206, Ethox® CO-36, Ethox® CO-81, Ethox® CO-25, Ethox® TO-16, Ethsorbox® L-20, Ethox® MO-14, S-MAZ 80K, T-MAZ 60 K 60, Tergitol® L-64, Dowfax® 8390, Alfoterra® L167-4S, Alfoterra® L123-4S, and Alfoterra® L145-4S.

The surfactant can be, for example, one or more of castor oil, cocoa oil, cocoa butter, coconut oil, soy oil, tallow oil, cotton seed oil, a naturally occurring plant oil and a plant extract. Further, the surfactant can be, for example, one or more of an alkyl polyglucoside or an alkyl polyglucoside-based surfactant, a decyl polyglucoside or an alkyl decyl-polyglucoside-based surfactant.

Figure 59:
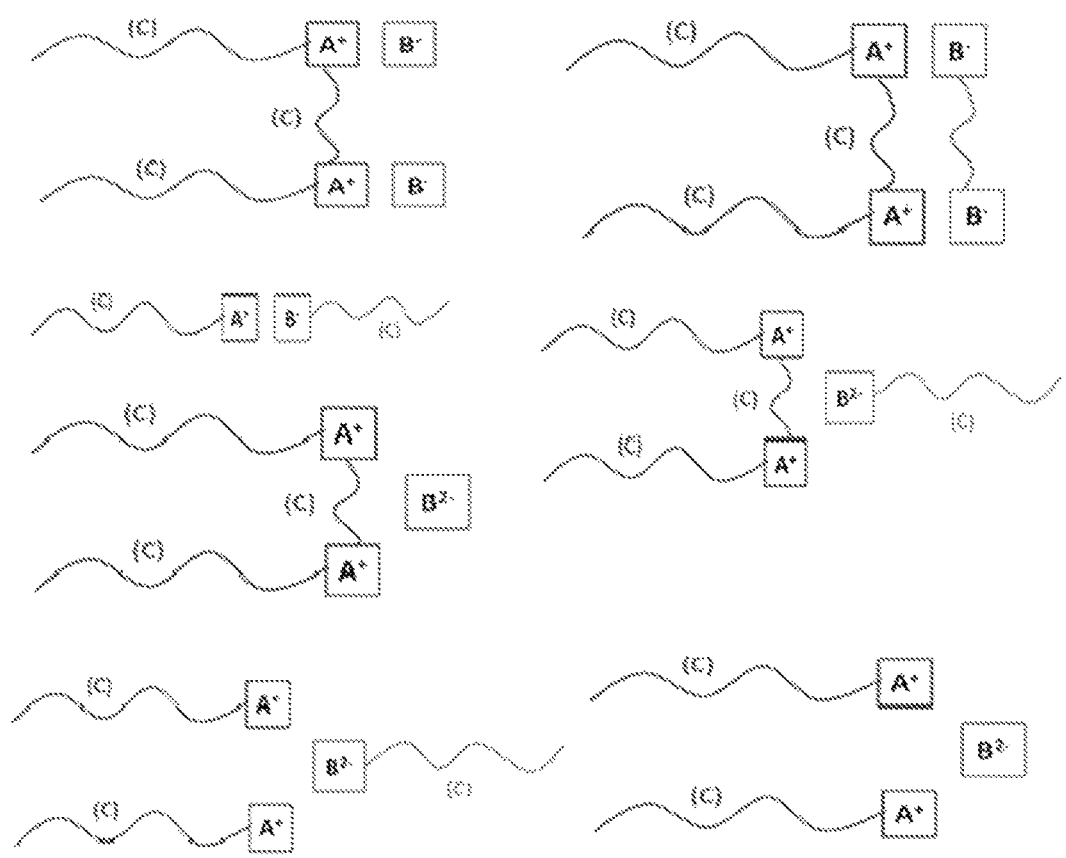
FIG. 59 shows an illustrative list of ionic surfactant types which can be used in the synthesis of mesoporous materials of this disclosure, as either a co-surfactant or major surfactant.

The mesoporous materials of this disclosure are unique types of materials that can be prepared by a synthesis using various surfactants and surfactant mixtures for fine tuning physicochemical properties of final mesoporous materials. FIG. 59 shows an illustrative list of ionic surfactant types which can be used in the synthesis of mesoporous materials of this disclosure, as either a co-surfactant or major surfactant. However, nonionic surfactants are preferred over ionic surfactants due to their well established and wide range phase diagrams. Generally speaking, ionic surfactants do not have well defined inverse micelle phases in their phase diagrams and they generally form vesicle like structures or layered materials in hydrophobic environments. Moreover, the sizes of inverted micelles are smaller compared to the ones created by nonionic ones which can be considered as a problem for stabilizing the formed nano-particles. Another possible problem that might arise by the use of solely ionic surfactants is the risk of forming precipitates with metals and introducing a counter ion causing complications.

FIG. 60 shows an illustrative list of cationic surfactant types which can be used in the synthesis of mesoporous materials of this disclosure, as either a co-surfactant or major surfactant.

Figure 61:
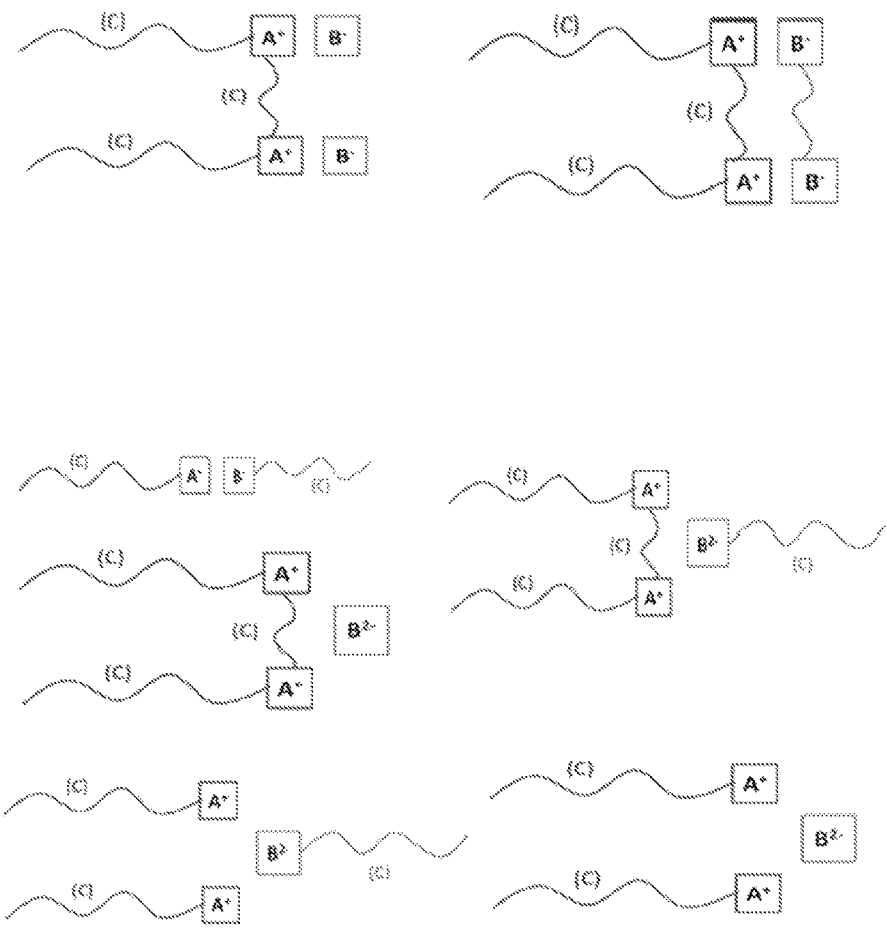
FIG. 61 shows an illustrative list of anionic surfactant types which can be used in the synthesis of mesoporous materials of this disclosure, as either a co-surfactant or major surfactant.

FIG. 61 shows an illustrative list of anionic surfactant types which can be used in the synthesis of mesoporous materials of this disclosure, as either a co-surfactant or major surfactant. The anionic surfactant types are the same type of surfactants as in the cationic surfactants, except $A^+$ is replaced by $A^-$ and $B^-$ is replaced by $B^+$.

Figure 62:
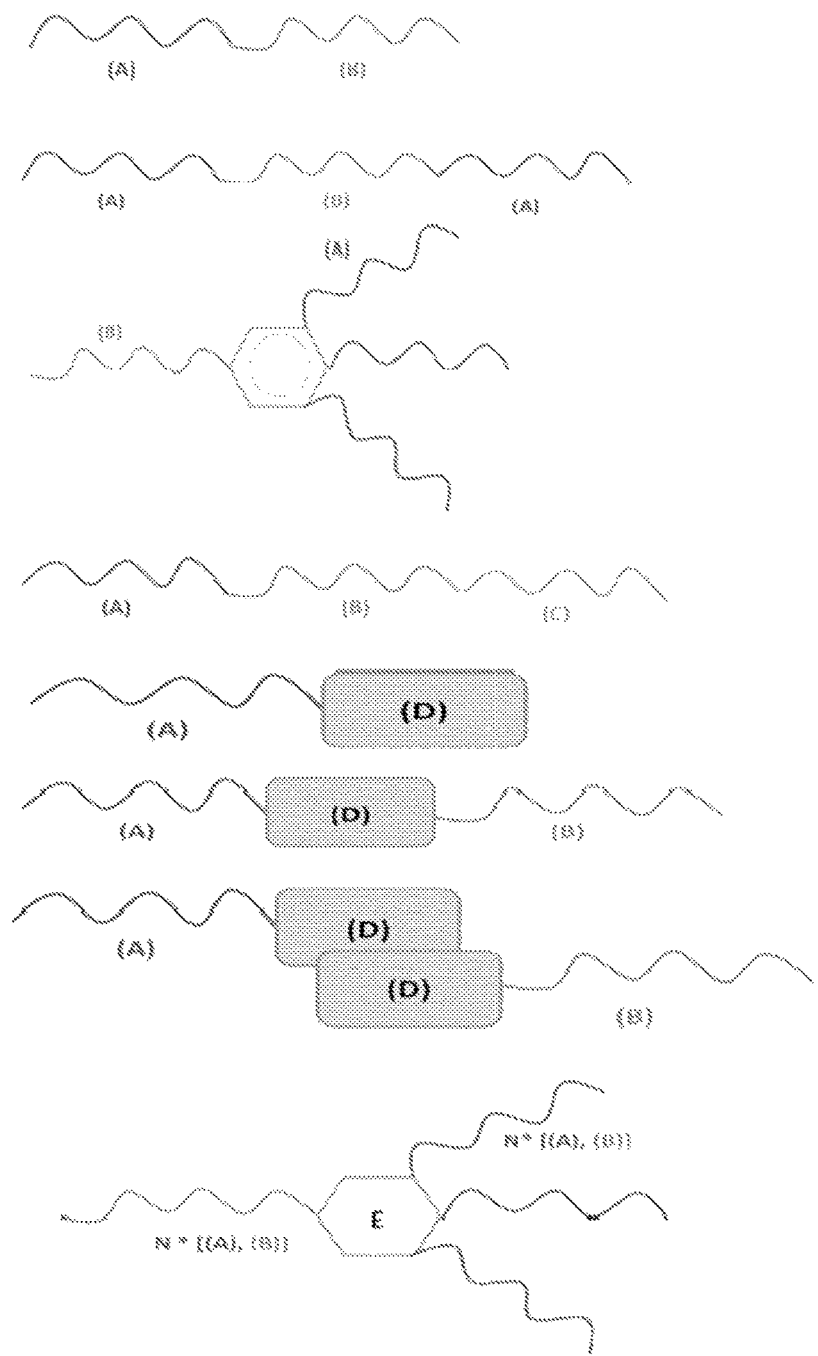
FIG. 62 shows an illustrative list of nonionic surfactant types which can be used in the synthesis of mesoporous materials of this disclosure, as either a co-surfactant or major surfactant.

FIG. 62 shows an illustrative list of nonionic surfactant types which can be used in the synthesis of mesoporous materials of this disclosure, as either a co-surfactant or major surfactant.

Surfactant types useful in this disclosure can synthetically be created by combination of nonionic and ionic functional groups mentioned above. A combination of ionic surfactants (anionic and cationic) can be useful in this disclosure since they may have different phase behavior. Multiple, strong hydrogen bonding interaction between two nonionic surfactants can yield a new type of nonionic surfactant having different phase behaviors than the behaviors of the individual surfactants used to form the new nonionic surfactant. A combination of ionic liquids and ionic surfactants can also yield a new type of surfactant useful in this disclosure.

Ionic surfactants have been found to be more effective for increasing the hydrophilic interaction since ionic character of the surfactants sucks more water into the core region. With the method of this disclosure, one can easily control the physicochemical parameters and the nano-crystal size and shape by using co-surfactants. Moreover, ionic surfactants also increase the obtained yield for the metal systems such as Fe, Mn, and Co.

Surfactant solubility and the metal source solubilizing potential of the surfactant are important parameters in this disclosure. Since, as long as the metal source is solubilized in the formed Pluronic® micelles a mesostructured material can be obtained. Regardless of the surfactant combination or metal mixture or solvent or acid source used, one can synthesize mesostructured materials with the method as long as a clear micellar solution is obtained before the reaction.

The concentration of the surfactant used in the process of this disclosure can vary over a wide range and need only be a concentration sufficient to form the mesoporous materials. The surfactant can be present in a molar concentration ratio of from about $1\times10^{-5}$ M to about 1 M, preferably from about $1\times10^{-4}$ M to about $1\times10^{-1}$ M, and more preferably from about $1\times10^{-3}$ M to about $1\times10^{-2}$ M (based on a total volume of 10 milliliters).

The organic and inorganic additives useful in the processes of this disclosure can be any suitable organic or inorganic additives, including mixtures thereof. The organic and inorganic additives are conventional materials known in the art and are commercially available.

One or more organic and/or inorganic additives are useful in the processes of this disclosure. Physicochemical properties of the mesoporous materials of this disclosure can be controlled by the use of mixed organic or inorganic additives in the synthesis thereof. The inverted micelle controlled formation of the mesoporous materials of this disclosure makes the tuning of physicochemical properties of the materials possible by controlling micellization and intermicellar interaction using additives such as mixed organic and/or inorganic additives.

Illustrative organic additives include, for example, urea, hydrocarbons (decane, octane etc.), benzene, mesitylene or trimethyl benzene (TMB), substituted benzene (tri-isopropylene, ethylbenzene, etc.), polyethylene glycol, thiourea, ethylene diamime, styrene, pyrene, naphthalene, azobenzene, aromatic dye molecules (brilliant green, methylene blue, methyl orange, perylene bisimide, congo red etc.), naphthalene, phenolic compounds, formaldehyde, PPO, PEO, sugars (D-fructose, glucose, sucrose, cellulose, starch, etc.), citric acid, phenol, aromatic alcohols (benzyl alcohol, etc.), alcohols (pentanol, hexanol, 2-propanol, etc.), carboxylic acids (heptanic acid), phosphates (trimethyl phosphate), oleyl ether, lysine, glycine, glutamic acid, tosylate, and carboxyl.

In particular, illustrative organic additives include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, TMB, acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

Mesitylene (1,3,5-trimethylbenzene) (TMB) and other benzene organic derivatives can be used in the synthesis of mesoporous materials as pore swelling agent and increasing the meso-order of the synthesized Pluronic® surfactant based mesoporous materials. Organic additives might vary depending on the surfactant system. The key in selecting an organic additive is synergy between the additive and surfactant. Aromatic molecules are known to have a strong interaction with the relatively hydrophobic polypropylene oxide group (PPO) of the Pluronic® surfactants. TMB can be replaced with another benzene derivative or any organic molecule containing an aromatic ring including dye molecules. Another surfactant having different hydrophilic-hydrophobic groups or different types of surfactants such as star type, bis, charged surfactants can use other types of organic additives such as polyethylene glycol, and n-alcohols.

In the mesoporous materials of this disclosure, organic additives have an effect different than regular systems. The outer swelled outer region of the inverted micelles leads them to pack in a different mesostructure. Despite the resulting materials not showing any surface area enhancement, they have significantly higher pore volume. This is because packing of inverted micelles move from random hexagonal packing to the least effective packing which is body centered cubic (bcc) packing. The micelle formation and intermicellar interaction can be controlled or modified easily by additives. The key is to choose appropriate additives for each surfactant system studied. The used organic additive for manipulation of surfactant packing and interaction is strictly surfactant dependent.

Organic additives are generally effective on non-ionic surfactants, on the other hand ionic surfactant packing or interaction control can more easily be done by inorganic additives. Inorganic additives are not only effective for controlling the ionic surfactants but also they are found to be very effective in non-ionic surfactant assembly. The effect of inorganic additives on non-ionic surfactant assembly is generally known as the Hoffmeister effect created by Hoffmeister series ions. The Hoffmeister series is a series of anions and cations which are sorted by their ability to increase surfactant solubility (hydrotropic) or decrease surfactant solubility (lyotropic).

Illustrative inorganic additives include, for example, aprotic and protic ionic liquids (ethylammonium nitrate (EAN), ethanolammonium nitrate (EOAN), diethanolammonium formate (DEOAF), laponite, $C_2H_5Si(OC_2H_5)_3$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, and $ClO_4^-$.

The concentration of the organic or inorganic additives used in the process of this disclosure can vary over a wide range and need only be a concentration sufficient to form the mesoporous metal oxides. The organic or inorganic additives can be present in a molar concentration ratio of from about $1\times10^{-2}$ M to about 15 M, preferably from about $1\times10^{-1}$ M to about 10 M, and more preferably from about 1 M to about 5 M (based on a total volume of 10 milliliters).

The step of preparing the micellar solution may comprise combining the metal precursor with an interface modifier, a hydrotropic or lyotropic ion precursor, and a surfactant. The media may be a solution, a microemulsion, an emulsion, a dispersion or some other type of mixture. The ratio of metal precursor to surfactant may be between about 1:100 and about 1:2 on a w/w, v/v or w/v basis, and may be about 1:20. Before, during and/or after the combining, the micellar solution may be agitated, e.g. shaken, stirred, swirled, sonicated or otherwise agitated. The mixture may have a pH between about 0.5 and about 5, or between about 1 and about 3.

The metal precursor, interface modifier, hydrotropic or lyotropic ion precursor, and surfactant may be added to the micellar solution in any combination or at any stage during the process of preparing the micellar solution. The metal precursor, interface modifier, hydrotropic or lyotropic ion precursor, and surfactant may be added with or without agitation. Ti and Zr are exceptions. In these preparations, $HNO_3$ is first diluted in butanol.

The process may comprise the step of agitating the micellar solution to form a solution, a dispersion or an emulsion. The emulsion may be a microemulsion. The agitating may be vigorous, moderate or mild. This mixing may comprise shaking, stirring, sonicating, ultrasonicating, swirling or some other form of agitation. The step of reacting may comprise the step of agitating the micellar solution or the step of agitating the micellar solution may be a separate step conducted before the step of reacting.

In accordance with the process of this disclosure, the micellar solution is heated at a temperature and for a period of time sufficient to form the mesoporous material. In particular, the micellar solution is heated at a temperature and for a period of time sufficient to form a dried powder. The dried powder is first washed with an alcohol, e.g., ethanol, to remove organic components, e.g., surfactant, and then heated at a temperature and for a period of time sufficient to form the mesoporous material. The heating may be in air, or in some other gas, for example, oxygen, nitrogen, carbon dioxide, helium, argon or a mixture of any two or more of these.

The micellar solution is heated sequentially in the following manner. The micellar solution can be first heated at a temperature from about 75° C. to about 150° C., preferably from about 85° C. to about 140° C., and more preferably from about 90° C. to about 130° C., for a period from about 1 to about 12 hours, preferably from about 1 to about 10 hours, and more preferably from about 1 to about 8 hours. Thereafter, the micellar solution can be heated at a temperature from about 40° C. to about 80° C., preferably from about 45° C. to about 75° C., and more preferably from about 50° C. to about 70° C., for a period from about 1 to about 12 hours, preferably from about 1 to about 10 hours, and more preferably from about 1 to about 8 hours, to form the dried powder. Then the material is washed with ethanol to remove surfactant. This sequential heating is carried out in a manner sufficient to remove chemisorbed and/or physisorbed $NO_3^-$ and any left over $NO_x$. The second heating step at the lower temperature is for removing the $NO_x$ species.

The dried powder is heated sequentially in the following manner. Firstly, the dried powder is heated at a temperature from about 100° C. to about 200° C., preferably from about 125° C. to about 175° C., and more preferably from about 140° C. to about 160° C., for a period from about 2 to about 20 hours, preferably from about 4 to about 18 hours, and more preferably from about 6 to about 16 hours. Secondly, the dried powder is heated at a temperature from about 200° C. to about 300° C., preferably from about 225° C. to about 275° C., and more preferably from about 240° C. to about 260° C., for a period from about 1 to about 10 hours, preferably from about 2 to about 8 hours, and more preferably from about 2 to about 6 hours. Thirdly, the dried powder is heated at a temperature from about 300° C. to about 400° C., preferably from about 325° C. to about 375° C., and more preferably from about 340° C. to about 360° C., for a period from about 1 to about 8 hours, preferably from about 1 to about 7 hours, and more preferably from about 1 to about 6 hours. Fourthly, the dried powder is heated at a temperature from about 400° C. to about 500° C., preferably from about 425° C. to about 475° C., and more preferably from about 440° C. to about 460° C., for a period from about 0.5 to about 5 hours, preferably from about 1 to about 4 hours, and more preferably from about 1 to about 3 hours. Fifthly, the dried powder is heated at a temperature from about 500° C. to about 600° C., preferably from about 525° C. to about 575° C., and more preferably from about 540° C. to about 560° C., for a period from about 0.1 to about 2 hours, preferably from about 0.25 to about 2 hours, and more preferably from about 0.5 to about 2 hours.

In an embodiment, the micellar solution is heated sequentially as follows: at a temperature of about 100° C.-120° C. for a period of about 2-7 hours; and at a temperature of about 60° C. for a period of about 8-12 hours (e.g., overnight). In another embodiment, the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The process of this disclosure can be conducted at a pressure sufficient to form the mesoporous materials. Positive or negative pressures may be useful in the process of this disclosure. Suitable combinations of pressure, temperature and contact time may be employed in the process of this disclosure, in particular, temperature-pressure relationships that give mesoporous materials having desired properties and/or characteristics. The pressure may range between about ambient and about 50 atmospheres, preferably between about ambient to about 40 atmospheres, and more preferably between about ambient to about 25 atmospheres. Normally the process is carried out at ambient pressure.

The process may additionally comprise washing the dried powder, e.g., nanoparticulates, for a period of time sufficient to remove organic components therefrom. The washing liquid may be water, or an aqueous liquid, or with a non-aqueous liquid, or an organic liquid (e.g., ethanol), or some combination of these. The particles may be washed once or more than once, and may be washed between 1 and about 10 times or more. Each wash may be with the same washing liquid as any other wash, or may be with a different washing liquid. The washing may comprise exposing the nanoparticulates to the washing liquid, e.g. suspending the nanoparticulates in the washing liquid, and then separating the nanoparticulates from the washing liquid, using any of the separating processes described herein. In particular, the dried powder is washed with ethanol for a period of time sufficient to remove surfactant therefrom.

The process may additionally comprise at least partially separating the nanoparticulates from a fluid (e.g., washing fluid) in which they are located (optionally suspended or dispersed). This may comprise filtering, settling, decanting, centrifuging, vacuum filtering, dialysis, membrane filtering, magnetic separation, or some other suitable process, and may comprise more than one of these.

In an embodiment, the mesoporous materials can be nanoparticulates having a particle size between about 1 and about 500 nm, or between about 50 and about 300 nm, and a mean pore size between about 1 and about 50 nm, or between about 1 and about 30 nm or greater than 2 nm, or between about 2 and 13 nm. The nanoparticulates may have a 3-D cubic or 3-D foam-like mesostructure, or may have a 2-D hexagonal or wormlike mesostructure. The mesoporous nanoparticulates may comprise mesoporous transition metal oxides, sulfides, selenides, and tellurides, Lanthanide metal oxides, sulfides, selenides, and tellurides, post-transition metal oxides, sulfides, selenides, and tellurides and metalloid oxides, sulfides, selenides, and tellurides. The mesoporous metal oxides, sulfides, selenides, and tellurides may be doped with other elements, for example titanium, aluminum or zirconium. The mesoporous nanoparticulates may be spherical or some other regular shape. There is also provided a plurality of mesoporous nanoparticulates. The mean particle size of the nanoparticulates may be between about 1 and about 500 nm. The particle size distribution may be broad or narrow. There may be less than about 50% of nanoparticulates having a particle size more than 10% different from (greater than or less than) the mean particle size.

The mesoporous metal oxides, sulfides, selenides, and tellurides prepared by the process of this disclosure include oxides, sulfides, selenides, and tellurides of transition metals, Lanthanide metals, post-transition metals, metalloids, and mixtures thereof. For example, the transition metal oxides, sulfides, selenides, and tellurides comprise Group 3-12 transition metal oxides, sulfides, selenides, and tellurides, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxides, sulfides, selenides, and tellurides. In an embodiment, the transition metal oxides, sulfides, selenides, and tellurides are selected from Group 6-12 transition metal oxides, sulfides, selenides, and tellurides including Cr, Mo, W, Mn, Tc, Re, Fe, Ru, Os, Co, Rh, Ir, Ni, Pd, Pt, Cu, Ag, Au, Zn, Cd and Hg oxides, sulfides, selenides, and tellurides. Preferably, the Group 6-12 transition metal oxides, sulfides, selenides, and tellurides include Mn, Fe, Co, Ni, Cu and Zn oxides, sulfides, selenides, and tellurides. The Lanthanide metal oxides, sulfides, selenides, and tellurides include La, Ce, Pr, Nd, Pm, Sm, Eu, Gd, Tb, Dy, Ho, Er, Tm, Yb and Lu oxides, sulfides, selenides, and tellurides, or any mixture thereof. The post-transition metal oxides, sulfides, selenides, and tellurides include Al, Ga, In, Tl, Sn, Pb and Bi oxides, sulfides, selenides, and tellurides, or any mixture thereof. The metalloid oxides, sulfides, selenides, and tellurides include B, Si, Ge, As, Sb, Te, Po and At oxides, sulfides, selenides, and tellurides, or any mixture thereof.

The surface area of the mesoporous material particulates, e.g. BET surface area, maybe between about 50 and about 1000 $m^2/g$, and may be between about 60 and 500, 70 and 200 and 80 and 190, $m^2/g$, and may be about 50, 75, 100, 125, 150, 175 or 200 $m^2/g$.

The pore volume (BJH) may be between about 0.05 and about 2 $cm^3/g$, or between about 0.075 and 2, and 0.1 and 2 $cm^3/g$, and may be about 0.05, 0.1, 0.15, 0.2 or 0.25 $cm^3/g$.

The pore size (diameter), e.g., BJH desorption, may be between about 1 and 25 nm, or between about 1.5 and 20 nm, 2 and 15 nm, and 2 and 13 nm, and may be about 2.0, 2.5, 3.0, 3.5, 4.0, 4.5, 0.5.0, 5.5 and 6 nm The wall thickness (2 $d/\sqrt{3}$-PD, where d is the d-spacing and PD is the pore diameter) may be between about 2 and about 20 nm, or between about 3 and about 16 nm, 4 and 14 nm, or 5 and 12 nm, and may be about 5.0 5.5, 6.0, 6.5, 7.0, 7.5, 8.0, 8.5, 9.0, 9.5 and 10.0 nm. The formula applies to 2-dimensional hexagonal materials.

The crystal structures of the nano-sized metal oxide, sulfide, selenide, and telluride walls include, for example, $CeO_2$, $Mn_2O_3$, $Mn_3O_4$, $Fe_2O_3$, $Fe_3O_4$, $Co_3O_4$, ZnO, CuO, $TiO_2$ (Anatase or Rutile), $ZrO_2$, NiOOH, and the like.

The mesoporous particulates may be round or spherical, or may be oblate spherical, rod-like, aggregated, ellipsoid, ovoid, a modified oval shape, dome shaped, hemispherical; a round ended cylinder, capsule shaped, discoid, prismatic, acicular or polyhedral (either regular or irregular) such as a cube, a rectangular prism, a rectangular parallelepiped, a triangular prism, a hexagonal prism, rhomboid or a polyhedron with between 4 and 60 or more faces, or may be some other shape, for example an irregular shape.

The mesoporous materials of this disclosure exhibit properties that are advantageous for specific applications. For example, the mesoporous metal oxides, sulfides, selenides, and tellurides can exhibit thermal stability up to a temperature of about 350° C., preferably up to a temperature of about 450° C., and more preferably up to a temperature of about 550° C., and even more preferably up to a temperature of about 800° C. Also, the mesoporous metal oxides, sulfides, selenides, and tellurides can exhibit high pore volume after heat treatment cycles. For example, the unit cell expansion and pore-size increase do not cause a significant change at pore volume. In other words, ideally for a given material, one can change the pore size from the super micropore region (about 2 nm) to the mid mesopore region (about 20 nm) by preserving pore volume. Further, the mesoporous metal oxides, sulfides, selenides, and tellurides can exhibit physicochemical properties after catalytic reactions under high pressure and temperature. For example, catalytic tests done on mesoporous $ZrO_2$ and $CeO_2$ under 20 bar pressure of $N_2$ or $H_2$ at 150° C. did not cause any change of physicochemical properties of the materials.

The mesoporous material nanoparticulates, or a plurality thereof, can be useful for a variety of applications including, for example, catalysis, gas adsorption, synthesis of quantum dots and magnetic nanoparticles in functional materials and bioimaging applications, and as carriers for drugs, genes and proteins for biomedical applications. In particular, the mesoporous metal oxides are useful as catalysts, sensors, batteries and energy production, optical displays, environmental and sorbent applications.

There are several advantages afforded by the method of this disclosure including, for example, control of the crystal structure of the wall during heating, the possibility of synthesis without surfactant, precise control of pore size, and the method can be extended to a variety of transition metal oxides, sulfides, selenides, and tellurides, Lanthanide oxides, sulfides, selenides, and tellurides, post-transition metal oxides, sulfides, selenides, and tellurides and metalloid oxides, sulfides, selenides, and tellurides. The Pluronic® P123 surfactant is non-ionic and low foaming. Other advantages of the process of this disclosure for the synthesis of mesoporous materials are that $H^+$ is not a concern, in principle the process is applicable to all transition metals, Lanthanide metals, port-transition metals and metalloids, different types of surfactants can be used, gelation is not required, the crystal structure (i.e., for manganese oxides, Hausmannite, Pyrolusite, Bixbyite) can all be formed, thickness of walls can be controlled, fine tuning of magnetic and optical properties is possible, and pore expansion on heat treatment of the mesoporous materials occurs. Highly optically pure glass materials, light sensitive lenses and ultraviolet absorbing lenses for plastic or glass materials may be made in accordance with the process of this disclosure.

Applications

The mesoporous materials of this disclosure can be used in many fields including industrial and medical fields. Some potential uses of these new materials are described herein.

Semiconductors: Semiconductor mesoporous materials with nano-sized crystalline domains exhibit different optical and electronic properties than their bulk analogues. Quantum confinement effect is the idea behind the tuning of these properties. Going from oxides to sulfides (or selenides or tellurides) band gap shifts to visible region by narrowing the band gap and increasing potential applications.

Non-metals (C): Carbon can be used in many different fields such as adsorption, separation, catalysis (with a proper modification), air purification, chromatography, and energy storage due to its high specific surface area (low density), chemical inertness, mechanical stability and unique electronic structure. The synthesis of mesoporous carbon with ordered mesoporosity and high surface area can serve an improvement in these applications.

Post-transition metals (Sn): A wide band gap semiconductor tin oxide has many applications in fabricating electronic and optic devices. One of the properties for electronic applications is the use of tin oxide in dye sensitized solar cells (DSSC). The wide band gap of $SnO_2$ in the UV-range and less oxygen defects increases the lifetime of adsorbed dye molecules. Nano-sized crystalline domains can provide further advantages by both increasing the surface area (more adsorbed dye) and tuning the band gap. Moreover, $SnO_2$ is a good Lewis acid and a good support for creating strong solid acids.

Transition Metal Oxides (Nb, Hf, Ta): Slow sol-gel chemistry of these transition metals brings more control of the structural properties. One can synthesize and control the structural parameters of these oxides for optical applications, capacitor fabrication, and oxidation catalysts.

Lanthanides (Nd, Sm, Gd): Nano-sized lanthanides (oxides) have many applications, for example, in MRI imaging ($Gd_2O_3$), synthesis, in neutron and infrared absorbing materials ($Sm_2O_3$), fabrication of colored glasses, and synthesis of polymerization catalysts ($Nd_2O_3$).

High pressure reactions (Mn and ZSM-5): High pressure synthesis of heterogeneous catalysts has been widely used in industry especially for the synthesis of zeolites. The use of high pressure can be essential for obtaining certain crystal phases with desired crystallinity. In accordance with this disclosure, manganese and aluminosilicate systems, for example, have been evaluated, and the crystal structures obtained for these systems cannot be obtained at atmospheric pressures. The use of higher pressures than atmospheric pressure can be used in mesoporous systems to develop or obtain unique materials for desired applications. In addition, the use of gels as precursors for unique materials further increases the importance of this approach.

Solid acid catalysts (sulfated, phosphated, tungstated, and tin loaded solid acids): Most of the major catalytic routes for biomass, biodiesel, organic synthesis of fine chemicals require an acid catalyst. The uses of homogeneous catalysts have some disadvantages such as corrosion and recyclability. Therefore, the need for solid acid catalysts has merged. Tunable acid strength, acid type and number of acid sites are required in the solid acid catalysts. The creation of mesoporosity along with high surface can increase the catalytic performance of these important types of solid acids. The mesoporous materials of this disclosure having tunable mesoporosity and high surface area can satisfy these requirements.

Synthesis of Methyl Levulinate or Methyl Lactate from Carbohydrates and Biomass Resources In accordance with this disclosure, solid phase nanoparticles (e.g., UCT-48 sulfated titanium oxide anatase) can directly catalyze carbohydrates and wood chips to methyl levulinate or methyl lactate. Methyl levulinate is one of the most promising biofuel additives for biomass refineries. Methyl lactate is used chiefly as a solvent for cellulose acetate. The highly dispersed nanoparticles can be prepared as described herein under very mild conditions, obtaining single crystal phase (pure anatase) materials with average grain sizes of 4 nm. The catalyst can provide remarkably high yields (up to 80%) and excellent selectivity (up to 99%) with respect to products in the liquid phase. The biomass processes can be conducted at low temperatures (120° C. to 200° C.). The catalysts can also be recycled and reused.

Currently people are approaching the peak-high rate in consuming petroleum for chemicals and energy. The exhaustion of fossil fuel resources and issues of global warming make it very important to synthesize useful organic chemicals and fuels from carbohydrates (sugars) and biomass resources. Among various chemicals that can be synthesized from carbohydrates and biomass resources, methyl levulinate, which can be used as oxygenated diesel and gasoline fuel additives respectively, is one of the most promising biofuel additive for biomass refineries. Methyl levulinate can also be used as a precursor to various useful chemicals such as fuel additives, polyacrylates, polycarbonates, biodegradable herbicides, and photosynthesis promoters.

Levulinate acid is formed from sugars in the presence of large amounts of mineral acids as catalysts. For example, Biofine Corporation developed the first practical process for synthesis of levulinate acid from carbohydrate biomass, in which more than 300 mol % of $H_2SO_4$ was used. Several other syntheses of levulinate acid from biomass resources using metal chlorides as the catalysts have also been reported. However, all the reported methods used homogeneous based catalysts. The removal of the catalysts from the products, the strong reactor corrosion issue, and recycling of the catalysts are problematic. Therefore, the process of this disclosure is highly desirable in that it affords a less expensive but efficient heterogeneous catalyst to directly synthesize methyl levulinate from carbohydrates and biomass resources.

Preferred Embodiments

A process (1) for preparing a mesoporous material, said process comprising: providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous material.

The above process (1) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (1) wherein the heating step comprises: heating the micellar solution at a temperature and for a period of time sufficient to form a dried powder; and heating the dried powder at a temperature and for a period of time sufficient to form the mesoporous material.

The above process (1) wherein the micellar solution is heated sequentially as follows: at a temperature from about 75° C. to about 150° C. for a period from about 1 to about 12 hours; and at a temperature from about 40° C. to about 80° C. for a period from about 1 to about 12 hours; or wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above process (1) further comprising washing the dried powder with an alcohol for a period of time sufficient to remove organic components therefrom; or further comprising washing the dried powder with ethanol for a period of time sufficient to remove surfactant therefrom.

The above process (1) wherein the mesoporous material comprises an oxide, a sulfide, a selenide or a telluride of the following: a transition metal selected from Cr, Zr, Nb, Hf and Ta; a Lanthanide selected from Nd, Sm, Ce and Gd; a post-transition metal comprising Sn; or a mixed metal or a solid acid selected from P—Zr, W—Zr, S—Ti, Sn—Zr and S—Zr; or wherein the mesoporous material comprises: a transition metal oxide selected from $Cr_2O_3$, $ZrO_2$, $Nb_2O_5$, $HfO_2$ and $Ta_2O_5$; a post-transition metal oxide comprising $SnO_2$; and a Lanthanide oxide selected from $CeO_2$, $Nd_2O_3$, $Sm_2O_3$ and $Gd_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

The above process (1) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above process (1) wherein the one or more metal precursors are present in a molar concentration ratio of from about $1 \times 10^{-2}$M to about 10 M.

The above process (1) wherein the one or more interface modifiers comprise an aliphatic, alicyclic or aromatic hydrocarbon of between about 1 and about 20 carbon atoms, or mixtures thereof or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above process (1) wherein the one or more interface modifiers are present in a molar concentration ratio of from about 1 M to about 40 M.

The above process (1) wherein the one or more hydrotropic ion precursors comprise $HNO_3$, $NaNO_3$, $KNO_3$, metal iodides, metal thiocyanides, hydrochloric acid, sulfuric acid, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above process (1) wherein the one or more hydrotropic or lyotropic ion precursors are present in a molar concentration ratio of from about $1 \times 10^{-2}$M to about 15 M.

The above process (1) wherein the one or more surfactants comprise an anionic, cationic, non-ionic, or zwitterionic surfactant, or mixtures thereof or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above process (1) wherein the one or more surfactants are present in a molar concentration ratio of from about $1 \times 10^{-5}$M to about 1 M.

The above process (1) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above process (1) wherein the one or more inorganic additives comprise aprotic and protic ionic liquids, ethylammonium nitrate (EAN), ethanolammonium nitrate (EOAN), diethanolammonium formate (DEOAF), laponite,

[$C_2H_3Si(OC_2H_5)_3$, (TESE, capping agent), $H^+$ 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (1) wherein the one or more organic and/or inorganic additives are present in a molar concentration ratio of from about $1 \times 10^{-2}$M to about 15 M.

The above process (1) wherein the mesoporous material has a pore size (diameter) between about 2 nanometers and about 20 nanometers; or wherein the mesoporous material has a pore size (diameter) between about 2 nanometers and about 13 nanometers.

The above process (1) which is conducted under process conditions sufficient to control pore size and pore size distribution of the mesoporous material and crystal structure of nano-sized mesoporous material walls.

A mesoporous material produced by the above process (1).

A process (2) for preparing a mesoporous material, said process comprising: preparing an acidic mixture by mixing one or more metal precursors, one or more surfactants, one or more interface modifiers, one or more hydrotropic or lyotropic ion precursors, and optionally one or more organic and/or inorganic additives; aging the acidic mixture at a temperature and for a period of time sufficient to form a powder, film or gel; and heating the powder, film or gel at a temperature and for a period of time sufficient to form the mesoporous material; wherein the process is a sol-gel micelle based process in which micellization and intermicellar interaction are controlled by said one or more metal precursors, one or more surfactants, one or more interface modifiers, one or more hydrotropic or lyotropic ion precursors, and optionally one or more organic and/or inorganic additives.

The above process (2) wherein the mesoporous material comprises an oxide, a sulfide, a selenide or a telluride of the following: a transition metal selected from Cr, Zr, Nb, Hf and Ta; a Lanthanide selected from Nd, Sm, Ce and Gd; a post-transition metal comprising Sn; or a mixed metal or a solid acid selected from P—Zr, W—Zr, S—Ti, Sn—Zr and S—Zr; or wherein the mesoporous material comprises: a transition metal oxide selected from $Cr_2O_3$, $ZrO_2$, $Nb_2O_5$, $HfO_2$ and $Ta_2O_5$; a post-transition metal oxide comprising $SnO_2$; and a Lanthanide oxide selected from $CeO_2$, $Nd_2O_3$, $Sm_2O_3$ and $Gd_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (2).

The above process (2) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above process (2) wherein the one or more metal precursors are present in a molar concentration ratio of from about $1 \times 10^{-2}$M to about 10 M.

The above process (2) wherein the one or more interface modifiers comprise an aliphatic, alicyclic or aromatic hydrocarbon of between about 1 and about 20 carbon atoms, or mixtures thereof; or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above process (2) wherein the one or more interface modifiers are present in a molar concentration ratio of from about 1 M to about 40 M.

The above process (2) wherein the one or more hydrotropic ion precursors comprise $HNO_3$, $NaNO_3$, $KNO_3$, metal iodides, metal thiocyanides, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above process (2) wherein the one or more hydrotropic or lyotropic ion precursors are present in a molar concentration ratio of from about $1\times10^{-2}$M to about 15 M.

The above process (2) wherein the one or more surfactants comprise an anionic, cationic, non-ionic, or zwitterionic surfactant, or mixtures thereof; or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant The above process (2) wherein the one or more surfactants are present in a molar concentration ratio of from about $1\times10^{-5}$ M to about 1 M.

The above process (2) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above process (2) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_3Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (2) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_3Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (2) wherein the one or more organic and/or inorganic additives are present in a molar concentration ratio of from about $1\times10^{-2}$M to about 15 M.

The above process (2) wherein the mesoporous material has a pore size (diameter) between about 2 nanometers and about 20 nanometers; or wherein the mesoporous material has a pore size (diameter) between about 2 nanometers and about 13 nanometers.

The above process (2) further comprising heating the powder, film or gel at a temperature and for a period of time sufficient to tune the structural properties of the mesoporous material.

The above process (2) wherein the powder, film or gel is heated at a temperature from about 150° C. to about 700° C. for a period from about 1 to about 12 hours; or wherein the powder, film or gel is heated sequentially as follows: at a temperature from about 75° C. to about 150° C. for a period from about 1 to about 12 hours; and at a temperature from about 40° C. to about 80° C. for a period from about 1 to about 12 hours; or wherein the powder, film or gel is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the powder, film or gel is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above process (2) which is conducted under process conditions sufficient to control pore size and pore size distribution of the mesoporous material and crystal structure of nano-sized mesoporous material walls.

The above process (2) further comprising washing the powder with an alcohol for a period of time sufficient to remove organic components therefrom; or further comprising washing the powder with ethanol for a period of time sufficient to remove surfactant therefrom.

A process (3) for preparing a mesoporous material, said process comprising: providing an acid unmodified mesoporous material prepared by the above process (1); treating the acid unmodified mesoporous material with an acid to form an acid modified mesoporous material; and heating the acid modified mesoporous material at a temperature and for a period of time sufficient to form the mesoporous material.

The above process (3) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (3) wherein the mesoporous material comprises a solid acid catalyst; or wherein the solid acid catalyst comprises: sulfated zirconium oxide, phosphated zirconium oxide or tungstated zirconium oxide; sulfated titanium oxide, phosphated titanium oxide or tungstated titanium oxide; sulfated tin oxide, phosphated tin oxide or tungstated tin oxide; or sulfated silicon oxide, phosphated silicon oxide or tungstated silicon oxide.

The above process (3) wherein the mesoporous material is selected from $ZrO_2$, $TiO_2$, SnO and $SiO_2$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (3).

The above process (3) wherein the acid is selected from sulfuric acid (as sulfate source), phosphoric acid (as phosphate source) and ammonium metatungstate (as tungsten source); or wherein the acid is a Lewis acid or a Brönsted acid.

The above process (3) wherein the treating is sufficient to preserve mesoporosity and crystalline structure of the mesoporous material; or wherein the heating is sufficient to preserve mesoporosity and crystalline structure of the mesoporous material.

The above process (3) further comprising heating the acid modified mesoporous material at a temperature and for a period of time sufficient to tune the structural properties of the solid acid catalyst; or wherein the acid modified mesoporous material is heated at a temperature from about 150° C. to about 700° C. for a period from about 1 to about 12 hours; or wherein the acid modified mesoporous material is heated sequentially as follows: at a temperature from about 75° C. to about 150° C. for a period from about 1 to about 12 hours; and at a temperature from about 40° C. to about 80° C. for a period from about 1 to about 12 hours; or wherein the acid modified mesoporous material is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the acid modified mesoporous material is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

A process (4) for preparing a mesoporous material, said process comprising: providing an acid unmodified mesoporous material having a first mesoporosity and crystalline structure, wherein the acid unmodified mesoporous material is prepared by the above process (1); treating the acid unmodified mesoporous material with an acid to form an acid modified mesoporous material having a second mesoporosity and crystalline structure; and heating the acid modified mesoporous material at a temperature and for a period of time sufficient to form the mesoporous material having a third mesoporosity and crystalline structure; wherein the second mesoporosity and crystalline structure is essentially the same as the first mesoporosity and crystalline structure, and the third mesoporosity and crystalline structure is essentially the same as the second mesoporosity and crystalline structure.

The above process (4) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (4) wherein the mesoporous material comprises a solid acid catalyst.

A one step process (5) for preparing a mesoporous material, said process comprising treating an acid unmodified mesoporous material with an acid to form said mesoporous material; wherein the treating is sufficient to preserve mesoporosity and crystalline structure of the mesoporous material; and wherein the acid unmodified mesoporous material is prepared by the above process (1).

The above process (5) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (5) wherein the mesoporous material comprises a solid acid catalyst; or wherein the solid acid catalyst comprises: sulfated zirconium oxide, phosphated zirconium oxide or tungstated zirconium oxide; sulfated titanium oxide, phosphated titanium oxide or tungstated titanium oxide; sulfated tin oxide, phosphated tin oxide or tungstated tin oxide; or sulfated silicon oxide, phosphated silicon oxide or tungstated silicon oxide.

The above process (5) herein the mesoporous material is selected from $ZrO_2$, $TiO_2$, SnO and $SiO_2$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (5).

The above process (5) wherein the acid is selected from sulfuric acid (as sulfate source), phosphoric acid (as phosphate source) and ammonium metatungstate (as tungsten source); or wherein the acid is a Lewis acid or a Brönsted acid.

The above process (5) wherein the acid is loaded from about 1% to about 30% (with respect to metal) in the mesoporous material.

The above process (5) wherein the mesoporous material comprises: sulfated zirconium oxide, phosphated zirconium oxide or tungstated zirconium oxide; sulfated titanium oxide, phosphated titanium oxide or tungstated titanium oxide; sulfated tin oxide, phosphated tin oxide or tungstated tin oxide; or sulfated silicon oxide, phosphated silicon oxide or tungstated silicon oxide.

The above process (5) further comprising heating the mesoporous material, wherein said heating is at a temperature and for a period of time sufficient to preserve mesoporosity and crystalline structure of the mesoporous material; or further comprising heating the mesoporous material at a temperature and for a period of time sufficient to tune the structural properties of the mesoporous material.

The above process (5) wherein the heating is sufficient to preserve mesoporosity and crystalline structure of the mesoporous material; or wherein the mesoporous material is heated at a temperature from about 150° C. to about 700° C. for a period from about 1 to about 12 hours; or wherein the mesoporous material is heated sequentially as follows: at a temperature from about 75° C. to about 150° C. for a period from about 1 to about 12 hours; and at a temperature from about 40° C. to about 80° C. for a period from about 1 to about 12 hours; or wherein the mesoporous material is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the mesoporous material is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

A process (6) for preparing mesoporous carbon, said process comprising: providing a mesoporous metal oxide, sulfide, selenide or telluride material containing a surfactant; wherein the mesoporous metal oxide, sulfide, selenide or telluride material is prepared by the above process (1); heating the mesoporous metal oxide, sulfide, selenide or telluride material containing a surfactant at a temperature and for a period of time sufficient to form a powder; and treating the powder to remove metal oxide, sulfide, selenide or telluride and to form the mesoporous carbon.

The above process (6) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (6) wherein said heating is at a temperature and for a period of time sufficient to preserve mesoporosity and crystalline structure of the mesoporous metal oxide material; or wherein said heating is at a temperature and for a period of time sufficient to cause carbonization.

The above process (6) wherein said heating is at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above process (6) wherein treating the powder to remove metal oxide, sulfide, selenide or telluride is by chemical etching.

The above process (6) wherein the mesoporous metal oxide, sulfide, selenide or telluride material is comprised of interconnecting channels and the channels are filled with surfactant.

The above process (6) further comprising washing the powder with an alcohol for a period of time sufficient to remove organic components therefrom; or further comprising washing the powder with ethanol for a period of time sufficient to remove surfactant therefrom.

A process (7) for preparing a mesoporous material, said process comprising: preparing an acidic mixture by mixing one or more metal precursors, one or more surfactants, one or more interface modifiers, one or more hydrotropic or lyotropic ion precursors, and optionally one or more organic and/or inorganic additives; aging the acidic mixture at a temperature and for a period of time sufficient to form a gel; mixing the gel with urea in a urea: gel weight ratio of from about 0.5:1 to about 1.5:1; and heating the mixture at a temperature and for a period of time sufficient to form the mesoporous material; wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (7) wherein the mesoporous material comprises a mesoporous semiconductor material; or wherein the mesoporous material comprises a mesoporous metal sulfide; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (7).

The above process (7) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above process (7) wherein the one or more metal precursors are present in a molar concentration ratio of from about $1 \times 10^{-2}$ M to about 10 M.

The above process (7) wherein the one or more interface modifiers comprise an aliphatic, alicyclic or aromatic hydrocarbon of between about 1 and about 20 carbon atoms, or mixtures thereof or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above process (7) wherein the one or more interface modifiers are present in a molar concentration ratio of from about 1 M to about 40 M.

The above process (7) wherein the one or more hydrotropic ion precursors comprise $HNO_3$, $NaNO_3$, $KNO_3$, metal iodides, metal thiocyanides, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above process (7) herein the one or more hydrotropic or lyotropic ion precursors are present in a molar concentration ratio of from about $1 \times 10^{-2}$ M to about 15 M.

The above process (7) wherein the one or more surfactants comprise an anionic, cationic, non-ionic, or zwitterionic surfactant, or mixtures thereof or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above process (7) wherein the one or more surfactants are present in a molar concentration ratio of from about $1 \times 10^{-5}$ M to about 1 M.

The above process (7) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above process (7) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_5Si(OC_2H_5)_3]$, (TESE, capping agent), $H^+$ 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (7) wherein the one or more organic and/or inorganic additives are present in a molar concentration ratio of from about $1\times10^{-2}$M to about 15 M.

The above process (7) wherein the mesoporous material has a pore size (diameter) between about 2 nanometers and about 20 nanometers; or wherein the mesoporous material has a pore size (diameter) between about 2 nanometers and about 13 nanometers.

The above process (7) which is conducted under process conditions sufficient to control pore size and pore size distribution of the mesoporous material and crystal structure of nano-sized mesoporous material walls.

The above process (7) further comprising washing the powder with an alcohol for a period of time sufficient to remove organic components therefrom; or further comprising washing the powder with ethanol for a period of time sufficient to remove surfactant therefrom.

The above process (7) further comprising heating the mixture at a temperature and for a period of time sufficient to tune the structural properties of the mesoporous material; or wherein said heating is at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

A process (8) for preparing a mesoporous material, said process comprising: providing a metal source material; stabilizing the metal source material with a tetrahedrally coordinated transition metal or post transition metal to form a gel; and heating the gel at a temperature and for a period of time sufficient to form the mesoporous material; wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (8) wherein the metal source material is a metatungstate source material and the tetrahedrally coordinated transition metal or post transition metal is Sn.

The above process (8) wherein the tetrahedrally coordinated transition metal or post transition metal is selected from Sn, Si, Ti and Zr.

The above process (8) further comprising heating the gel at a temperature and for a period of time sufficient to tune the structural properties of the mesoporous material.

The above process (8) wherein said heating is at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above process (8) further comprising removing the tetrahedrally coordinated transition metal or post transition metal from the mesoporous material by chemical etching.

The above process (8) wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride;

or wherein the metalloid oxide, sulfide, selenide or telluride is selected from a B, Si, Ge, As, Sb, Te, Po and At oxide, sulfide, selenide or telluride.

A mesoporous material produced by the above process (8).

A process (9) for preparing mesoporous tungsten material, said process comprising: providing a metatungstate source material; stabilizing the metatungstate source material with a tetrahedrally coordinated transition metal or post transition metal to form a gel; and heating the gel at a temperature and for a period of time sufficient to form the mesoporous tungsten material; wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

A process (10) for preparing a mesoporous rigid film, said process comprising: providing a mesoporous film containing a surfactant; wherein the mesoporous film is produced from the mesoporous material by the above process (1); washing the mesoporous film containing a surfactant with an alcohol:water mixture; wherein the alcohol:water volume ratio is from about 1:1 to about 20:1; and heating the washed mesoporous film at a temperature and for a period of time sufficient to form the mesoporous rigid film.

The above process (10) which is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (10) further comprising heating the washed mesoporous film at a temperature and for a period of time sufficient to tune the structural properties of the mesoporous rigid film.

The above process (10) wherein the alcohol:water mixture comprises an ethanol:water mixture.

The above process (10) wherein the mesoporous rigid film comprises $Cr_2O_3$, $ZrO_2$, $TiO_2$, $SiO_2$ or an aluminosilicate material; or wherein the mesoporous rigid film is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous rigid film produced by the above process (10).

The above process (10) wherein said heating is at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

A process (11) for preparing a mesoporous material, said process comprising: preparing an acidic mixture by mixing one or more metal precursors, one or more surfactants, one or more interface modifiers, one or more hydrotropic or lyotropic ion precursors, and optionally one or more organic and/or inorganic additives; aging the acidic mixture at a temperature and for a period of time sufficient to form a gel; and heating the gel at a pressure, temperature and for a period of time sufficient to form the mesoporous material; wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (11) wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (11).

The above process (11) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above process (11) wherein the one or more metal precursors are present in a molar concentration ratio of from about $1 \times 10^{-2}$M to about 10 M.

The above process (11) wherein the one or more interface modifiers comprise an aliphatic, alicyclic or aromatic hydrocarbon of between about 1 and about 20 carbon atoms, or mixtures thereof; or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above process (11) wherein the one or more interface modifiers are present in a molar concentration ratio of from about 1 M to about 40 M.

The above process (11) wherein the one or more hydrotropic ion precursors comprise $HNO_3$, $NaNO_3$, $KNO_3$, metal iodides, metal thiocyanides, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above process (11) wherein the one or more hydrotropic or lyotropic ion precursors are present in a molar concentration ratio of from about $1 \times 10^{-2}$M to about 15 M.

The above process (11) wherein the one or more surfactants comprise an anionic, cationic, non-ionic, or zwitterionic surfactant, or mixtures thereof; or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above process (11) wherein the one or more surfactants are present in a molar concentration ratio of from about $1 \times 10^{-5}$M to about 1 M.

The above process (11) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above process (11) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_5Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (11) wherein the one or more organic and/or inorganic additives are present in a molar concentration ratio of from about $1 \times 10^{-2}$M to about 15 M.

The above process (11) wherein the mesoporous material has a pore size (diameter) between about 2 nanometers and about 20 nanometers; or wherein the mesoporous material has a pore size (diameter) between about 2 nanometers and about 13 nanometers.

The above process (11) further comprising heating the gel at a pressure, temperature and for a period of time sufficient to tune the structural properties of the mesoporous material.

The above process (11) wherein said heating is at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above process (11) wherein the pressure ranges from about 2 bar to about 40 bar.

The above process (11) which is conducted under process conditions sufficient to control pore size and pore size distribution of the mesoporous material and crystal structure of nano-sized mesoporous material walls.

A process (12) for preparing a mesoporous material, said process comprising: preparing a mixture by mixing one or more metal precursors, one or more surfactants, one or more interface modifiers, one or more hydrotropic or lyotropic ion precursors, and optionally one or more organic and/or inorganic additives; adding an acid to the mixture to form a gel; aging the gel at a temperature and for a period of time sufficient to promote condensation of inorganic framework and removal of solvent; and heating the gel at a temperature and for a period of time sufficient to form the mesoporous material; wherein the process is a sol-gel micelle based process in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (12) wherein the mesoporous material comprises SnO or $Cr_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

A mesoporous material produced by the above process (12).

The above process (12) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above process (12) wherein the one or more metal precursors are present in a molar concentration ratio of from about $1 \times 10^{-2}$ M to about 10 M.

The above process (12) wherein the one or more interface modifiers comprise an aliphatic, alicyclic or aromatic hydrocarbon of between about 1 and about 20 carbon atoms, or mixtures thereof; or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above process (12) wherein the one or more interface modifiers are present in a molar concentration ratio of from about 1 M to about 40 M.

The above process (12) wherein the one or more hydrotropic ion precursors comprise $HNO_3$, $NaNO_3$, $KNO_3$, metal iodides, metal thiocyanides, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above process (12) wherein the one or more hydrotropic or lyotropic ion precursors are present in a molar concentration ratio of from about $1\times10^{-2}$M to about 15 M.

The above process (12) wherein the one or more surfactants comprise an anionic, cationic, non-ionic, or zwitterionic surfactant, or mixtures thereof; or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above process (12) wherein the one or more surfactants are present in a molar concentration ratio of from about $1\times10^{-5}$M to about 1 M.

The above process (12) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above process (12) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_3Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above process (12) wherein the one or more organic and/or inorganic additives are present in a molar concentration ratio of from about $1\times10^{-2}$M to about 15 M.

The above process (12) wherein the mesoporous material has a pore size (diameter) between about 2 nanometers and about 20 nanometers; or wherein the mesoporous material has a pore size (diameter) between about 2 nanometers and about 13 nanometers.

The above process (12) which is conducted under process conditions sufficient to control pore size and pore size distribution of the metal oxide and crystal structure of nano-sized metal oxide walls.

The above process (12) further comprising heating the gel at a temperature and for a period of time sufficient to tune the structural properties of the mesoporous material.

The above process (12) wherein the gel is heated at a temperature from about 150° C. to about 700° C. for a period from about 1 to about 12 hours; or wherein said heating is sequentially as follows: at a temperature from about 75° C. to about 150° C. for a period from about 1 to about 12 hours; and at a temperature from about 40° C. to about 80° C. for a period from about 1 to about 12 hours; or wherein said heating is sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein said heating is sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

A mesoporous material produced by a process comprising: providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous material.

The above mesoporous material in which the process is a sol-gel micelle based process; or in which micellization and inter-micellar interaction in said process are controlled by said one or more metal precursors, one or more surfactants, one or more interface modifiers, one or more hydrotropic or lyotropic ion precursors, and optionally one or more organic and/or inorganic additives.

The above mesoporous material wherein the heating step comprises: heating the micellar solution at a temperature and for a period of time sufficient to form a dried powder; and heating the dried powder at a temperature and for a period of time sufficient to form the mesoporous material.

The above mesoporous material wherein the micellar solution is heated sequentially as follows: at a temperature from about 75° C. to about 150° C. for a period from about 1 to about 12 hours; and at a temperature from about 40° C. to about 80° C. for a period from about 1 to about 12 hours; or wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above mesoporous material further comprising washing the dried powder with an alcohol for a period of time sufficient to remove organic components therefrom; or further comprising washing the dried powder with ethanol for a period of time sufficient to remove surfactant therefrom.

The above mesoporous material wherein the mesoporous material comprises an oxide, a sulfide, a selenide or a telluride of the following: a transition metal selected from Cr, Zr, Nb, Hf and Ta; a Lanthanide selected from Nd, Sm, Ce and Gd; a post-transition metal comprising Sn; or a mixed metal or a solid acid selected from P—Zr, W—Zr, S—Ti, Sn—Zr and S—Zr; or wherein the mesoporous material comprises: a transition metal oxide selected from $Cr_2O_3$, $ZrO_2$, $Nb_2O_5$, $HfO_2$ and $Ta_2O_5$; a post-transition metal oxide comprising $SnO_2$; and a Lanthanide oxide selected from $CeO_2$, $Nd_2O_3$, $Sm_2O_3$ and $Gd_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

The above mesoporous material wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above mesoporous material wherein the one or more metal precursors are present in a molar concentration ratio of from about $1 \times 10^{-2}$ M to about 10 M.

The above mesoporous material wherein the one or more interface modifiers comprise an aliphatic, alicyclic or aromatic hydrocarbon of between about 1 and about 20 carbon atoms, or mixtures thereof; or wherein the one or more interface modifiers comprise an organic solvent that allows the surfactant to organize itself into inverse micelles; or herein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above mesoporous material wherein the one or more interface modifiers are present in a molar concentration ratio of from about 1 M to about 40 M.

The above mesoporous material wherein the one or more hydrotropic ion precursors comprise $HNO_3$, $NaNO_3$, $KNO_3$, metal iodides, metal thiocyanates, hydrochloric acid, sulfuric acid, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above mesoporous material wherein the one or more hydrotropic or lyotropic ion precursors are present in a molar concentration ratio of from about $1 \times 10^{-2}$ M to about 15 M.

The above mesoporous material wherein the one or more surfactants comprise an anionic, cationic, non-ionic, or zwitterionic surfactant, or mixtures thereof or wherein the one or more surfactants comprise an anionic, cationic, non-ionic, or zwitterionic surfactant, or mixtures thereof or wherein the one or more surfactants comprise an EO/PO copolymer surfactant, or a surfactant represented by the formula $$(HO(CH_2CH_2O)_n(CH_2CH(CH_3)O)_m(CH_2CH_2O)_nH)$$

wherein m and n are the same or different, m is a value from about 10 to about 150, and n is a value from about 5 to about 150, or a surfactant represented by the formula $$(PPO)_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above mesoporous material wherein the one or more surfactants are present in a molar concentration ratio of from about $1 \times 10^{-5}$ M to about 1 M.

The above mesoporous material wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above mesoporous material wherein the one or more inorganic additives comprise aprotic and protic ionic liquids, ethylammonium nitrate (EAN), ethanolammonium nitrate (EOAN), diethanolammonium formate (DEOAF), laponite, $[C_2H_5Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above mesoporous material wherein the one or more organic and/or inorganic additives are present in a molar concentration ratio of from about $1 \times 10^{-2}$ M to about 15 M.

The above mesoporous material wherein the mesoporous material has a pore size (diameter) between about 2 nanometers and about 20 nanometers; or wherein the mesoporous material has a pore size (diameter) between about 2 nanometers and about 13 nanometers.

The above mesoporous material which is conducted under process conditions sufficient to control pore size and pore size distribution of the mesoporous material and crystal structure of nano-sized mesoporous material walls.

A method (1) of controlling nano-sized wall crystallinity and mesoporosity in mesoporous materials, said method comprising: providing a micellar solution comprising one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to control nano-sized wall crystallinity and mesoporosity in the mesoporous materials.

The above method (1) which is a sol-gel micelle based method; or in which micellization and inter-micellar interaction in said method are controlled by said one or more metal precursors, one or more surfactants, one or more interface modifiers, one or more hydrotropic or lyotropic ion precursors, and optionally one or more organic and/or inorganic additives.

The above method (1) wherein the heating step comprises: heating the micellar solution at a temperature and for a period of time sufficient to form a dried powder; and heating the dried powder at a temperature and for a period of time sufficient to form the mesoporous material.

The above method (1) wherein the micellar solution is heated sequentially as follows: at a temperature from about 75° C. to about 150° C. for a period from about 1 to about 12 hours; and at a temperature from about 40° C. to about 80° C. for a period from about 1 to about 12 hours; or wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above method (1) further comprising washing the dried powder with an alcohol for a period of time sufficient to remove organic components therefrom; or further comprising washing the dried powder with ethanol for a period of time sufficient to remove surfactant therefrom.

The above method (1) wherein the mesoporous material comprises an oxide, a sulfide, a selenide or a telluride of the following: a transition metal selected from Cr, Zr, Nb, Hf and Ta; a Lanthanide selected from Nd, Sm, Ce and Gd; a post-transition metal comprising Sn; or a mixed metal or a solid acid selected from P—Zr, W—Zr, S—Ti, Sn—Zr and S—Zr; or wherein the mesoporous material comprises: a transition metal oxide selected from $Cr_2O_3$, $ZrO_2$, $Nb_2O_5$, $HfO_2$ and $Ta_2O_5$; a post-transition metal oxide comprising $SnO_2$; and a Lanthanide oxide selected from $CeO_2$, $Nd_2O_3$, $Sm_2O_3$ and $Gd_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride;

or wherein the metalloid oxide, sulfide, selenide or telluride is selected from a B, Si, Ge, As, Sb, Te, Po and At oxide, sulfide, selenide or telluride.

The above method (1) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above method (1) wherein the one or more metal precursors are present in a molar concentration ratio of from about $1 \times 10^{-2}$ M to about 10 M.

The above method (1) wherein the one or more interface modifiers comprise an aliphatic, alicyclic or aromatic hydrocarbon of between about 1 and about 20 carbon atoms, or mixtures thereof or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above method (1) wherein the one or more interface modifiers are present in a molar concentration ratio of from about 1 M to about 40 M.

The above method (1) wherein the one or more hydrotropic ion precursors comprise $HNO_3$, $NaNO_3$, $KNO_3$, metal iodides, metal thiocyanides, hydrochloric acid, sulfuric acid, or mixtures thereof or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above method (1) wherein the one or more hydrotropic or lyotropic ion precursors are present in a molar concentration ratio of from about $1 \times 10^{-2}$ M to about 15 M.

The above method (1) wherein the one or more surfactants comprise an anionic, cationic, non-ionic, or zwitterionic surfactant, or mixtures thereof; or wherein the one or more surfactants comprise an anionic, cationic, non-ionic, or zwitterionic surfactant, or mixtures thereof; or wherein the one or more surfactants comprise an EO/PO copolymer surfactant, or a surfactant represented by the formula $(HO(CH_2CH_2O)_n(CH_2CH(CH_3)O)_m(CH_2CH_2O)_nH)$ wherein m and n are the same or different, m is a value from about 10 to about 150, and n is a value from about 5 to about 150, or a surfactant represented by the formula $(PPO)_x(PEO)_y(PPO)_z$ wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above method (1) wherein the one or more surfactants are present in a molar concentration ratio of from about $1 \times 10^{-5}$ M to about 1 M.

The above method (1) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above method (1) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_5Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above method (1) wherein the one or more organic and/or inorganic additives are present in a molar concentration ratio of from about $1 \times 10^{-2}$ M to about 15 M.

The above method (1) wherein the mesoporous material has a pore size (diameter) between about 2 nanometers and about 20 nanometers; or wherein the mesoporous material has a pore size (diameter) between about 2 nanometers and about 13 nanometers.

The above method (1) which is conducted under process conditions sufficient to control pore size and pore size distribution of the mesoporous material and crystal structure of nano-sized mesoporous material walls.

A method (2) of tuning structural properties of mesoporous materials, said method comprising: selecting one or more metal precursors, one or more surfactants, one or more interface modifiers, one or more hydrotropic or lyotropic ion precursors, and optionally one or more organic and/or inorganic additives; providing a micellar solution comprising said one or more metal precursors, one or more surfactants, one or more interface modifiers, one or more hydrotropic or lyotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous materials.

The above method (2) wherein the structural properties are selected from unit cell size, pore size, pore type, pore volume, mesostructure type, and surface morphology.

The above method (2) which is a sol-gel micelle based method; or in which micellization and inter-micellar interaction in said method are controlled by said one or more metal precursors, one or more surfactants, one or more interface modifiers, one or more hydrotropic or lyotropic ion precursors, and optionally one or more organic and/or inorganic additives.

The above method (2) wherein the heating step comprises: heating the micellar solution at a temperature and for a period of time sufficient to form a dried powder; and heating the dried powder at a temperature and for a period of time sufficient to form the mesoporous material.

The above method (2) wherein the micellar solution is heated sequentially as follows: at a temperature from about 75° C. to about 150° C. for a period from about 1 to about 12 hours; and at a temperature from about 40° C. to about 80° C. for a period from about 1 to about 12 hours; or wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours; or wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The above method (2) further comprising washing the dried powder with an alcohol for a period of time sufficient to remove organic components therefrom; or further comprising washing the dried powder with ethanol for a period of time sufficient to remove surfactant therefrom.

The above method (2) wherein the mesoporous material comprises an oxide, a sulfide, a selenide or a telluride of the following: a transition metal selected from Cr, Zr, Nb, Hf and Ta; a Lanthanide selected from Nd, Sm, Ce and Gd; a post-transition metal comprising Sn; or a mixed metal or a solid acid selected from P—Zr, W—Zr, S—Ti, Sn—Zr and S—Zr; or wherein the mesoporous material comprises: a transition metal oxide selected from $Cr_2O_3$, $ZrO_2$, $Nb_2O_5$, $HfO_2$ and $Ta_2O_5$; a post-transition metal oxide comprising $SnO_2$; and a Lanthanide oxide selected from $CeO_2$, $Nd_2O_3$, $Sm_2O_3$ and $Gd_2O_3$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

The above method (2) wherein the one or more metal precursors are selected from a metal halide, a metal phosphate, a metal acetate, a metal nitrate, a metal alkoxide, and a $M_xO_y$ oxide that is capable of dissolving in $HNO_3$; or wherein the one or more metal precursors comprise a metal halide; or wherein the one or more metal precursors comprise $HfCl_4$ or $NbCl_4$; or wherein the one or more metal precursors are selected from a transition metal precursor, a Lanthanide metal precursor, a post-transition metal precursor, a metalloid precursor, and mixtures thereof; or wherein the transition metal precursor comprises a Group 3-12 transition metal precursor; or wherein the Group 3-12 transition metal precursor is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor; or wherein the transition metal precursor is selected from a Group 6-12 transition metal precursor; or wherein the Group 6-12 transition metal precursor is selected from a Cr, Mo, W, Mn, Tc, Re, Fe, Ru, Os, Co, Rh, Ir, Ni, Pd, Pt, Cu, Ag, Au, Zn, Cd and Hg precursor; or wherein the Group 6-12 transition metal precursor is selected from a Mn, Fe, Co, Ni, Cu and Zn precursor; or wherein the Lanthanide metal precursor is selected from a La, Ce, Pr, Nd, Pm, Sm, Eu, Gd, Tb, Dy, Ho, Er, Tm, Yb and Lu precursor; or wherein the Lanthanide metal precursor is selected from a Ce, Sm and Gd precursor; or wherein the post-transition metal precursor is selected from an Al, Ga, In, Tl, Sn, Pb and Bi precursor; or wherein the metalloid precursor is selected from a B, Si, Ge, As, Sb, Te, Po and At precursor.

The above method (2) wherein the one or more metal precursors are present in a molar concentration ratio of from about $1 \times 10^{-2}$M to about 10 M.

The above method (2) wherein the one or more interface modifiers comprise an aliphatic, alicyclic or aromatic hydrocarbon of between about 1 and about 20 carbon atoms, or mixtures thereof; or wherein the one or more interface modifiers comprise an organic solvent that allows the surfactant to organize itself into inverse micelles; or wherein the one or more interface modifiers comprise n-butanol, pentanol, hexanol, higher carbon-containing alcohols, trimethyl benzene (TMB), acetylacetonate, lauric acid, toluene, benzene, cyclohexene, a carboxylic group-containing organic molecule, terpene, terpenoid hydrocarbons, citrus terpenes, d-limonene, or mixtures thereof.

The above method (2) wherein the one or more interface modifiers are present in a molar concentration ratio of from about 1 M to about 40 M.

The above method (2) wherein the one or more hydrotropic ion precursors comprise $HNO_3$, $NaNO_3$, $KNO_3$, metal iodides, metal thiocyanides, hydrochloric acid, sulfuric acid, or mixtures thereof; or wherein the one or more hydrotropic ion precursors comprise a hydrotropic ion selected from $NO_3^-$, $SCN^-$, $Br^-$, and $I^-$, and the one or more lyotropic ion precursors comprise a lyotropic ion selected from $Cl^-$.

The above method (2) wherein the one or more hydrotropic or lyotropic ion precursors are present in a molar concentration ratio of from about $1 \times 10^{-2}$ M to about 15 M.

The above method (2) wherein the one or more surfactants comprise an anionic, cationic, non-ionic, or zwitterionic surfactant, or mixtures thereof; or wherein the one or more surfactants comprise an anionic, cationic, non-ionic, or zwitterionic surfactant, or mixtures thereof; or wherein the one or more surfactants comprise an EO/PO copolymer surfactant, or a surfactant represented by the formula $(HO(CH_2CH_2O)_n(CH_2CH(CH_3)O)_m(CH_2CH_2O)_nH)$ wherein m and n are the same or different, m is a value from about 10 to about 150, and n is a value from about 5 to about 150, or a surfactant represented by the formula $(PPO)_x(PEO)_y(PPO)_z$ wherein PPO is polypropylene oxide, PEO is polyethylene oxide, and x, y and z are values sufficient for the surfactant to have a hydrophilic-lipophilic balance (HLB) from about 1 to about 18; or wherein the one or more surfactants comprise $(HO(CH_2CH_2O)_{20}(CH_2CH(CH_3)O)_{30}(CH_2CH_2O)_{20}H)$, $(HO(CH_2CH_2O)_{26}(CH_2CH(CH_3)O)_{40}(CH_2CH_2O)_{26}H)$, $(HO(CH_2CH_2O)_{129}(CH_2CH(CH_3)O)_{56}(CH_2CH_2O)_{129}H)$, $(HO(CH_2CH_2O)_{20}(CH_2CH(CH_3)O)_{70}(CH_2CH_2O)_{20}H)$, or $(HO(CH_2CH_2O)_{97}(CH_2CH(CH_3)O)_{69}(CH_2CH_2O)_{97}H)$; or wherein the one or more surfactants comprise a Triton® surfactant, a Tween® surfactant, a star type branched surfactant, glucose, an AB or BC polymer surfactant, wherein A is polyisoprene butylene, B is styrene, and C is selected from glucose, amine, carboxyl group-containing compound, and polyethylene glycol (PEG); a natural surfactant, or a gemini (dimeric) surfactant.

The above method (2) wherein the one or more surfactants are present in a molar concentration ratio of from about $1 \times 10^{-5}$ M to about 1 M.

The above method (2) wherein the one or more organic additives comprise urea, decane, octane, benzene, trimethyl benzene or mesitylene (TMB), substituted benzene, polyethylene glycol, thiourea, ethylene diamime, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

The above method (2) wherein the one or more inorganic additives comprise aprotic and protic ionic liquids, ethylammonium nitrate (EAN), ethanolammonium nitrate (EOAN), diethanolammonium formate (DEOAF), laponite, $[C_2H_3Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

The above method (2) wherein the one or more organic and/or inorganic additive are present in a molar concentration ratio of from about $1 \times 10^{-2}$ M to about 15 M.

The above method (2) wherein the mesoporous material has a pore size (diameter) between about 2 nanometers and about 20 nanometers; or wherein the mesoporous material has a pore size (diameter) between about 2 nanometers and about 13 nanometers.

The above method (2) which is conducted under process conditions sufficient to control pore size and pore size distribution of the mesoporous material and crystal structure of nano-sized mesoporous material walls.

A process (13) for preparing methyl levulinate or methyl lactate, said process comprising: providing a carbohydrate or biomass source material; providing a solid acid catalyst comprising an acid modified mesoporous material; and reacting the carbohydrate or biomass source material in the presence of the solid acid catalyst at a temperature and pressure and for a period of time sufficient to form the methyl levulinate or methyl lactate; wherein the mesoporous material is prepared by the above process (1).

The above process (13) in which the preparation of the mesoporous material is a sol-gel micelle based process; or in which micellization and inter-micellar interaction are controlled by said one or more metal precursors, one or more surfactants, one or more interface modifiers, one or more hydrotropic or lyotropic ion precursors, and optionally one or more organic and/or inorganic additives.

The above process (13) wherein the solid acid catalyst comprises: sulfated zirconium oxide, phosphated zirconium oxide or tungstated zirconium oxide; sulfated titanium oxide, phosphated titanium oxide or tungstated titanium oxide; sulfated tin oxide, phosphated tin oxide or tungstated tin oxide; or sulfated silicon oxide, phosphated silicon oxide or tungstated silicon oxide.

The above process (13) wherein the mesoporous material is selected from $ZrO_2$, $TiO_2$, $SnO$ and $SiO_2$; or wherein the mesoporous material is selected from a transition metal oxide, sulfide, selenide or telluride; a Lanthanide metal oxide, sulfide, selenide or telluride; a post-transition metal oxide, sulfide, selenide or telluride; a metalloid oxide, sulfide, selenide or telluride; and mixtures thereof; or wherein the transition metal oxide, sulfide, selenide or telluride comprises a Group 3-12 transition metal oxide, sulfide, selenide or telluride; or wherein the Group 3-12 transition metal oxide, sulfide, selenide or telluride is selected from a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the transition metal oxide is selected from a Group 6-12 transition metal oxide, sulfide, selenide or telluride; or wherein the Group 6-12 transition metal oxide, sulfide, selenide or telluride is selected from a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride; or wherein the Group 6-12 transition metal oxide, sulfide, selenide or telluride is selected from a Mn, Fe, Co, Ni, Cu and Zn oxide, sulfide, selenide or telluride; or wherein the Lanthanide metal oxide, sulfide, selenide or telluride is selected from a La, Ce, Pr, Nd, Pm, Sm, Eu, Gd, Tb, Dy, Ho, Er, Tm, Yb and Lu oxide, sulfide, selenide or telluride; or wherein the Lanthanide metal oxide, sulfide, selenide or telluride is selected from a Ce, Sm and Gd oxide, sulfide, selenide or telluride; or wherein the post-transition metal oxide, sulfide, selenide or telluride is selected from an Al, Ga, In, Tl, Sn, Pb and Bi oxide, sulfide, selenide or telluride; or wherein the metalloid oxide, sulfide, selenide or telluride is selected from a B, Si, Ge, As, Sb, Te, Po and At oxide, sulfide, selenide or telluride.

The above process (13) wherein the acid is selected from sulfuric acid (as sulfate source), phosphoric acid (as phosphate source) and ammonium metatungstate (as tungsten source); or wherein the acid is a Lewis acid or a Brönsted acid.

The above process (13) wherein the reacting is sufficient to preserve mesoporosity and crystalline structure of the mesoporous material.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All reactions in the following examples were performed using as-received starting materials without any purification.

Example 1

Synthesis of Mesoporous Materials—General Procedure
Single or Multi Component Systems Various transition metal (Cr, Zr, Nb, Hf, Ta), lanthanides (Nd, Sm, Gd), post-transition metals (Sn), mixed metals (W—Zr), and solid acids (P—Zr, W—Zr, and S—Zr) were synthesized with the following procedure. Metal precursor(s) was (were) mixed with an acidic surfactant solution at room temperature. The clear solution was aged (RT-120° C.) for a certain time (1 hour to 2 weeks) and the resulting product (powder or film or gel) was subjected to heating cycles (150° C. to 700° C.) for a certain time (1 hour to 12 hours). The amounts of ingredients used, aging time and temperature, and heating time and duration along with the visual observations are set forth in FIG. 1.

Mesoporous Carbon (UCT-33)

As-synthesized UCT-14 (mesoporous $SiO_2$) was heated to 900° C. for 2 hours under an argon atmosphere. The resulting black powder was put in a warm 0.5 M NaOH solution and stirred for 6 hours to etch out the silica and obtain mesoporous carbon.

Mesoporous Semiconductors (UCT-28-31)

In a procedure for the synthesis of mesoporous metal sulfides, transition metals (Cd, Zn or Cd—Zn mixture) were mixed with an acidic surfactant solution at room temperature. The clear solution was aged (120° C.) for a certain time (1 hour) and the obtained gel was added to urea (urea:metal was 1:1) which was in a glass autoclave. The glass autoclave was sealed and placed in an oven (65° C.-75° C.) for 3-6 hours. The resulting powders were washed with water and then with ingredients used, aging time and temperature, and heating time and duration, along with visual observations are set forth in FIG. 1.

Mesoporous materials were prepared in accordance with the conditions set forth in FIG. 1. A listing of the mesoporous materials is set forth in FIG. 2 including properties exhibited by these mesoporous materials. FIGS. 3-43 depict properties exhibited by these mesoporous materials.

FIG. 2 describes 26 new families of materials identified with acronyms UCT-#. For example, UCT-28 represents zinc sulfide materials that have controllable pore sizes. The other materials from UCT-29 through UCT-53 are summarized accordingly in FIG. 2. FIGS. 3-43 depict properties exhibited by these mesoporous materials UCT-28 through UCT-53.

Semiconductors (CdS, ZnS, $Cd_xZn_yS$ (x+y=1))

FIG. 3 shows the low-angle and wide-angle PXRD diffraction patterns of synthesized mesoporous ZnS samples at two different temperatures. The ZnS samples have low angle peak position of 4.0 nm and 6.4 nm for samples synthesized at 65° C. and 75° C. respectively. A shift from 6.4 nm to 4.0 nm by decreasing the reaction temperature indicates formation of smaller nano-crystals upon reducing the reaction temperature. Generally speaking, the low angle peak position for the mesoporous materials indicates the average diameter of nano-crystals which form the mesostructure by random close packing for UCT materials. Therefore, the lower the temperatures the smaller are the nano-crystals. A similar conclusion can be reached from the wide-angle PXRD patterns also shown in FIG. 3. Despite both samples having the same crystal structure, the peaks have different full width at half maxima values (FWHM). The mesoporous ZnS samples synthesized at 65° C. have FWHM of 0.95° 2θ, however, the one synthesized at 75° C. has a FWHM of 1.25° 2θ, indicating a larger nano-crystal.

Figure 4:
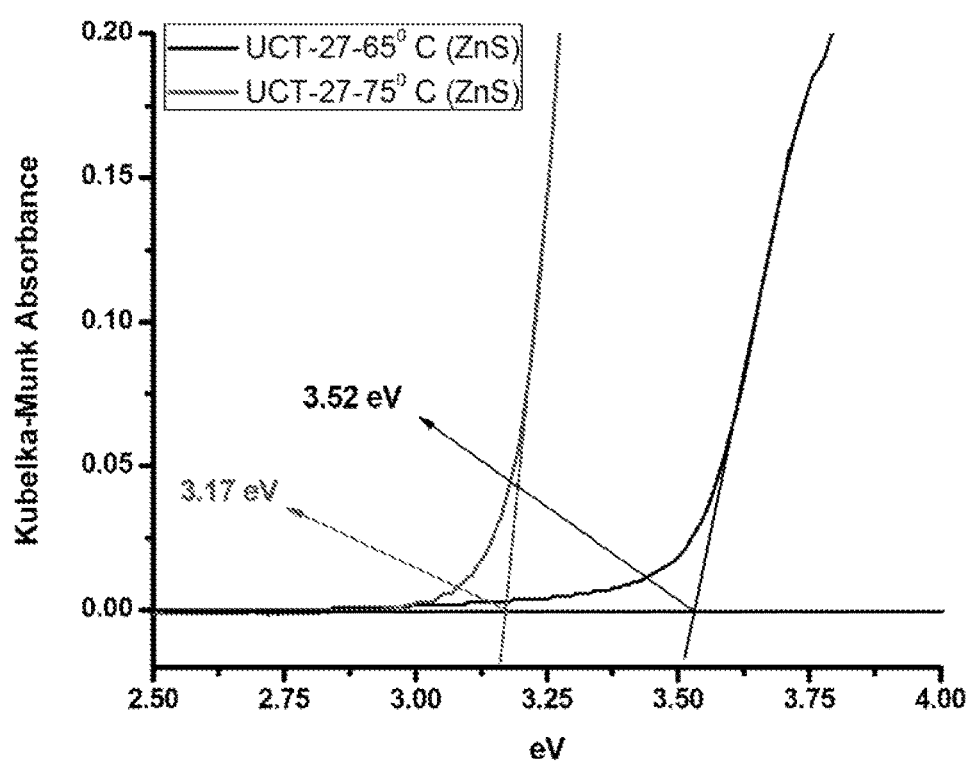
FIG. 4 depicts Diffuse Reflectance UV-Vis spectra of UCT-28 (ZnS) materials. The X-axis is converted to eV for precise band-gap determination.
Figure 5:
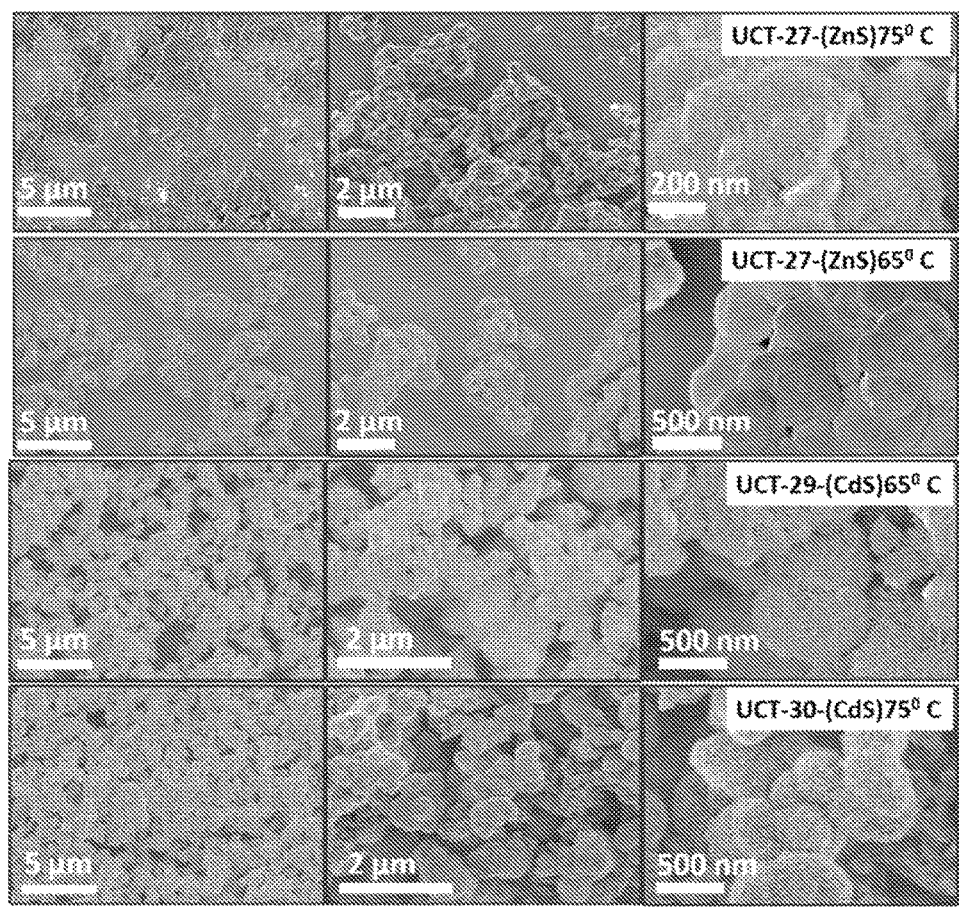
FIG. 5 depicts scanning electron microscopy (SEM) images of mesoporous ZnS (UCT-28) and CdS (UCT-29 and UCT-30) synthesized at different temperatures.

Crystalline size dependent band gaps are known properties for nano-sized semiconductor materials due to nano confinement effects. More specifically, decreasing the particle size of any semiconductor causes a blue shift at the absorption edge. This phenomenon allows one to precisely tune the band gap. FIG. 4 shows the absorption edges of two mesoporous ZnS samples synthesized at different temperatures. The band gap of the mesoporous ZnS semiconductors shifts from 3.17 eV to 3.52 eV upon change of the nano-crystal size from 6.4 nm (UCT-28-75° C.) to 4.0 nm (UCT-28-65° C.).

CdS (UCT-29 and UCT-30) and ZnS (UCT-28) consist of micron sized particles (FIG. 5) ZnS samples synthesized at two different temperatures have different surface features. UCT-28-(ZnS) 65° C. has a smoother surface morphology and on the other hand UCT-28-(ZnS) 75° C. has more flake like features. The higher crystallinity of UCT-28-(ZnS) 75° C. is responsible for the surface morphology change. A similar surface morphology change has also been observed for mesoporous CdS samples. Increasing the reaction temperature from 65° C. (UCT-29) to 75° C. (UCT-30) causes better defined surface features. The increase of the reaction temperature causes faster decomposition of urea to release S. The reaction between these metals (Zn and Cd) and S is almost instantaneous as is the reaction rate so the crystalline sizes and band gaps are all dependent on the urea decomposition.

Figure 6:
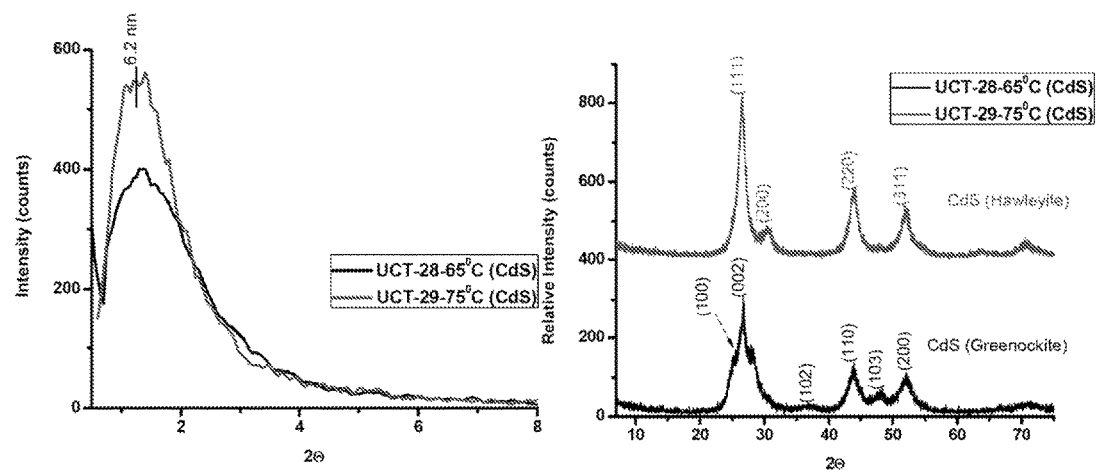
FIG. 6 depicts low angle and wide angle PXRD patterns of UCT-29 (CdS) and UCT-30 (CdS) materials.

FIG. 6 shows the low and wide angle PXRD patterns of mesoporous CdS samples synthesized at two different temperature of 65° C. (UCT-29) and 75° C. (UCT-30). Both UCT-29 and UCT-30 have a low angle diffraction peak position centered at 6.2 nm, indicating both samples have similar nano-crystalline sizes. Different from the UCT-28 (ZnS), UCT-29, and UCT-30 do not show a shift at the low angle PXRD line position. However, mesoporous CdS samples synthesized at different temperatures have different crystal structures. UCT-29 has a crystal structure of Greenockite and UCT-30 has a crystal structure of Hawleyite. The differences in the crystal structures cause different band gap values. UCT-29 has a band gap value of 2.37 eV on the other hand UCT-30 has a band gap value of 2.42 eV. These numbers are very close to their bulk values because generally a band gap tuning upon crystal size change is observed for nano-crystals smaller than 6.0 nm (as in UCT-28).

Figure 7:
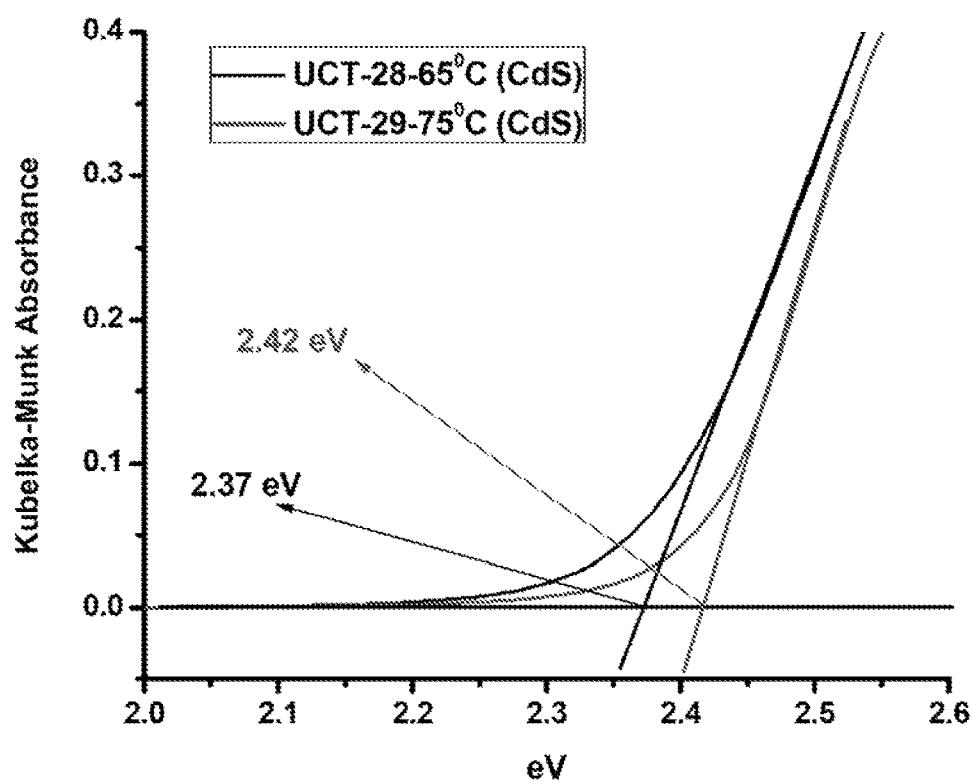
FIG. 7 depicts Diffuse Reflectance UV-Vis spectra of UCT-29 (CdS) and UCT-30 (CdS) materials. The X-axis is converted to eV for precise band-gap determination.

FIG. 7 shows diffuse reflectance UV-Vis spectra of UCT-29 and UCT-30 (CdS) materials. X-axis is converted to eV for precise band-gap determination.

Figure 8:
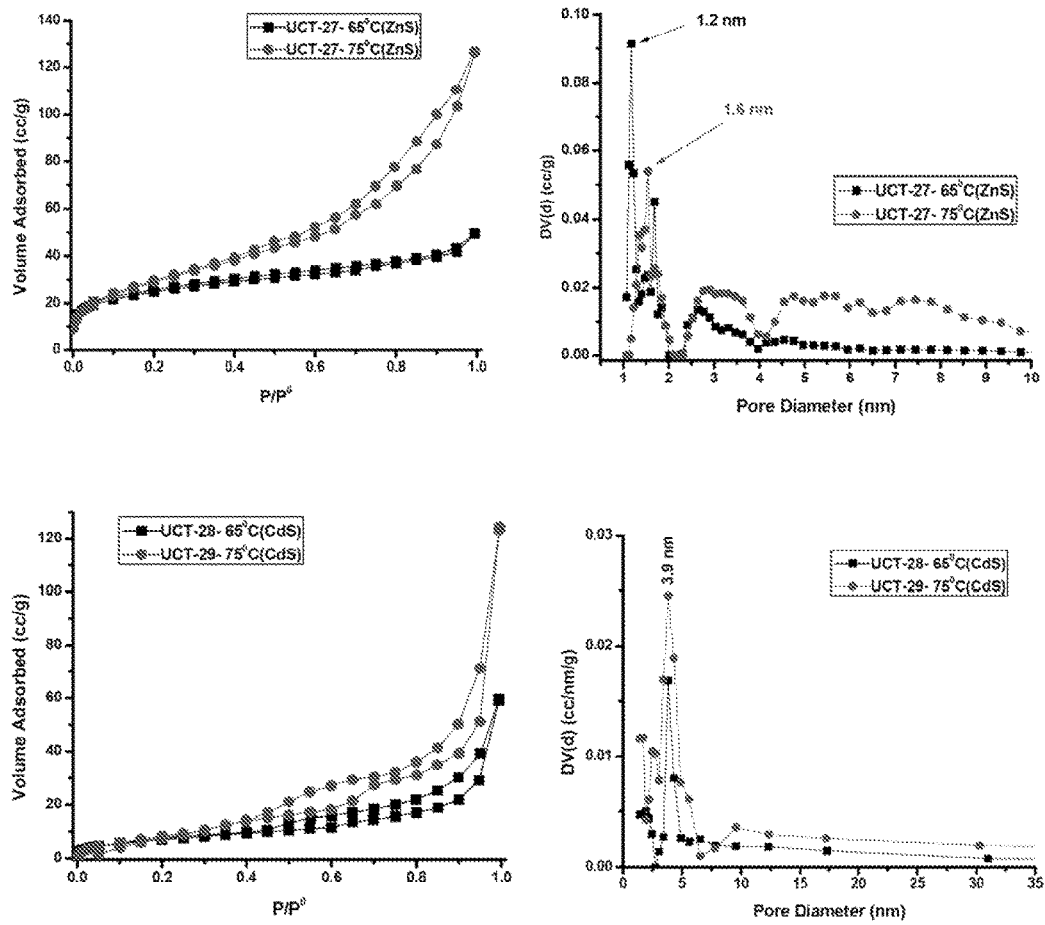
FIG. 8 depicts $N_2$ sorption isotherms, density functional theory (DFT) (UCT-28 ZnS) and Barret-Joyner-Halenda (BJH) desorption (UCT-29 CdS and UCT-30 CdS) pore size distributions of mesoporous ZnS (UCT-28) and CdS (UCT-29 CdS and UCT-30 CdS) samples.

FIG. 8 shows the $N_2$ sorption isotherms and pore size distributions of mesoporous ZnS (UCT-28) and CdS (UCT-29 and UCT-30) samples. Mesoporous ZnS synthesized at 65° C. (UCT-28-65° C.) shows typical Type I isotherms which are characteristic for microporous materials. Considering a nanoparticle size of 4.0 nm, this is an expected observation. DFT pore size distributions show a pore size of 1.2 nm. The pores are formed by interconnecting interparticle voids. Mesoporous ZnS synthesized at 75° C. (UCT-28-75° C.) also shows typical Type I isotherms with an additional strong uptake close to the saturation point. The pore size is expanded to 1.6 nm. The strong uptake close to the saturation pressure can be due to formation of macroporosity. The surface areas obtained are 85.7 and 108.5 $m^2/g$ for UCT-28-75° C. and UCT-28-65° C. respectively. Mesoporous CdS samples (UCT-29 and UCT-30) show a small adsorption step at moderate pressures and a strong adsorption at higher pressures. They both have a pore size distribution of 3.9 nm. Different from the mesoporous ZnS samples, mesoporous CdS samples have relatively low surface areas of 27.1 $m^2/g$ for UCT-29 and 36.6 $m^2/g$ for UCT-30. The low porosity and surface area can be due to the degassing temperature. All mesoporous materials were degassed at 120° C., which may not be enough to remove physisorbed water inside the pore structure. Therefore, these values might not reflect the real surface areas and pore volumes.

Figure 9:
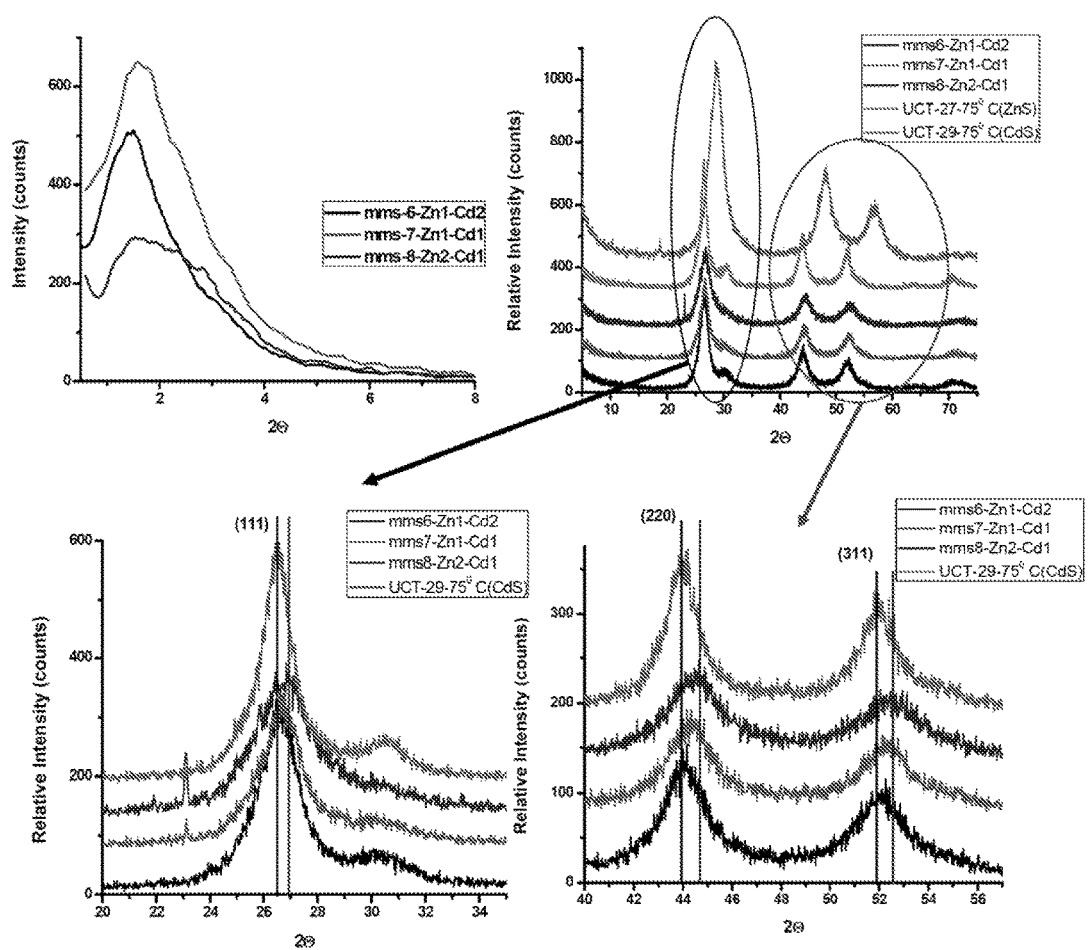
FIG. 9 depicts low angle and wide angle PXRD patterns of UCT-31 ($Cd_xZn_yS$ (x+y=1)) materials.

The process of this disclosure also allows the synthesis of single or mixed metal sulfides. FIG. 9 shows the low and wide angle PXRD patterns of mesoporous $Cd_xZn_yS$ (x+y=1) (UCT-31). More detailed structural parameters and nomenclature can be found in FIG. 2. The mixed metal sulfides show low angle PXRD diffraction similar to single metal systems. Low angle diffraction centered around 5.6 nm is obtained regardless of the variations in metal ratios. Wide angle PXRD diffraction patterns of UCT-31 materials show the same crystal structure as the single metal sulfides, indicating that incorporation of the $2^{nd}$ component occurs by framework doping by substituting Cd atoms with Zn atoms. Framework doping can be realized from the wide angle peak position shifts. Replacing a relatively bigger $Cd^{2+}$ ion with $Zn^{2+}$ causes a shift in the peak positions to a higher degree. The shift in major diffraction lines (111), (220), and (311) can be seen in FIG. 9. All major peaks are shifted by approximately 1 degree upon $Zn^{2+}$ incorporation into the framework. Even at high Zn loadings (as high as 86 atomic %) the peak positions do not change as much as expected since the correct compositions are different than the target compositions. FIG. 2 shows EDAX analysis results. The results indicate that the measured Zn amount is always lower than the target loading. Probably the reason is a faster reaction rate of S with Cd than Zn. In other words, thermodynamically more favorable reactions between cadmium and sulfur may occur. Since urea decomposition is not complete, one can expect to have unreacted urea and Zn in the final product.

Figure 10:
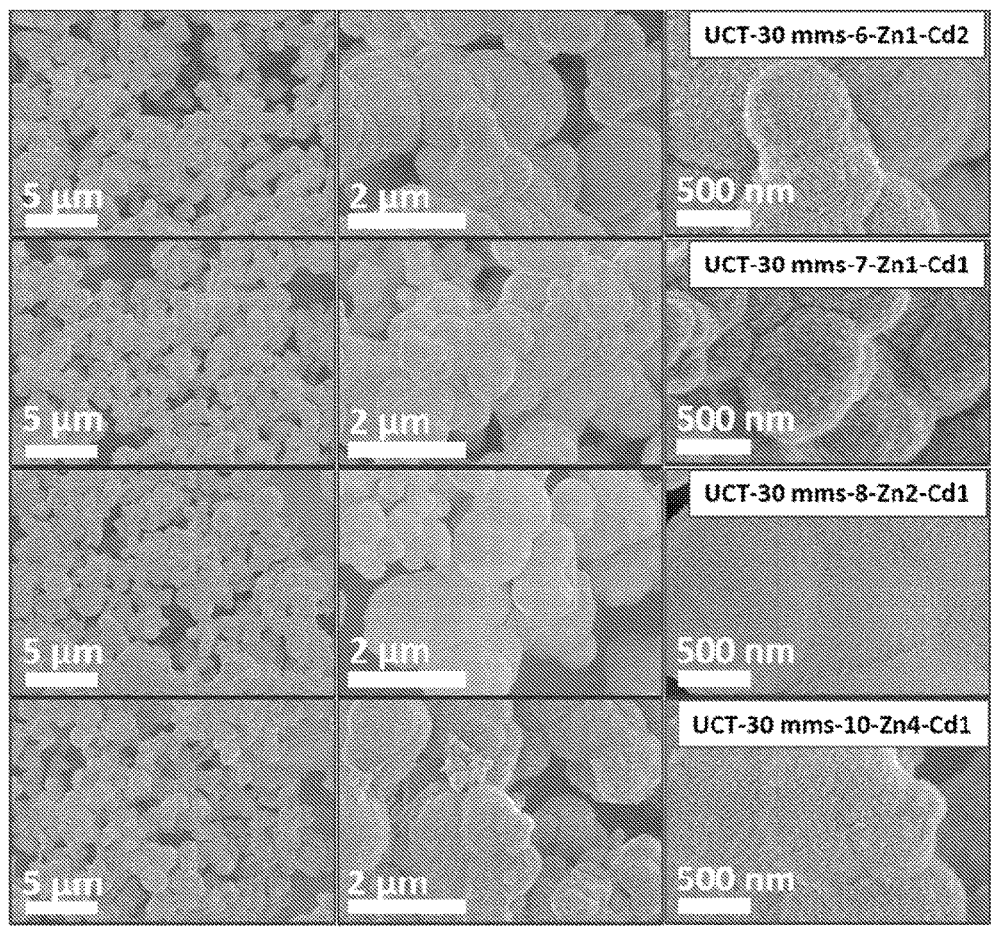
FIG. 10 depicts SEM images of mesoporous UCT-31 ($Cd_xZn_yS$ (x+y=1)) materials.

SEM images of mixed metal sulfides (UCT-31) show similar morphologies with their single metal analogues (FIG. 10). All mixed metal sulfides have similar micron sized spherical morphologies and no evidence was found for formation of a second phase. Despite low magnification, images for mixed metal sulfides look identical, but different surface morphologies were observed at high magnification. Mixed metal sulfides with higher Cd ratios (UCT-31-mms6 and mms7) show similar surface features with UCT-30 (CdS) and similarly metal sulfides with higher Zn ratios (UCT-31-mms8 and mms10) show similar surface features with UCT-28 (ZnS) (compare FIG. 5 and FIG. 10).

Figure 11:
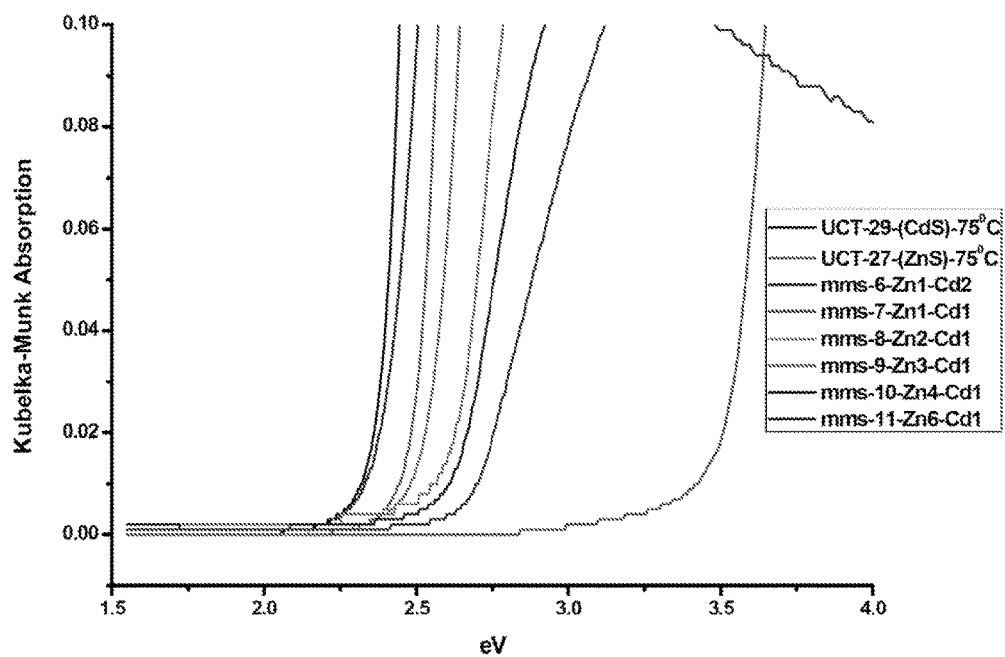
FIG. 11 depicts Diffuse Reflectance UV-Vis spectra of mixed metal sulfides (UCT-31) along with UCT-28 (ZnS) and UCT-30 (CdS) materials. The X-axis is converted to eV for precise band-gap determination.

Modifying composition of mixed metal sulfides by also keeping them nano-sized can lead to precise control of the band gap energies of semiconductor materials. Incorporation of Zn in to CdS nanocrystals causes a band gap shift from 2.42 eV (band gap of mesoporous CdS) to 3.52 eV (band gap of mesoporous ZnS). FIG. 11 shows the DR-UV-Vis spectra of mixed metal sulfides with different Cd and Zn amounts. The band gaps of mixed metal sulfides shift from 2.39 eV (4% Zn) to 2.68 eV (76% Zn).

Figure 12:
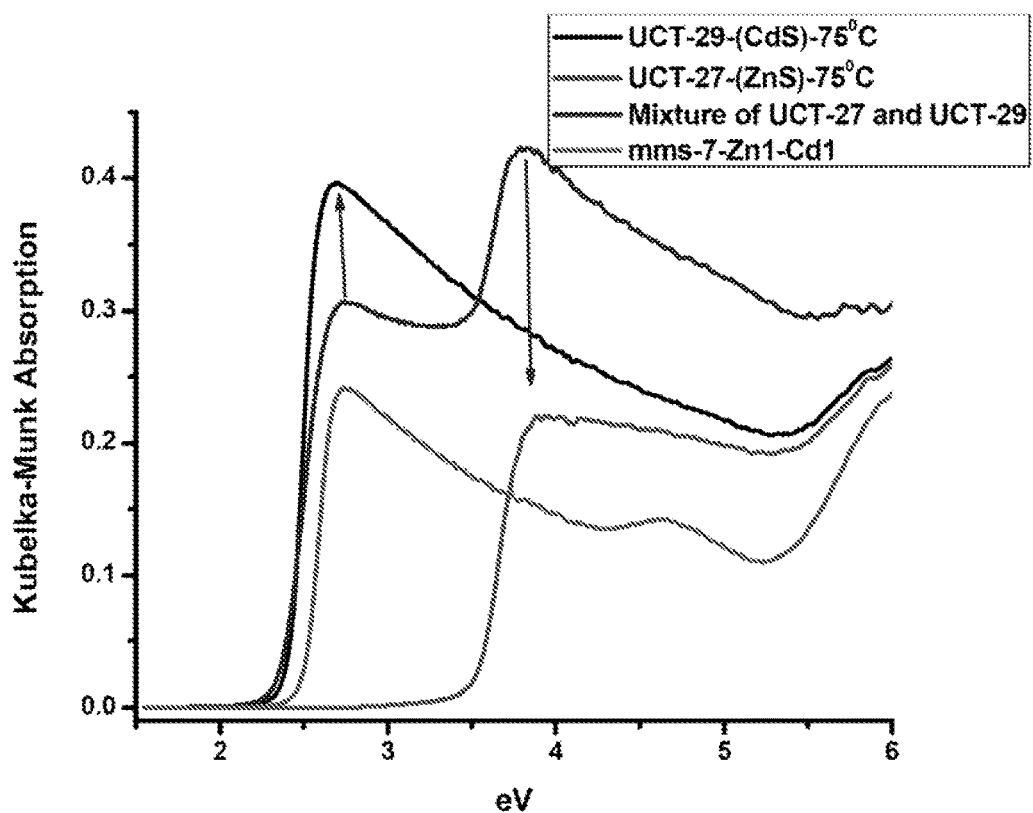
FIG. 12 depicts Diffuse Reflectance UV-Vis spectra of mixed metal sulfide (UCT-31) along with UCT-28 (ZnS), UCT-30 (CdS), and UCT-30+UCT-28 (CdS+ZnS) materials. The X-axis is converted to eV for precise band-gap determination.

Formation of a second phase is one of the widely encountered problems in synthesis of mixed metal systems not only for sulfides but also for oxides. The problem arises from different formation rates and thermodynamic stabilities of the desired phases over single phases. XRD might not be conclusive in all cases. Therefore, several DR-UV-Vis spectra were collected and compared for single metal sulfides (UCT-28 and UCT-30), mixed metal sulfide (UCT-31), and a physical mixture of single metal sulfides. FIG. 12 shows this comparison. Since absorbance is additive, the spectrum for single metal sulfide mixtures shows identical absorbance line shapes of individual spectra. However, mixed metal sulfides (UCT-31) have totally different line shapes than both single metal sulfides and physical mixtures. The absorption edge is shifted and there is no extra absorption edge for the mixed metal sulfide sample indicating formation of a single phase material with a tuned band gap.

Variations at the Reaction Rate (Sn and Cr)

Having a controlled reaction rate is one of the crucial requirements in traditional sol-gel chemistry for the synthesis of mesoporous materials. Since a fast reaction rate means inorganic-inorganic interaction is more favorable than organic-inorganic interaction resulting with bulk non-porous oxides. Similarly too slow reactions causes poorly condensed inorganic framework and causes thermally unstable mesoporous materials. The most powerful tools employed to succeed a moderate reaction rate are temperature, pH, humidity, concentration, and additives (organic and inorganic). However, reaction rates do not play a significant role in the synthesis for mesoporous materials. Depending on the nature of inorganic system used, one can desire a very fast reaction rate (Sn) or a very slow reaction rate (Cr). Only criteria are confining inorganic precursors in core of inverted micelles for mesoporous materials. This simple approach allows one to synthesize mesoporous materials by inorganic materials in various regions of the periodic table.

All mesoporous tin oxide samples were synthesized in a glove box because of air sensitivity tin butoxide precursors. After the initial preparation of gels with surfactants, tin precursors, and butanol; acid was added directly. Since acidic media are catalysts for hydrolysis and condensation of tin butoxide, an instant gel formation was observed. After stirring the gel another 1 h at room temperature, this became rigid. The rigid gel was aged at different times (4 h for UCT-32 and 12 h for UCT-33) in an oven running at 120° C. Aging promotes further condensation of the inorganic framework and helps solvent removal. Good quality mesoporous materials are generally obtained after removing excess solvent. Since inorganic precursor loaded inverted micelles are packed in a more ordered fashion in concentrated gels than dilute gels. After solvent evaporation, the thick gel was calcined in air.

Figure 13:
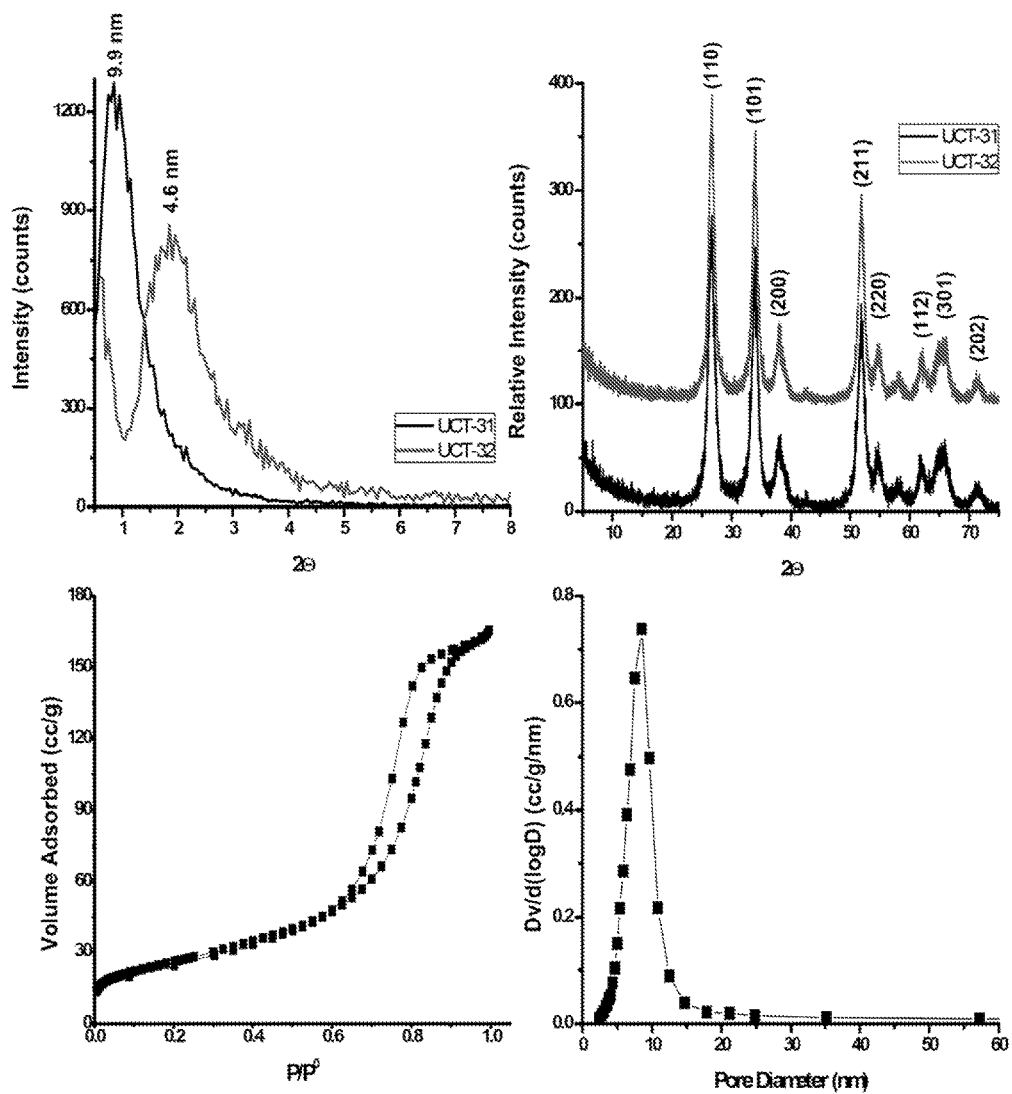
FIG. 13 depicts low angle and wide angle PXRD patterns of mesoporous tin oxide SnO (UCT-32 and UCT-33) materials; and $N_2$ sorption isotherms and BJH desorption pore size distributions of UCT-32.

FIG. 13 shows the low angle and high angle PXRD patterns of mesoporous tin oxide materials (UCT-32 and UCT-33) aged for different durations. Despite both samples having similar wide angle diffraction patterns corresponding to the $SnO_2$ structure, they have different low angle peak positions. UCT-33 sample has a peak position of 4.6 nm however UCT-32 has a peak position of 9.9 nm. The low angle peak position shifts so the nanoparticle size depends on the aging time. Longer aging times cause formation of smaller nanoparticles (UCT-33), probably because of more sintered inorganic particles being trapped in inverted micelles. For shorter durations of aging (UCT-32), the inorganic framework is not fully condensed and removing the physical barrier (surfactant) at this stage by calcination causes a further sintering of nanoparticles to form bigger ones. $N_2$ sorption measurements of UCT-32 show a Type IV adsorption isotherm with a Type I hysteresis loop indicating a regular cylindrical mesopore structure. The BJH desorption isotherm gives a mesopore size distribution centered at 8.5 nm. The mesopore size obtained for UCT-32 sample is too big to originate from interparticle voids. Generally speaking mesoporous materials have a mesopore size distribution at least 3-4 nm smaller than their low angle peak positions. A compatible low angle peak position and peak position indicates formation of mesopores by poor packing of nanoparticles.

Figure 14:
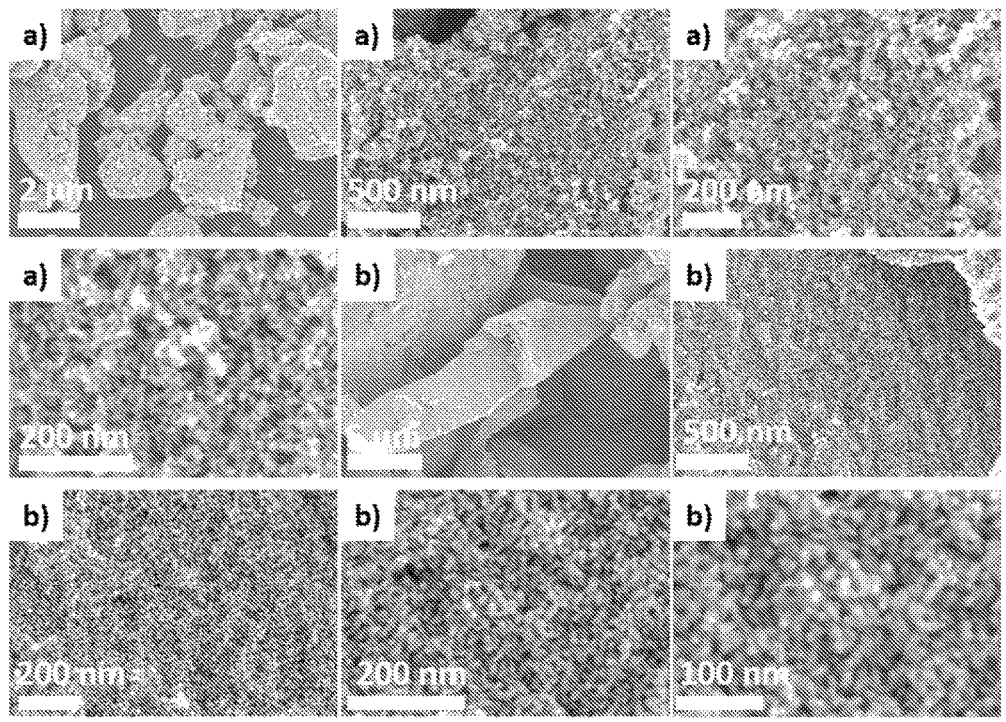
FIG. 14 depicts SEM images of mesoporous tin oxide samples a) UCT-32 (SnO) and b) UCT-33 (SnO).

FIG. 14 shows SEM images of UCT-32(a) and UCT-33(b) samples. At the macro scale both samples seem to be composed of big flakes. This type of morphology has also been observed for mesoporous materials synthesized by alkoxide sources. Generally speaking alkoxide sources have a tendency to form film like structures. However, higher magnification images show differences. The UCT-32 sample consists of loosely packed nanoparticles (as predicted by combined low angle diffraction and $N_2$ sorption measurements) and have sponge-like textures. High magnification images of UCT-33 indicate a very tight packing of nanoparticles.

Figure 15:
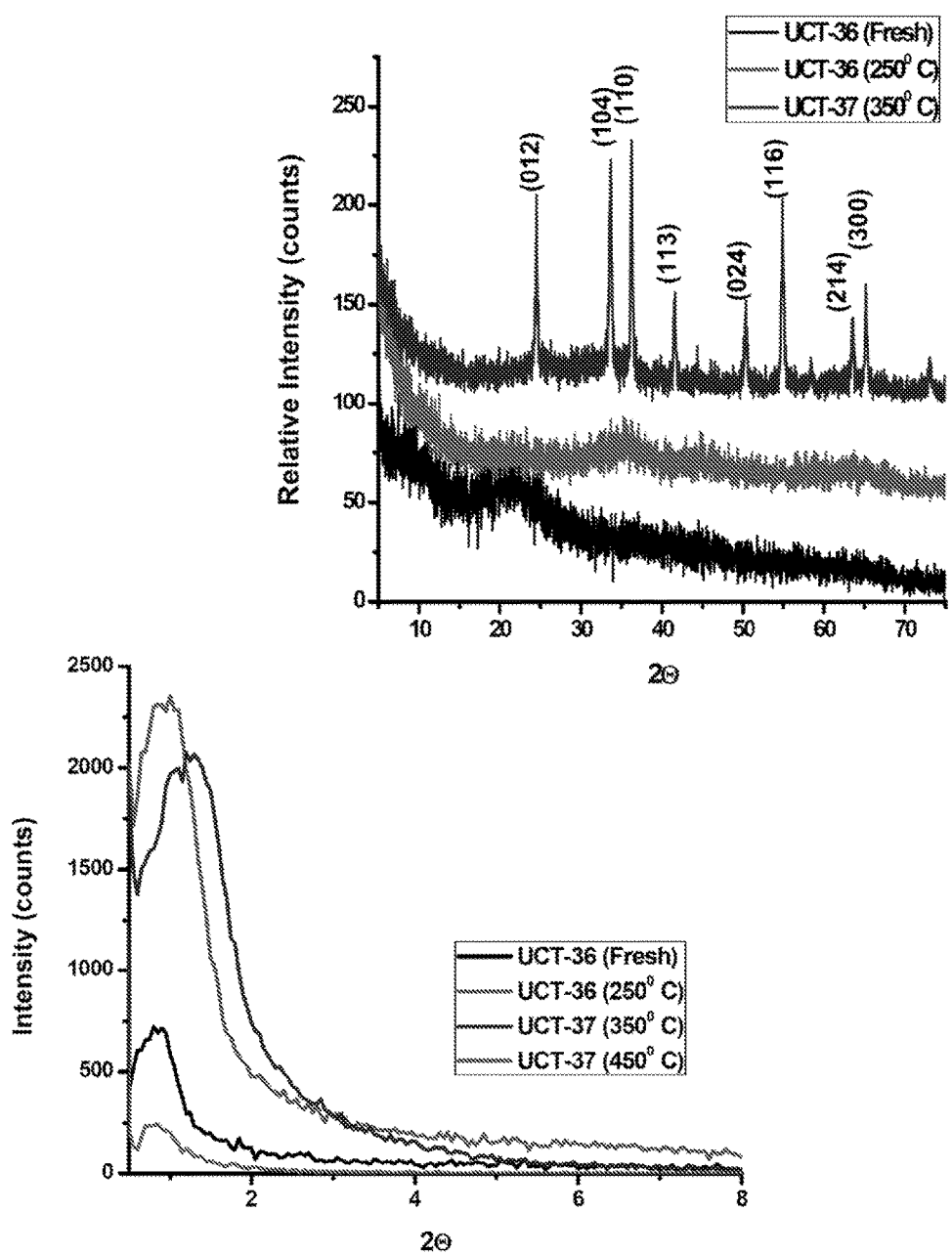
FIG. 15 depicts low angle and wide angle PXRD patterns of mesoporous chromium oxide $Cr_2O_3$ (UCT-37 and UCT-38) materials.

Different from the mesoporous tin oxide materials, the synthesis of mesoporous chromium requires long aging times (as long as 6 days). The reason for this long aging is the weak solubility and slow condensation rate of the chromium source. The reaction gel is almost six times more dilute than regular gels. Long aging time assures essential condensation before the solvent evaporates. Higher aging temperatures (>70° C.) results in crystallization of chromium out of the reaction gel. FIG. 15 shows the low and wide angle PXRD patterns of mesoporous chromium oxide (UCT-37 and UCT-38), nomenclature is based on the crystal structure. Heat treatments below 350° C. result in an amorphous structure (UCT-37). Any heat treatment above 350° C. is enough to crystallize the framework and the structure is $Cr_2O_3$ (UCT-38). Despite the diffraction lines have very low intensity; the lines are quite intense to originate from a nanocrystal. One plausible explanation is further sintering of nanocrystals to form crystalline, nonporous domains. This means that the mesostructure disappears. This can be confirmed by a very weak low angle peak for UCT-38 (450° C.). As synthesized material (UCT-37 (Fresh)) has a weak low angle diffraction centered at 10.5 nm. The low angle diffraction becomes more intense and shifts to higher angles after heating UCT-37 (Fresh) sample at higher temperatures. UCT-37 (250° C.) has a peak position of 9.6 nm and UCT-38 (350° C.) has a peak position of 6.9 nm. A unit cell decrease upon heat treatment is unusual for mesoporous materials. The opposite trend in unit cell shift is probably due to the film-like nature of the final product. In other words, a net-like network structure possibly keeps nanoparticles together as in a film form.

Figure 16:
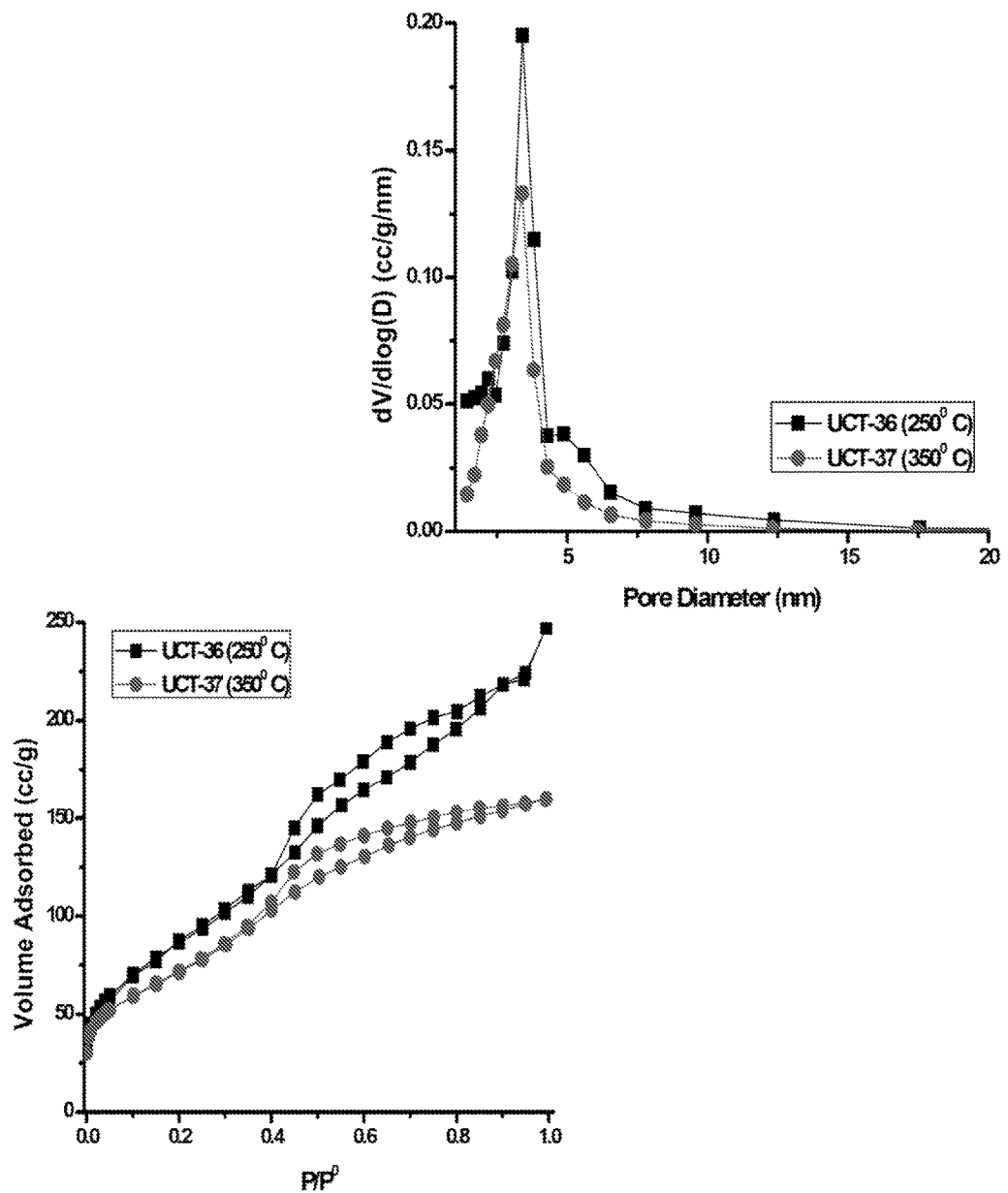
FIG. 16 depicts $N_2$ sorption isotherms and BJH desorption pore size distributions of UCT-37 ($Cr_2O_3$ at 250° C.) and UCT-38 ($Cr_2O_3$ at 350° C.).

$N_2$ sorption measurements were conducted on UCT-37 (250° C.) and UCT-38 (350° C.) (FIG. 16). Both samples have characteristic Type IV adsorption isotherm indicating a mesopore structure. However, different than other mesoporous materials, mesoporous chromium oxide (UCT-37 and UCT-38) samples show a Type III hysteresis loop for desorption isotherm. A Type III hysteresis loop is a mismatching adsorption and desorption isotherm in a wide relative pressure range and suggests a slit like mesopore structure. BJH desorption pore size distributions are sharp and centered around 3.5 nm for both samples. BET surface areas are 324.7 $m^2/g$ and 265.8 $m^2/g$ for UCT-37 and UCT-38 respectively. These numbers lead to mesoporous chromium oxide samples with the highest surface areas among all mesoporous materials.

Figure 17:
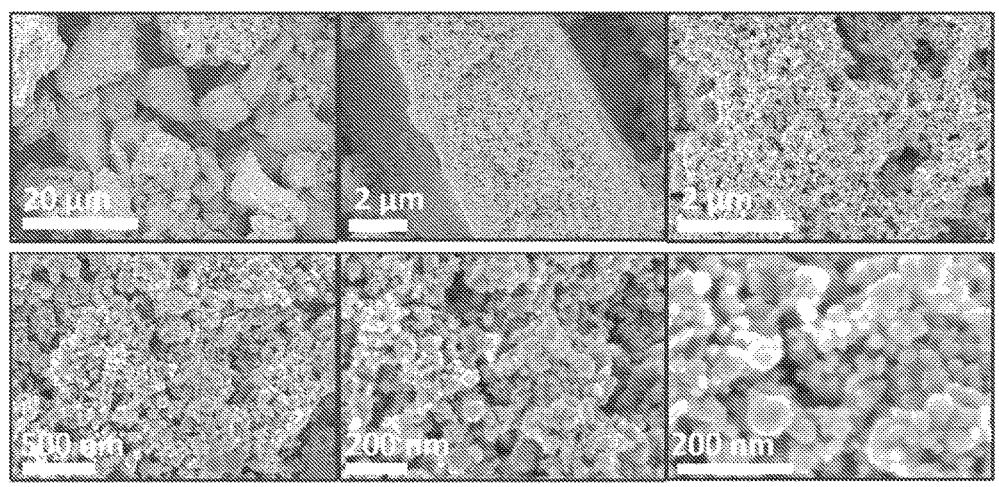
FIG. 17 depicts SEM images of mesoporous chromium oxide UCT-38 ($Cr_2O_3$ at 350° C.) sample.

FIG. 17 shows the SEM images of UCT-37 (350° C.) at different magnification. Lower magnification images are similar with other mesoporous materials which form films (Sn, Zr, Si, Ti). At higher magnifications, the general structure of the material is similar to other mesoporous materials, aggregated nanoparticles. The particle sizes are not as uniform as mesoporous tin oxide samples (compare FIG. 14 and FIG. 16). The temperature at which material becomes crystalline and the mesostructure starts disappearing (FIG. 15) is 350° C.

Nanocasting (C)

Carbon materials with high surface area are one of the widely used materials in many areas such as adsorption materials, catalyst supports, and anode materials. Syntheses of mesoporous carbon materials by nanocasting mesoporous silica have been widely investigated. One of the important findings is the role of interconnecting channels. After filling these channels with carbon, they become the backbone of the structure by supporting the mesostructure. Therefore, nanocasting with MCM-41 does not yield mesoporous carbon. Another important finding is the total carbon content of mesoporous template. Generally speaking, the use of surfactants as the only carbon source results in poorly ordered materials. Therefore, extra carbon sources (sucrose) are impregnated to increase the amount of carbon amount in the mesopores before the carbonization step. Moreover, nanocasting the mesopore structure also gives additional useful information about the template material.

Figure 18:
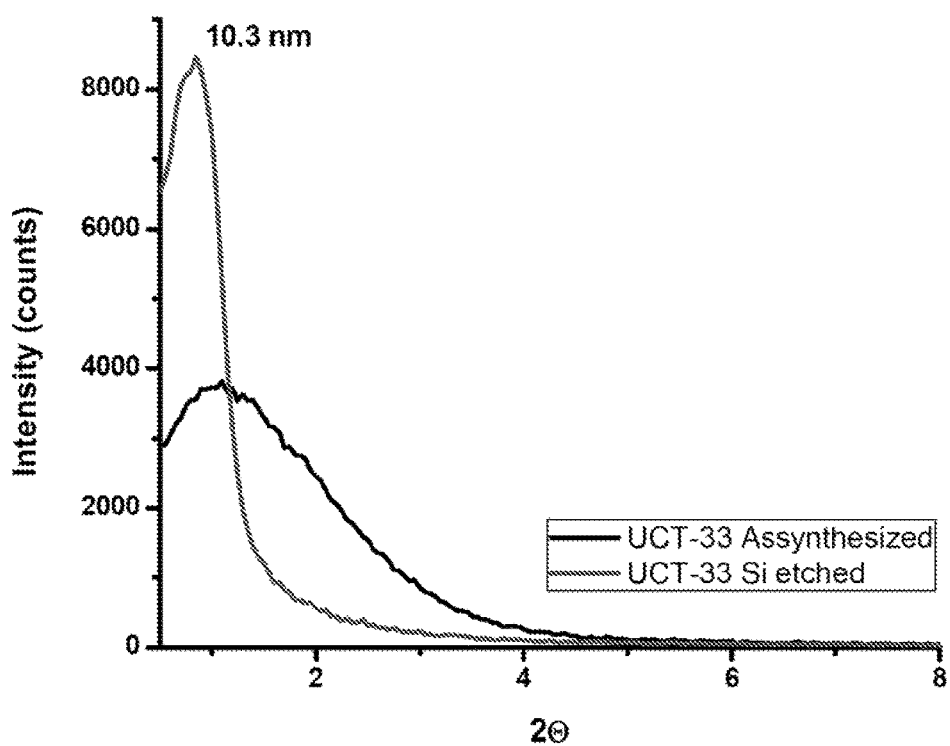
FIG. 18 depicts low angle PXRD patterns of as synthesized and Si-etched mesoporous carbon (UCT-34).

In accordance with this disclosure, mesoporous carbon is synthesized by using mesoporous silicon dioxide (UCT-14). No additional carbon is introduced and surfactant is the only carbon source used. One can use other mesoporous materials as templates for the synthesis of mesoporous carbon. FIG. 18 shows the low angle PXRD diffraction patterns of as synthesized and Si-etched mesoporous carbon. The as synthesized material has broader and lower intensities at low angle diffraction than the Si-etched carbon. The reason is that the electron density gradient is higher for the etched sample and so is the intensity. This material preserves the mesostructure even after very high temperature treatment for carbonization.

Figure 19:
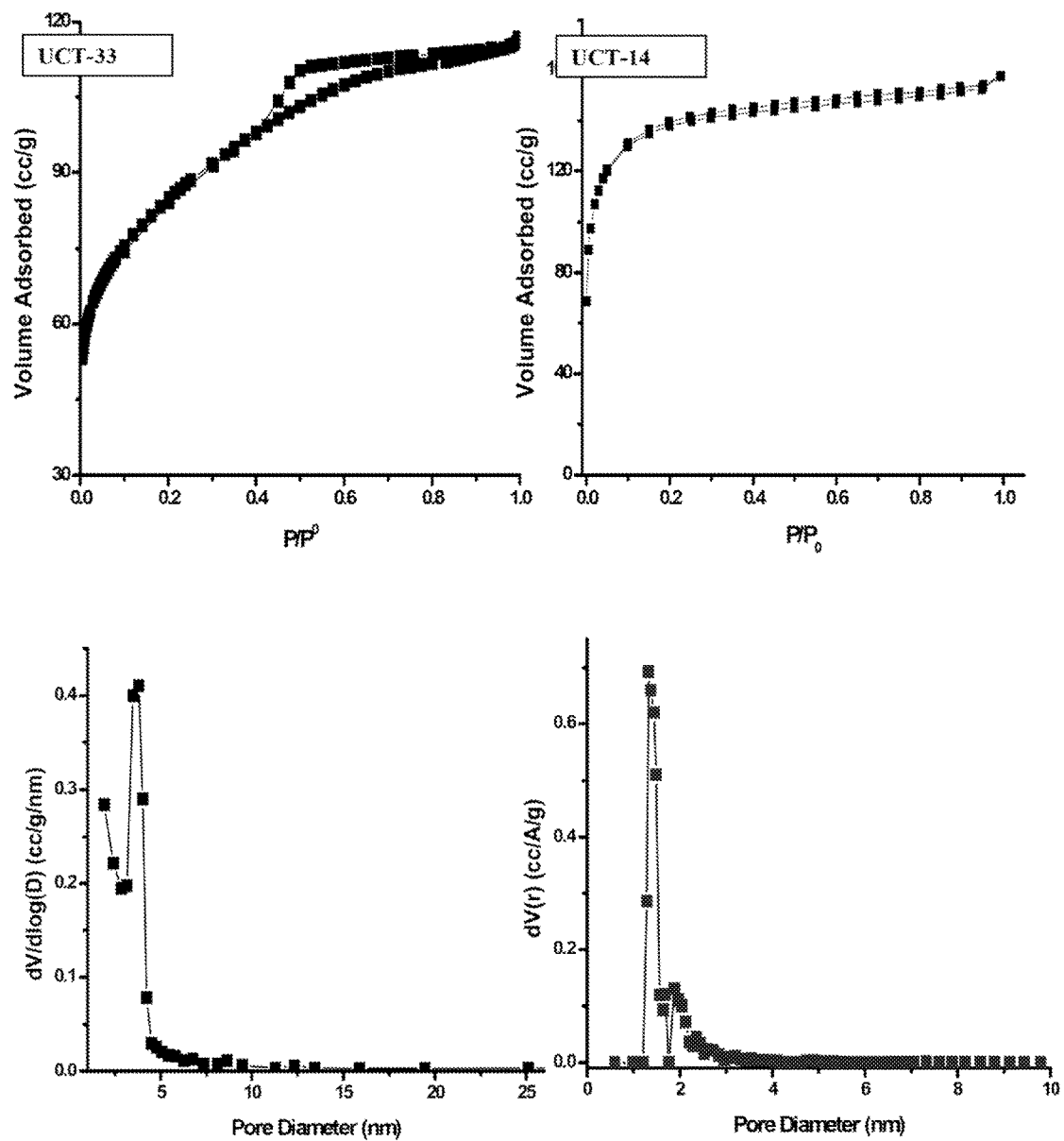
FIG. 19 depicts $N_2$ sorption isotherms and pore size distributions of UCT-14 ($SiO_2$ at 450° C.) and UCT-34.

Mesoporous silica sample (UCT-34) shows a Type IV adsorption isotherm followed by a Type I hysteresis loop indicating a regular mesopore structure (FIG. 19). BJH desorption pore size distribution gives a mesopore size of 3.7 nm. Unlike mesopore carbon, UCT-14 silica template has a Type I adsorption isotherm and no hysteresis loop indicating a microporous structure. The DFT pore size distribution of UCT-14 silica template is 1.4 nm. A description of UCT-14 can be found, for example, in U.S. Patent Application Ser. No. 61/705,370, filed Sep. 25, 2012, and U.S. Patent Application Ser. No. 61/705,372, filed Sep. 25, 2012.

Figure 20:
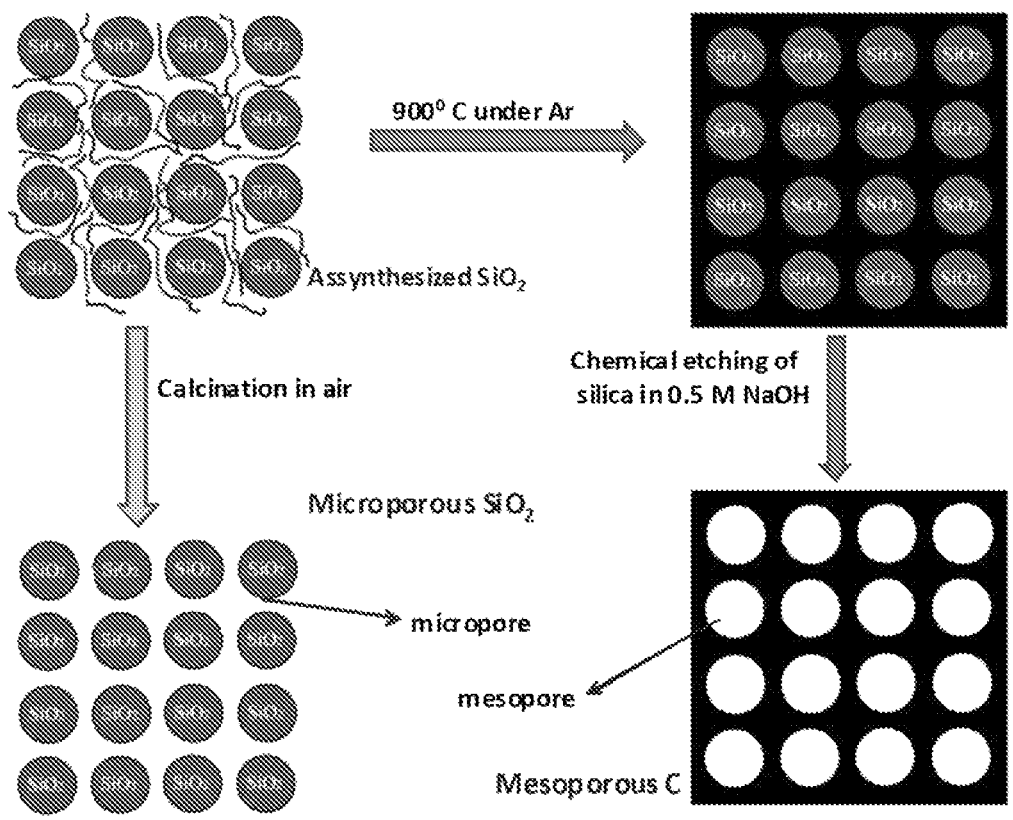
FIG. 20 depicts the formation mechanism of microporous silica UCT-14 ($SiO_2$ at 450° C.) and mesoporous carbon UCT-34.

Use of microporous silica (UCT-14 (450° C.)) as a hard template to synthesize mesoporous carbon (UCT-34) gives important information about the nature of mesoporous materials. FIG. 20 shows the suggested formation mechanism of mesoporous carbon and microporous silica template. The model for microporous silica is also the same for all mesoporous materials. One of the important findings is the existence of interconnecting channels. These channels are filled with surfactant, since after carbonization these channels become the framework and the material preserves the mesostructure and porosity after removal of the silica template. This observation supports the correctness of the suggested model. Another important finding is the formation of nanocrystals in the reverse micelles. Etching of these silica nanoparticles leaves a mesopore behind. By looking at the size of mesopores (3.7 nm) in the carbon material (UCT-34) one can get an idea about the initial sizes of these nanoparticles. This size (3.7 nm) is close to the size of a micelle formed by Pluronic® P123 surfactant. Last but not least, inorganic precursor uses the entire inverted micelle instead of the hydrated core of the inverted micelle. This is very likely since alkoxide sources can also interact with the hydrophobic corona region. The situation may not be the same for nitrate sources which presumably will only be accumulated in the core region. For example, as synthesized microporous manganese (UCT-1) has a low angle peak position of 3.1 nm. A description of UCT-1 can be found, for example, in U.S. Patent Application Ser. No. 61/705,370, filed Sep. 25, 2012, and U.S. Patent Application Ser. No. 61/705,372, filed Sep. 25, 2012.

Figure 21:
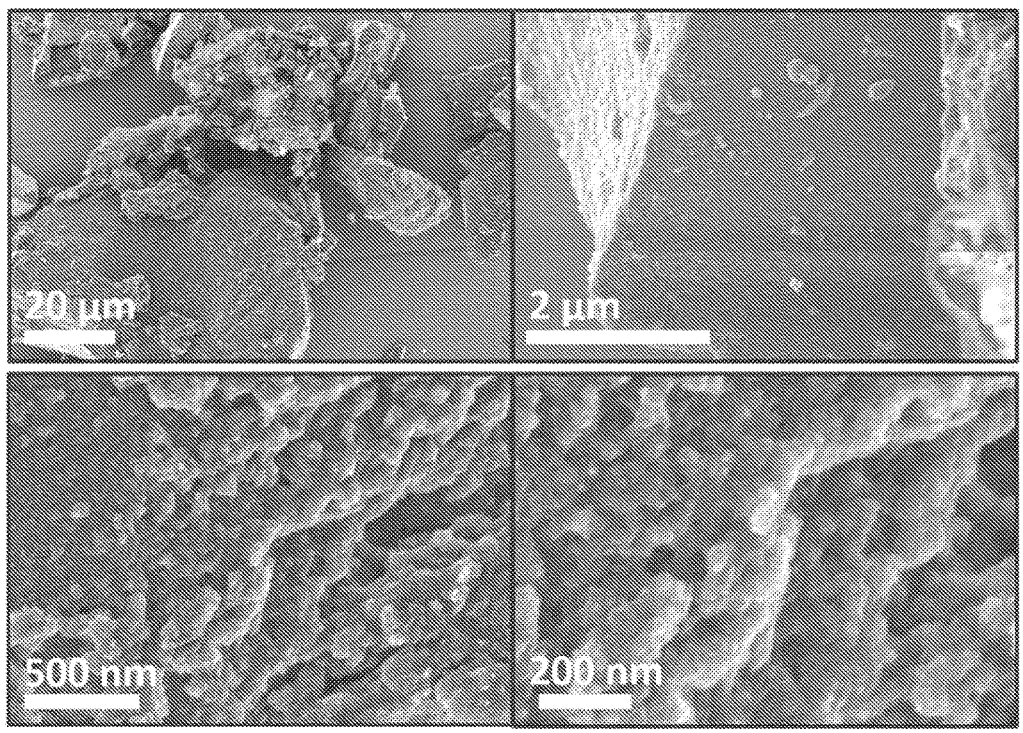
FIG. 21 depicts SEM images of mesoporous carbon UCT-34.

FIG. 21 shows SEM images of mesoporous carbon UCT-34.

Transition Metal Oxides (Nb and Hf)

Figure 22:
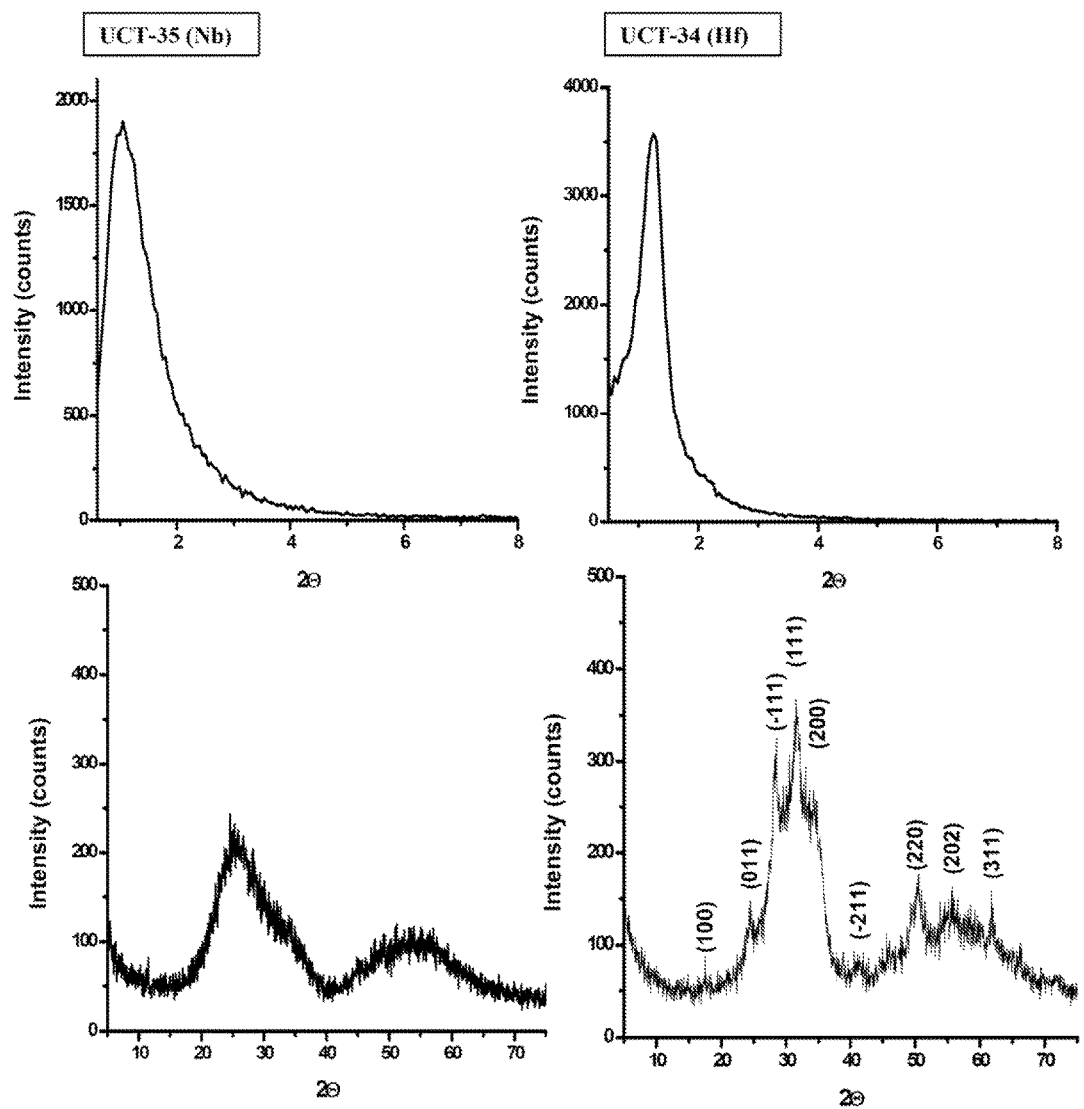
FIG. 22 depicts low angle and wide angle PXRD patterns of mesoporous niobium oxide (UCT-36) and hafnium oxide (UCT-35) materials.

A limited number of nitrate and alkoxide sources used in making mesoporous oxides gives a limited number of materials. Therefore, the synthesis of mesoporous niobium (UCT-36) and hafnium (UCT-35) oxides with chloride sources makes the choice of source even more important. In addition, use of a lyotropic ion (Cl$^-$) especially in dense micellar solutions is known to be problematic. However, by the current approach chloride sources do not cause a problem. UCT-35 (Hf) and UCT-36 (Nb) both have a single low angle diffraction line with positions of 6.9 nm and 8.3 nm, respectively (FIG. 22). This is consistent with other mesoporous materials. Despite UCT-35 having a crystal structure of $HfO_2$, UCT-36 (Nb) shows an amorphous structure.

Figure 23:
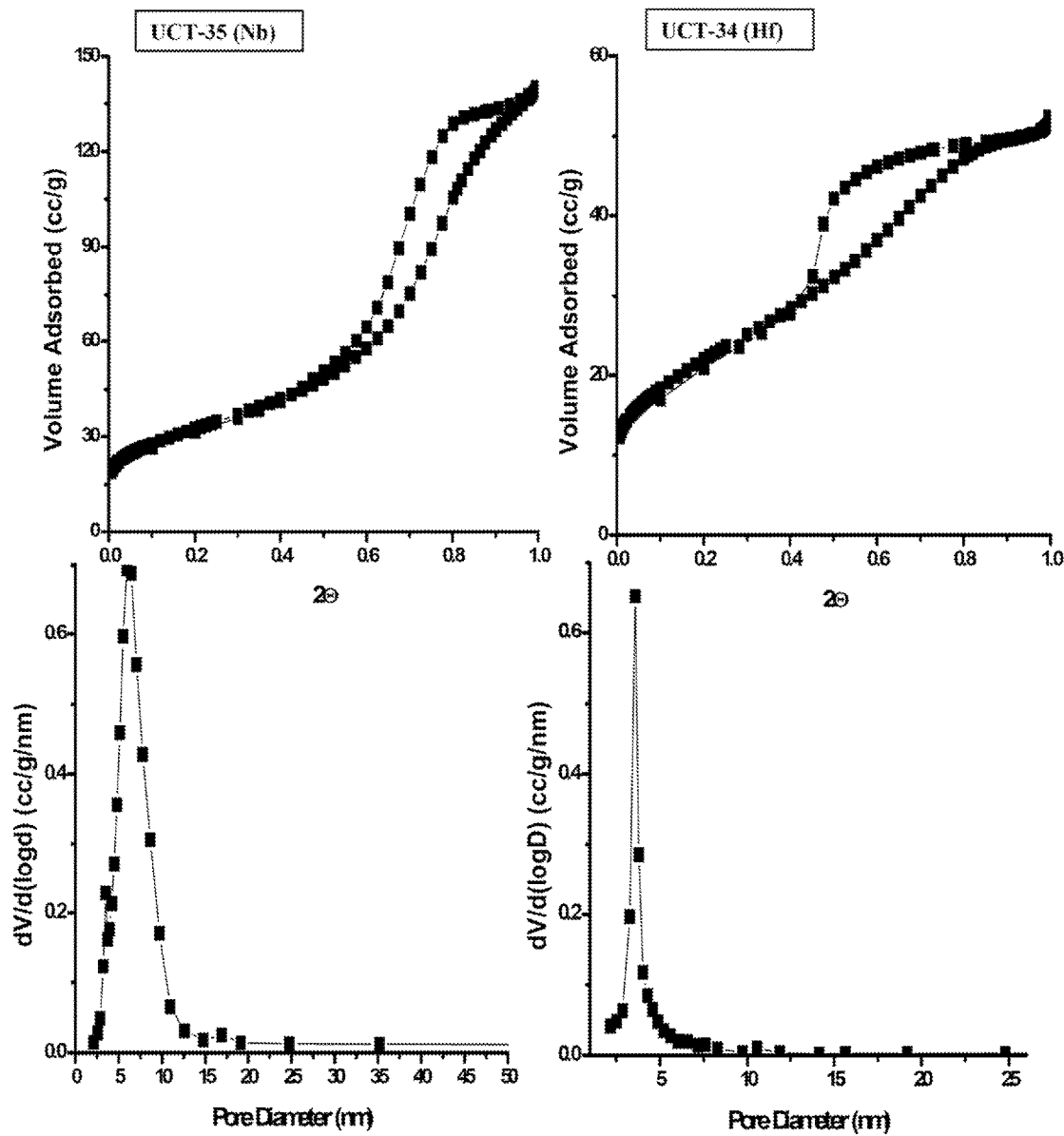
FIG. 23 depicts $N_2$ sorption isotherms and BJH desorption pore size distributions of mesoporous niobium oxide (UCT-36) and hafnium oxide (UCT-35) materials.

Both Hf (UCT-35) and Nb (UCT-36) have Type IV adsorption isotherms and a Type I hysteresis loop (FIG. 23). UCT-36 has a $N_2$ uptake at relatively higher pressure than UCT-35 indicating a larger mesopore size. BJH desorption pore sizes are 3.6 nm and 6.1 nm for UCT-35 and UCT-36 respectively. Differences of mesopore sizes might arise from the different thermodynamic stability of Nb and Hf nanoparticles. In other words, upon calcination of as synthesized samples there are different expansions of the unit cell so the mesopore sizes can be controlled.

Figure 24:
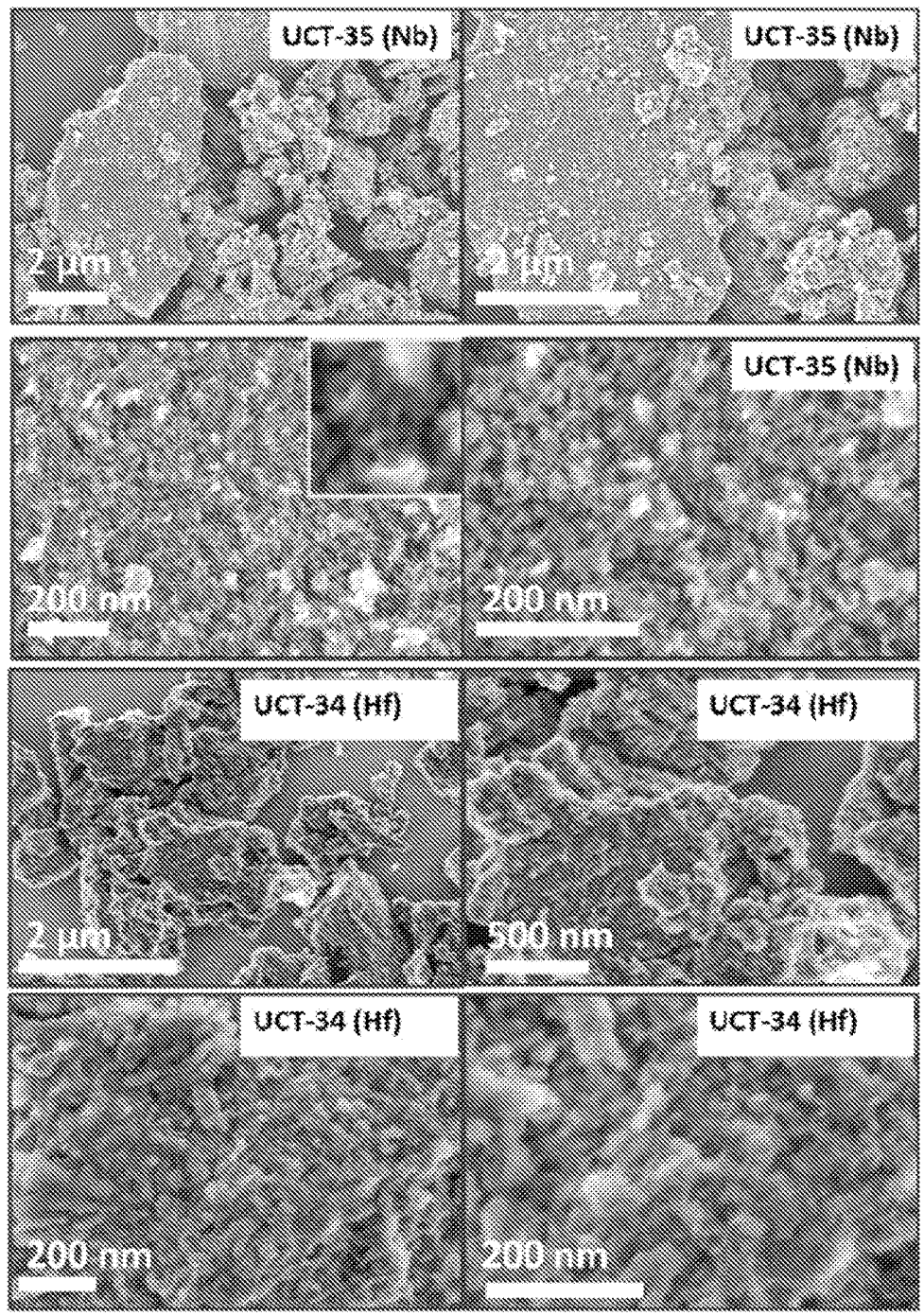
FIG. 24 depicts SEM images of mesoporous niobium oxide (UCT-36) and hafnium oxide (UCT-35) materials.

SEM images of Nb (UCT-36) shows a porous structure (FIG. 24). SEM analysis of UCT-35 is not informative as UCT-36 has charging effects. However, both samples show a nanoparticle assembly as with other mesoporous materials.

Mesoporous Lanthanides (Nd, Sm, Gd)

Synthesis of mesoporous lanthanides is a field which is not as well known as transition metals. The first reason is that the sol gel chemistry of lanthanides is not well studied. The second reason is lack of strong interaction between the surfactant and lanthanides. Unlike transition metal surfactant interactions, lanthanide-surfactant interactions do not involve a charge transfer from surfactant to empty d orbitals. The process of this disclosure for the synthesis of mesoporous materials can overcome these above-mentioned problems. Therefore, the process of this disclosure makes the synthesis of mesoporous lanthanide oxides possible such as $CeO_2$ (UCT-16), $Nd_2O_3$ (UCT-39), $Sm_2O_3$ (UCT-40), and $Gd_2O_3$ (UCT-41). A description of UCT-16 can be found, for example, in U.S. Patent Application Ser. No. 61/705,370, filed Sep. 25, 2012, and U.S. Patent Application Ser. No. 61/705,372, filed Sep. 25, 2012.

Figure 25:
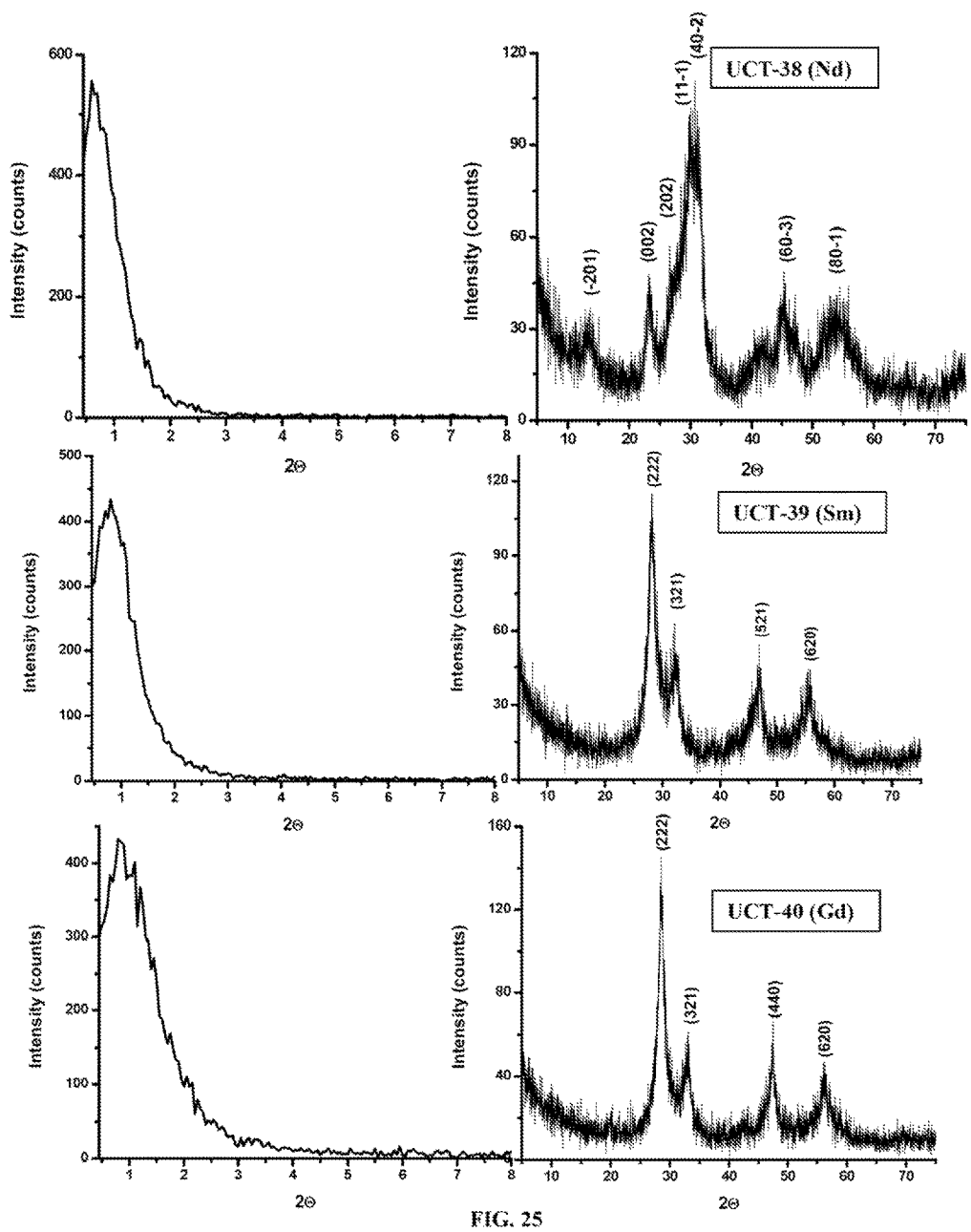
FIG. 25 depicts low angle and wide angle PXRD patterns of mesoporous neodymium oxide (UCT-39), samarium oxide (UCT-40), and gadolinium oxide (UCT-41) materials.

FIG. 25 shows low angle and wide angle PXRD patterns of mesoporous Nd (UCT-39), Sm (UCT-40), and Gd (UCT-41) oxides. All samples show one characteristic low angle diffraction line. The positions of the low angle diffraction lines are 12.6 nm (UCT-39), 10.6 nm (UCT-40), and 10.1 nm (UCT-41). All these new lanthanide oxides have broad and low intensity wide angle diffraction lines indicating the nanoparticle nature of these synthesized materials.

Figure 26:
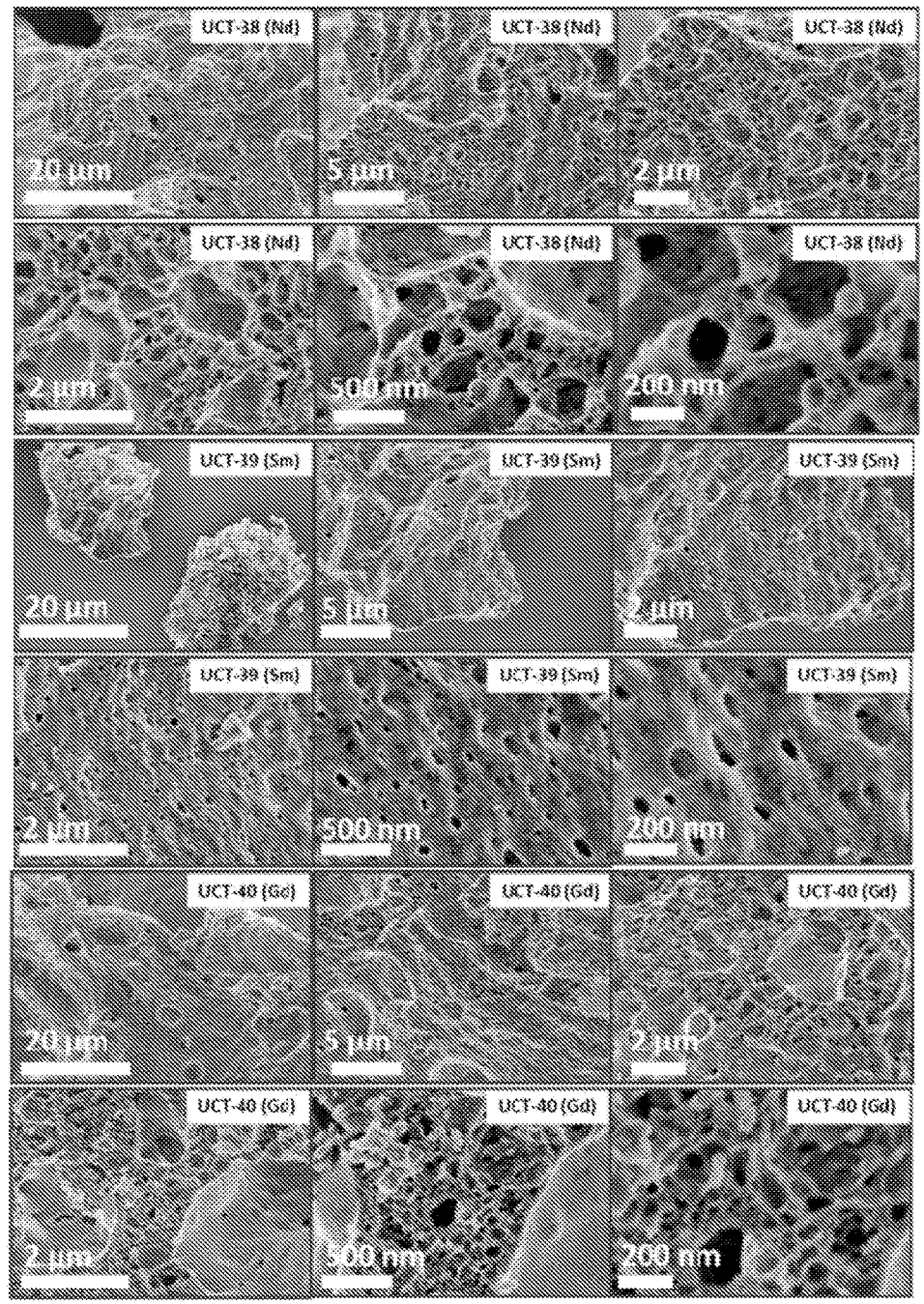
FIG. 26 depicts SEM images of UCT-39 ($Nd_2O_3$), UCT-40 ($Sm_2O_3$) and UCT-41 ($Gd_2O_3$) materials.

SEM analyses on synthesized UCT-39, UCT-40, and UCT-41 are shown in FIG. 26. All mesoporous lanthanide oxides have different morphologies than other mesoporous materials. High magnification images show cavities and voids that do not have the same size. Macropores and mesopores co-exist in the same material. One plausible explanation is the creation of macropores during the calcination process. When surfactants are burned they leave macro holes behind. This phenomenon is generally observed when the inorganic framework is not fully condensed before calcination. Therefore, synthesized materials show both mesopores and macropores. The lanthanide materials might need longer aging times to prevent macropore formation.

Figure 27:
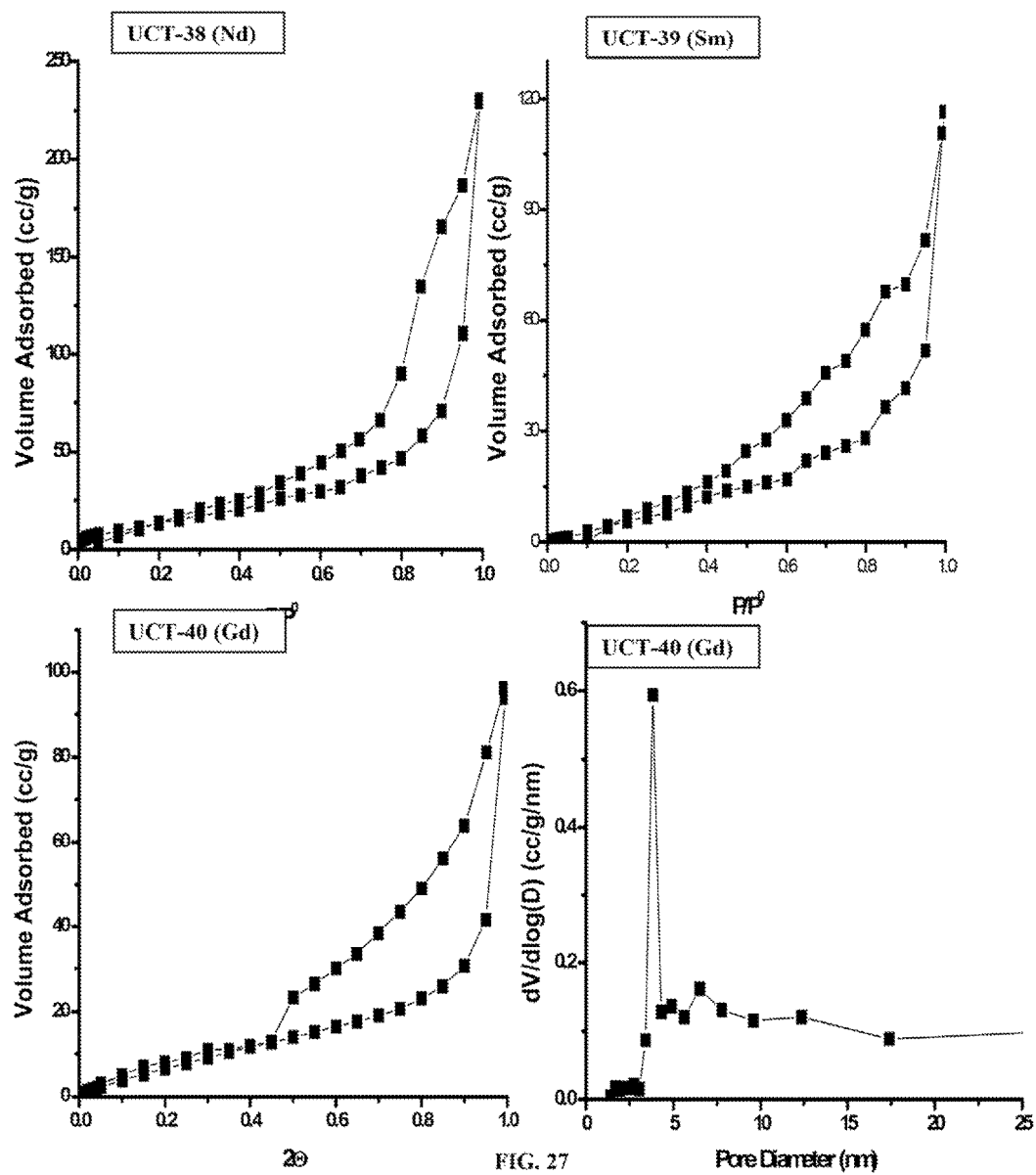
FIG. 27 depicts $N_2$ sorption isotherms of UCT-39 ($Nd_2O_3$), UCT-40 ($Sm_2O_3$), and UCT-41 ($Gd_2O_3$) materials and BJH desorption pore size distributions of UCT-41 ($Gd_2O_3$).

Co-existence of mesopores and macropores can also be realized from $N_2$ sorption data (FIG. 27). All materials show characteristic Type V adsorption isotherms indicating a macropore structure. A Type V adsorption isotherm means a strong $N_2$ uptake close to saturation pressures. The desorption branches of isotherms show strong evidence for the existence of mesopores. A big hysteresis loop and loop closure in the mesopore range indicates that these materials do not only contain macropores. The adsorption isotherm is ruled by a larger pore regime (macropores) and the desorption isotherm is ruled by a smaller pore regime. Therefore, synthesized materials (UCT-39, UCT-40, and UCT-41) have two types of pore structures in one material. BJH desorption pore size distribution of UCT-41 (Gd) is given to illustrate the situation (FIG. 27). The calculated mesopore size for mesoporous Gd (UCT-41) sample is 4.0 nm. The macropore size distribution is inaccurate and not possible to observe by $N_2$ sorption studies. However, SEM images (FIG. 26) suggests an irregular macroporosity which further supports the suggested reasoning for macropore formation.

The process of this disclosure can be further modified to limit the porosity in the mesopore range. However, for certain applications the existence of macroporosity can be desired. In other words, a controlled macroporosity along with mesoporosity can be very useful.

High Pressure Reactions (Mn, Mn—K, Al—Si)

Mesoporous materials can be synthesized with various heating sources such as ovens, microwave devices, and ultrasound under atmospheric pressure (1 atm). The only requirement is the evaporation of solvent to promote packing of inverted micelles and the presence of oxygen for the oxidation of inorganic framework (for the atoms which need to get oxidize) species. The use of high pressure can be very important to obtain certain crystal structures for a given oxide material due to the thermodynamic stability of certain crystal structures. In principle, gels can be used as a precursor under high pressure conditions to obtain different crystal structures. For example, good quality zeolite materials can only be synthesized under high pressure. Aluminosilicate materials with similar chemical compositions of zeolites form amorphous materials at atmospheric pressure.

Figure 28:
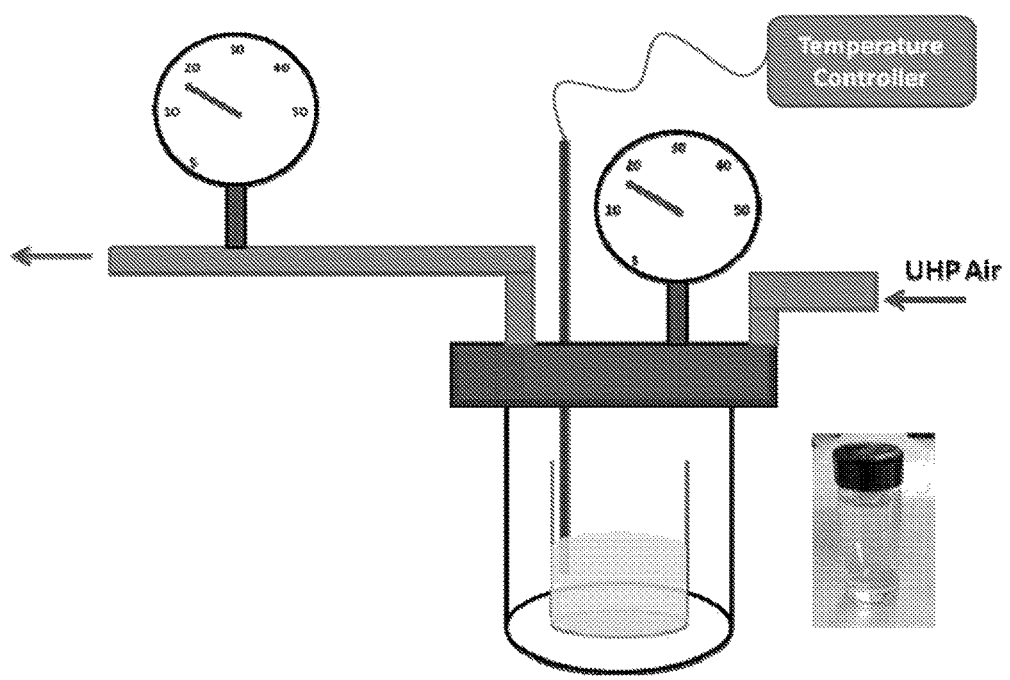
FIG. 28 depicts schematic illustration of experimental set up for manganese (high pressure) amorphous UCT-42 (Mn) and manganese+potassium UCT-43 ($K_{2-x}Mn_8O_{16}$ (x=0 or 1)).

The manganese system has been studied to investigate the potential of use of high pressure in the synthesis of mesoporous materials. FIG. 28 shows the schematic illustration of the experimental procedure. UCT-1 (Mn) and UCT-18 (Mn—K) gels were placed in a high pressure reactor and kept under high pressure and air flow. The pressure range studied was in the range of 2 bar to 40 bar. Air flow is essential to guarantee the supply of enough oxygen to oxidize manganese for solvent evaporation. Pressure was checked at two different points and temperature of the reaction was controlled by a temperature controller. The method can also be applied to all mesoporous materials of this disclosure. A description of UCT-1 and UCT-18 can be found, for example, in U.S. Patent Application Ser. No. 61/705,370, filed Sep. 25, 2012, and U.S. Patent Application Ser. No. 61/705,372, filed Sep. 25, 2012.

Figure 29:
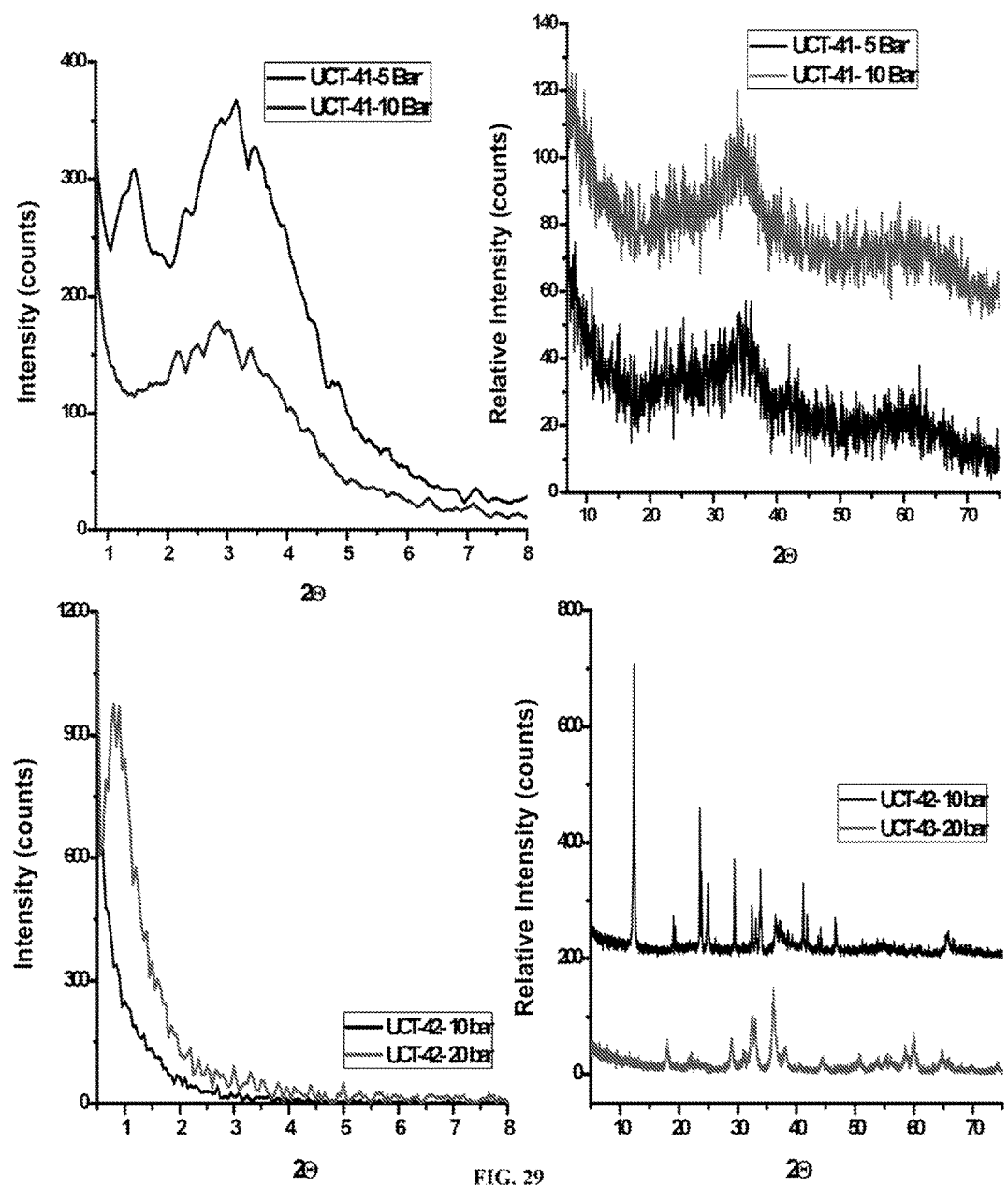
FIG. 29 depicts low angle and wide angle PXRD patterns of manganese (high pressure) amorphous UCT-42 (Mn) and manganese+potassium UCT-43 ($K_{2-x}Mn_8O_{16}$ (x=0 or 1)) materials.

FIG. 29 shows the low and wide angle diffraction patterns of UCT-42 (Mn) and UCT-43 (Mn—K) materials synthesized at 120° C. and under 5-20 bar. UCT-42 is analogous to UCT-1 and UCT-43 is analogous to UCT-18-K. Synthesis of UCT-1 material at higher pressures (UCT-42) gives poorly ordered mesostructures. In addition, the peak position is at lower angles (UCT-42) compared to as synthesized UCT-1 indicating an increased in unit cell size. Use of high pressure promotes nanocrystal growth. UCT-42 materials synthesized at different pressures give amorphous structures. UCT-43 (Mn—K) gives mesostructures only at high pressures (20 bar). Different from UCT-42 and UCT-18, UCT-43 has a crystalline structure. Analysis of the crystal structure shows a mixed phase material containing at least three different crystal structures (see FIG. 2 for assignments). A description of UCT-1 and UCT-18 can be found, for example, in U.S. Patent Application Ser. No. 61/705,370, filed Sep. 25, 2012, and U.S. Patent Application Ser. No. 61/705,372, filed Sep. 25, 2012.

Figure 30:
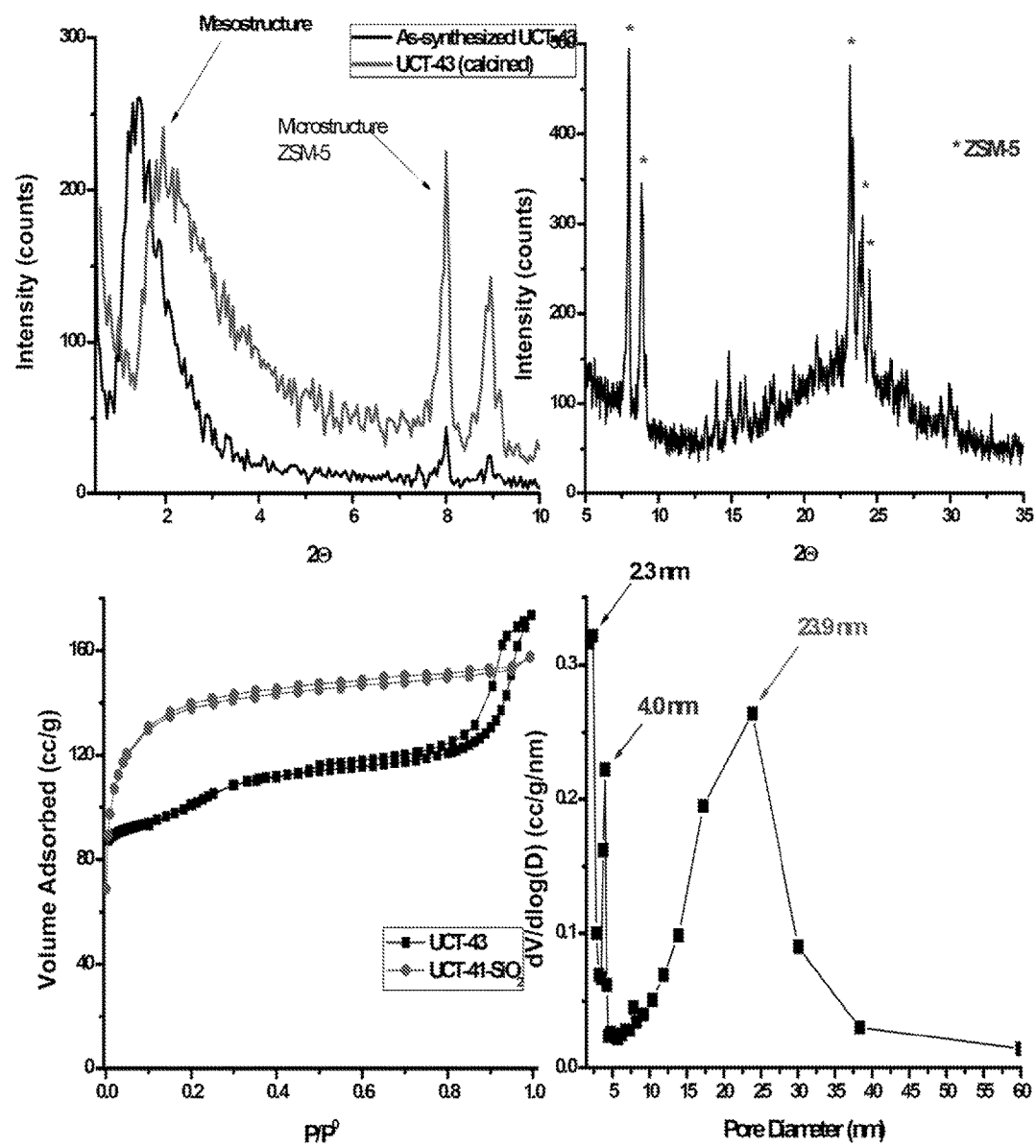
FIG. 30 depicts low angle and wide angle PXRD patterns of UCT-44 (ZSM-5) and $N_2$ sorption isotherms of UCT-44 (ZSM-5) and aluminosilicate UCT-15 materials along with BJH desorption pore size distributions.

Use of high pressure was also applied to the aluminosilicate system to synthesize one of the most famous members of the zeolite family (ZSM-5). Aged UCT-15 (aluminosilicate) with an Al:Si ratio of 1:100 was transferred to a high pressure reactor. FIG. 30 shows the low and wide angle PXRD patterns of as synthesized and calcined UCT-44 (meso-ZSM-5) material. The low angle diffraction patterns show diffraction reflections from both the mesostructure and the microstructure. The mesostructure comes from the inverted micelle packing of nanocrystals and the microstructure comes from the ZSM-5. The lack of high pressure results in aluminosilicate material that is amorphous and shows microporosity. As observed in UCT-42 and UCT-43 systems, applying high pressure results in nanocrystal growth and formation of a mesostructure. A description of UCT-15 can be found, for example, in U.S. Patent Application Ser. No. 61/705,370, filed Sep. 25, 2012, and U.S. Patent Application Ser. No. 61/705,372, filed Sep. 25, 2012.

$N_2$ sorption isotherms of UCT-44 show evidence for both microporosity and mesoporosity (FIG. 30). A low pressure analogue of UCT-44 (UCT-15) shows a Type I adsorption isotherm indicating a micropore only structure. The BJH desorption pore size distribution shows two pore size distributions (2.3 nm and 4.0 nm). Considering the overestimation of micropore size by the BJH method suggests that a micropore structure is formed. A description of UCT-15 can be found, for example, in U.S. Patent Application Ser. No. 61/705,370, filed Sep. 25, 2012, and U.S. Patent Application Ser. No. 61/705,372, filed Sep. 25, 2012.

Figure 31:
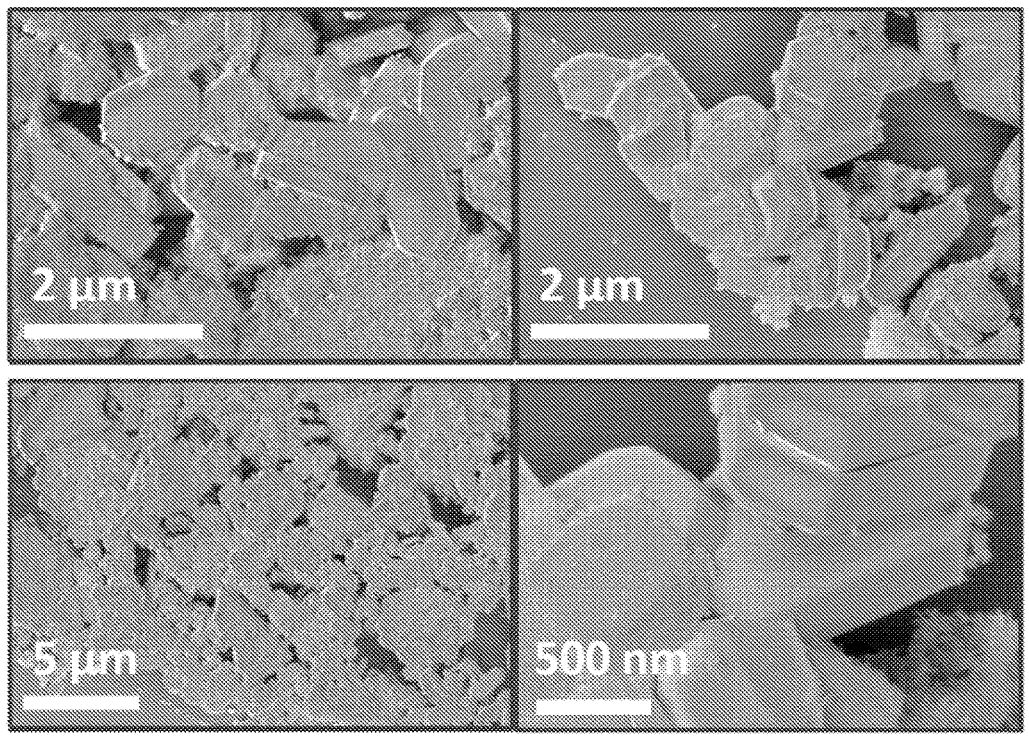
FIG. 31 depicts SEM images of UCT-44 (ZSM-5).

SEM analyses of UCT-44 samples show two different morphologies (FIG. 31). One of the morphologies is elongated hexagonal particles and the other one is a sponge-like morphology. Presumably, the well-defined elongated hexagons are the ZSM-5 structure and the sponge-like structure is either amorphous or ZSM-5.

Other Synthetic Approaches for Mesoporous Materials (UCT-46 and UCT-47)

Depending on the metal source used two different types of products are obtained. Generally speaking, the use of salts (nitrate or chloride) results in product in a powder form and the use of alkoxide sources results in products in a rigid film form. Powder products are generally washed and were subjected to step wise heating cycles in order to tune the pore size from micropore to mesopore. However, products in film form were subjected to direct high temperature calcination, since any heat treatment below the burning temperature of the Pluronic® surfactant (400° C.) forms thermally stable coke. Washing these films as done with powder samples generally destroys the mesostructure. Therefore, a new approach was used to overcome this problem and obtain materials with tunable pore sizes which are a unique feature of mesoporous materials of this disclosure.

Figure 32:
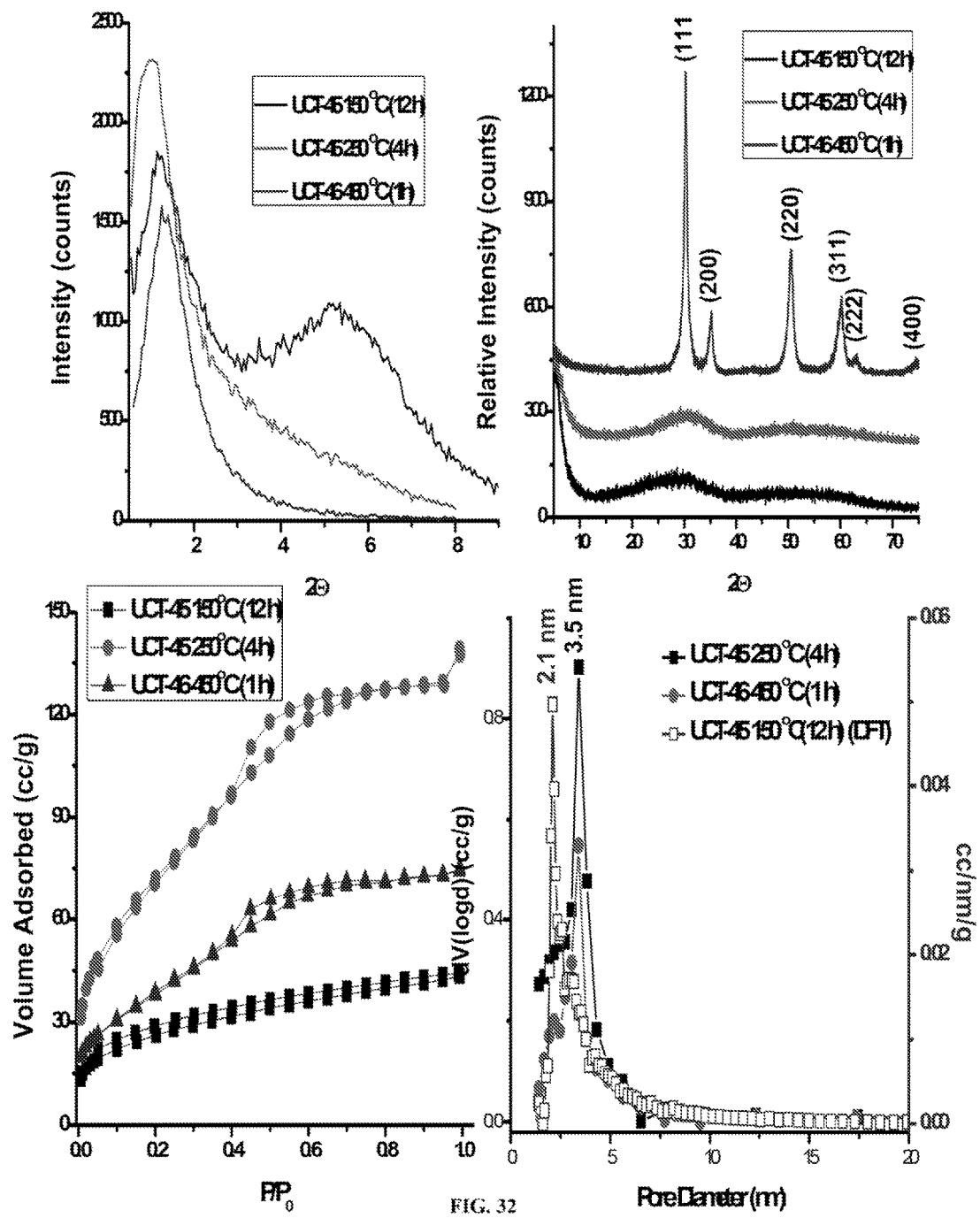
FIG. 32 depicts low angle and wide angle PXRD patterns, $N_2$ sorption isotherms, and BJH desorption pore size distributions of zirconia amorphous UCT-46 and UCT-47 ($ZrO_2$).
Figure 33:
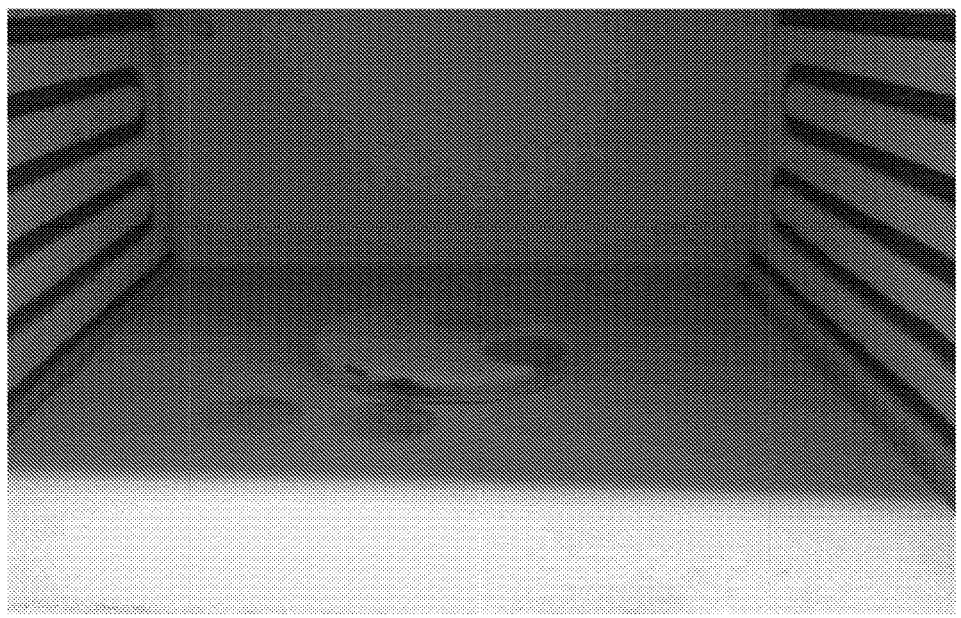
FIG. 33 depicts a picture of a calcination oven after synthesis of zirconia amorphous UCT-46 (250° C.).

The problem arises from the poorly condensed inorganic framework after the reaction. Use of ethanol removes the surfactant but surfactant removal before total condensation causes the mesostructure to collapse. Therefore, as synthesized films were washed with an ethanol-water mixture (9:1 v:v). The role of ethanol is to remove surfactant and water promotes condensation and makes the mesostructure more stable. FIG. 32 shows the low and wide angle PXRD patterns. After initial heat treatment the UCT-46 sample shows two diffraction lines indicating an increase in the meso-order of the material. Further heat treatments cause the disappearance of the second broader diffraction line but the lower angle diffraction line remains the same (UCT-46 (250° C.) and UCT-47). In addition, the material gets crystalline at 450° C. and the structure is tetragonal $ZrO_2$, (t). Different from UCT-17, with the current approach amorphous zirconia oxide can be synthesized. Moreover, mesopores can be tuned from microporous to mesoporous as in other mesoporous materials synthesized from inorganic sources in salt form (FIG. 32). Step by step tuning of porosity and crystal structure potentially increases the number of potential applications. The approach is applicable to all mesoporous materials of this disclosure that give a rigid film product (Ti, Si, Al—Si, Cr). The synthesized materials became very light and even become buoyant around during heating cycles. FIG. 33 shows a picture of the calcination oven after synthesis of UCT-46 (250° C.).

Supported Materials (UCT-50 (W—Sn (9:1)))

Unlike most of the transition metals, tungsten has only limited available precursors. These sources generally have poor solubility and do not have the ability to be formed via sol-gel chemistry. One reason is the tendency of the tungsten to be in the form of a cluster rather than as individually solvated ions. A general approach is to prepare an alcohol soluble precursor by digesting ammonium metatungstate salt in peroxide. Even this approach is acceptable for formation of a precursor which has sol-gel chemistry. Tungsten is still in the form of big clusters and does not interact strongly with the surfactant micelles.

The current problem can be overcome with the following process of this disclosure. In this method, an insoluble metatungstate source is stabilized in gel form by use of tin (Sn). The same approach also allows one to use Si, Ti, and Zr for the same purpose. Tetrahedrally coordinated transition and post-transition metals stabilize the metatungstate source in gels (see also tungstated zirconia described herein). Metatungstate ion has almost no solubility in butanol, however incorporation of a tungsten source in a water-ethanol mixture gives a clear (or white) gel. Further heat treatments followed by a calcination step to remove surfactant results in mesoporous materials. The supporting metal can be removed by simple chemical etching.

Figure 34:
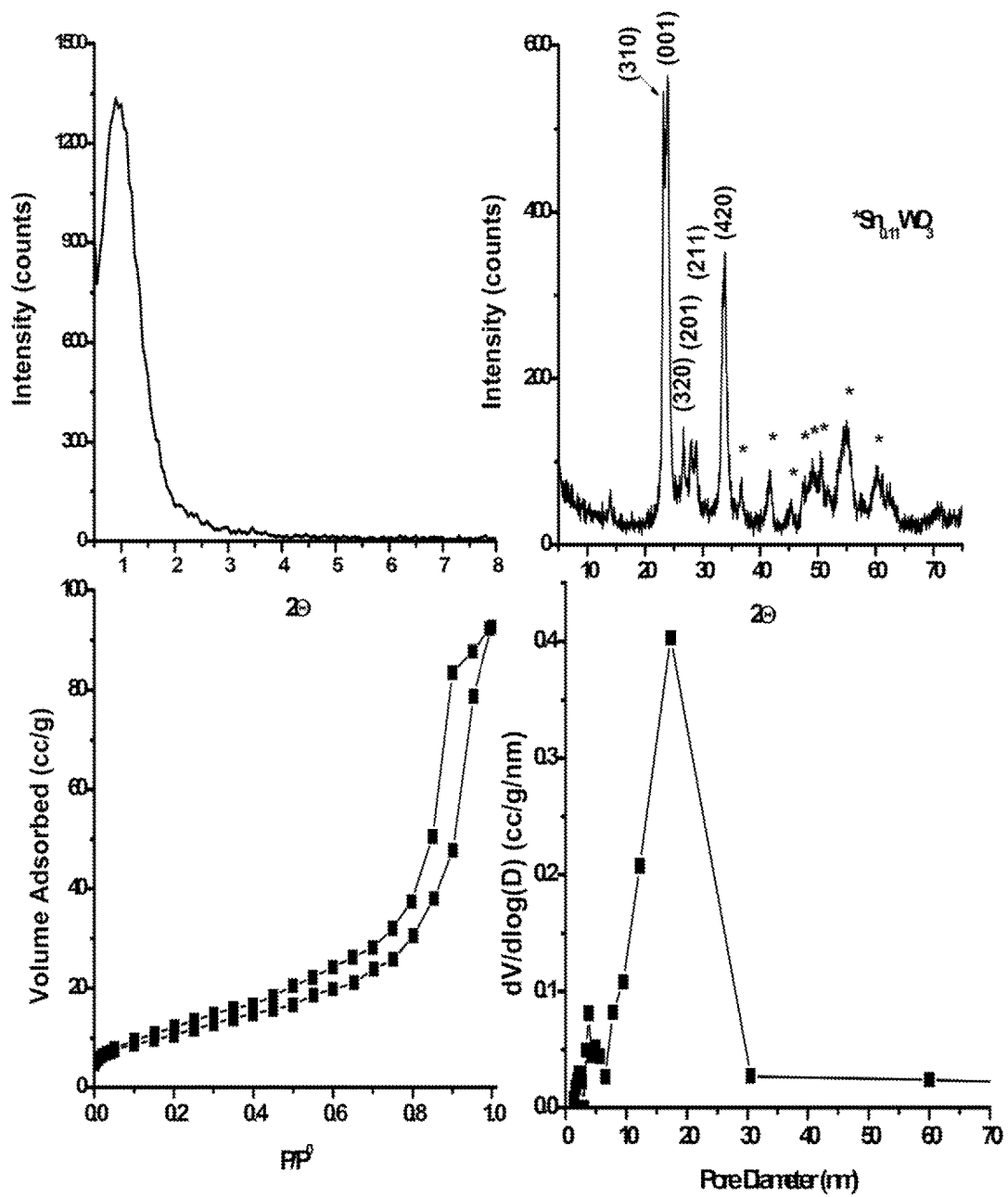
FIG. 34 depicts low angle and wide angle PXRD patterns and $N_2$ sorption isotherms of UCT-51 (in situ W—$ZrO_2$) materials along with BJH desorption pore size distributions.

FIG. 34 shows the low and wide angle diffraction patterns of UCT-51 which are supported by 10% Sn. The final material shows one sharp diffraction line indicating a mesostructure. The wide angle diffraction pattern can be assigned to $Sn_{0.11}WO_3$. $N_2$ sorption and BJH desorption pore size distributions suggest a mesoporosity with a pore size of 17.1 nm (FIG. 34). An adsorption step around 0.8 $P/P^0$ makes the pore size assignments inaccurate (the exact pore size can be lower than this). One also can tune the pore size and unit cell by varying the concentration of supporting metal (Sn).

Solid Acid Catalysts with Post Treatment (Sulphated Zirconia UCT-45)

Development of strong acid catalysts is essential for many industrial applications including biofuel production. Esterification and transesterification (biomass or biodisel) reactions are generally done under high pressure and temperature. Therefore, strong acid catalysts are stable under these conditions with tunable acid character (Lewis and Brönsted) and strength is essential. Some important catalysts which are known to be useful are sulfated, phosphated, and tungstated zirconia, titania, tin, and silica. $H_2SO_4$ (as sulfate source), $H_3PO_4$ (as phosphate source), ammonium metatungstate (as tungsten source) are most commonly used sources to bring super acidity to the support. Advantages of using mesoporous catalysts with high surface area and mesoporosity have been shown. However, one step synthesis of mesoporous solid acids is problematic. The above-mentioned sources affect both micellization of the surfactant and the sol-gel chemistry of the inorganic sources used. Therefore, a post treatment approach is more commonly employed to make mesoporous solid acid catalysts. Another important problem is the heat treatment temperature. These catalysts are activated by high calcination temperatures (as high as 800° C.). Generally speaking, high calcination temperatures increase the crystallinity of the inorganic framework and destroy the mesopore structure.

Figure 35:
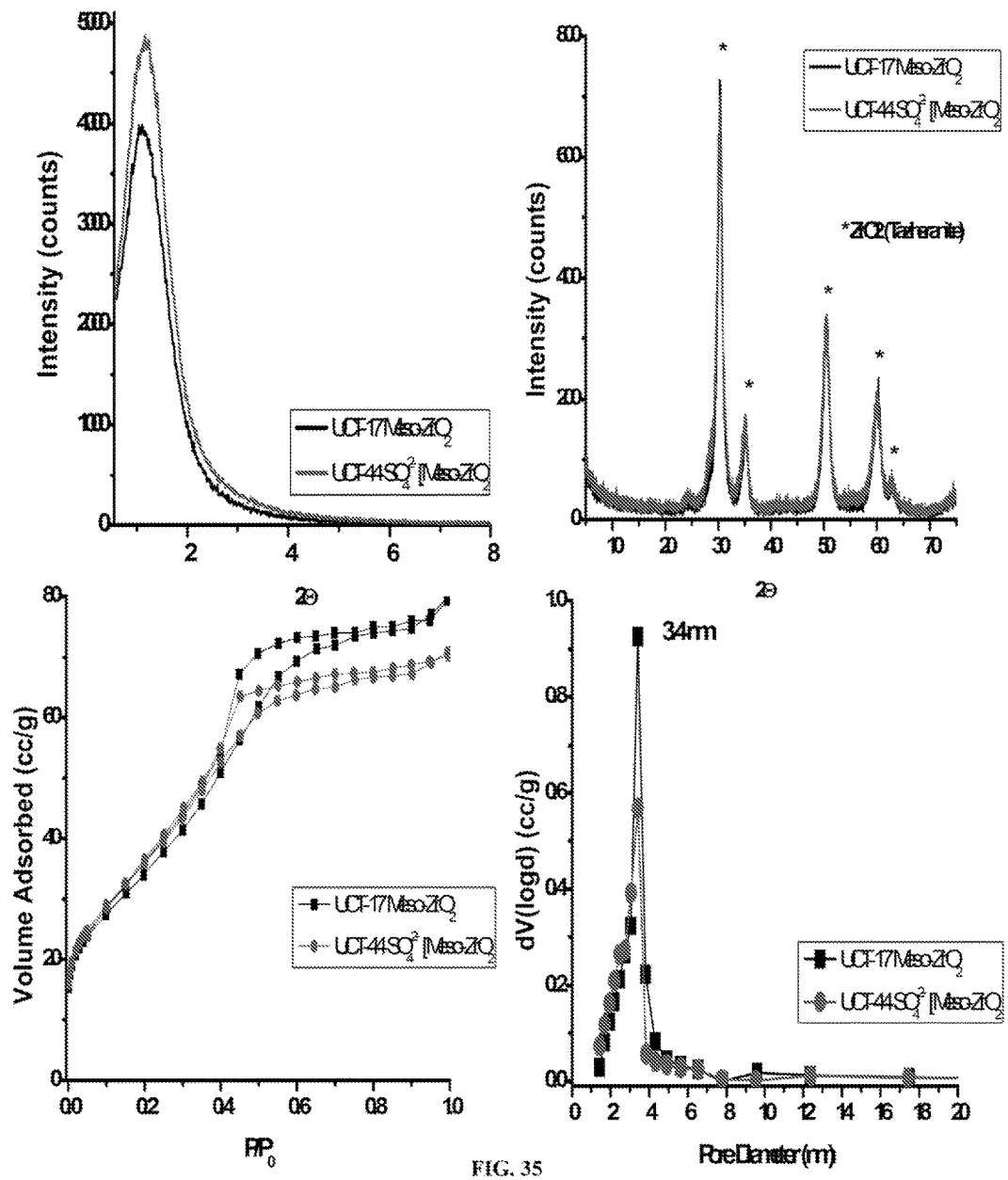
FIG. 35 depicts low angle and wide angle PXRD patterns and $N_2$ sorption isotherms of UCT-17 ($ZrO_2$) and UCT-45 (S—$ZrO_2$) materials along with BJH desorption pore size distributions.

Mesoporous sulfated zirconia has been synthesized by using UCT-17 as a template and modifying the template material with sulfuric acid. FIG. 35 shows the low and wide angle PXRD diffraction patterns of the template (UCT-17) and modified solid acid catalyst (UCT-45). Both diffraction patterns of UCT-45 are identical to the template used. After modification, the as synthesized sample was subjected to a second calcination step. As seen from the diffraction patterns sulfated zirconia synthesized by post treatment preserves both the mesoporosity and the crystalline structure of the template used (UCT-17). UCT-45 also preserves the mesopore structure (FIG. 35). UCT-45 has a Type IV adsorption isotherm indicating a mesoporous structure along with a narrow pore size distribution (3.4 nm). Both the $N_2$ sorption isotherm and the BJH desorption pore size distribution are almost identical to the template used indicating that the UCT-17 template is stable even after a second calcinations step.

One Step Synthesis of Mesoporous Solid Acid Catalysts (S—Zr (UCT-48), S—Ti (UCT-49), P—Zr (UCT-50), W—Zr (UCT-51), Sn—Zr (UCT-53))

Sulfated zirconia and titania are one of the strongest solid acid catalysts and are known to have an acid strength close to sulfuric acid. As mentioned above the use of sulfuric and phosphoric acid during the synthesis to modify the mesopore surface is a challenge. The process of this disclosure for synthesizing mesoporous materials overcomes this problem. Sulfuric acid can be loaded up to 30% in Ti and Zr systems. 30% sulfuric acid (with respect to metal amount) is more than enough to cover the entire surface of the mesopores. The excess sulfate was removed by calcination.

Figure 36:
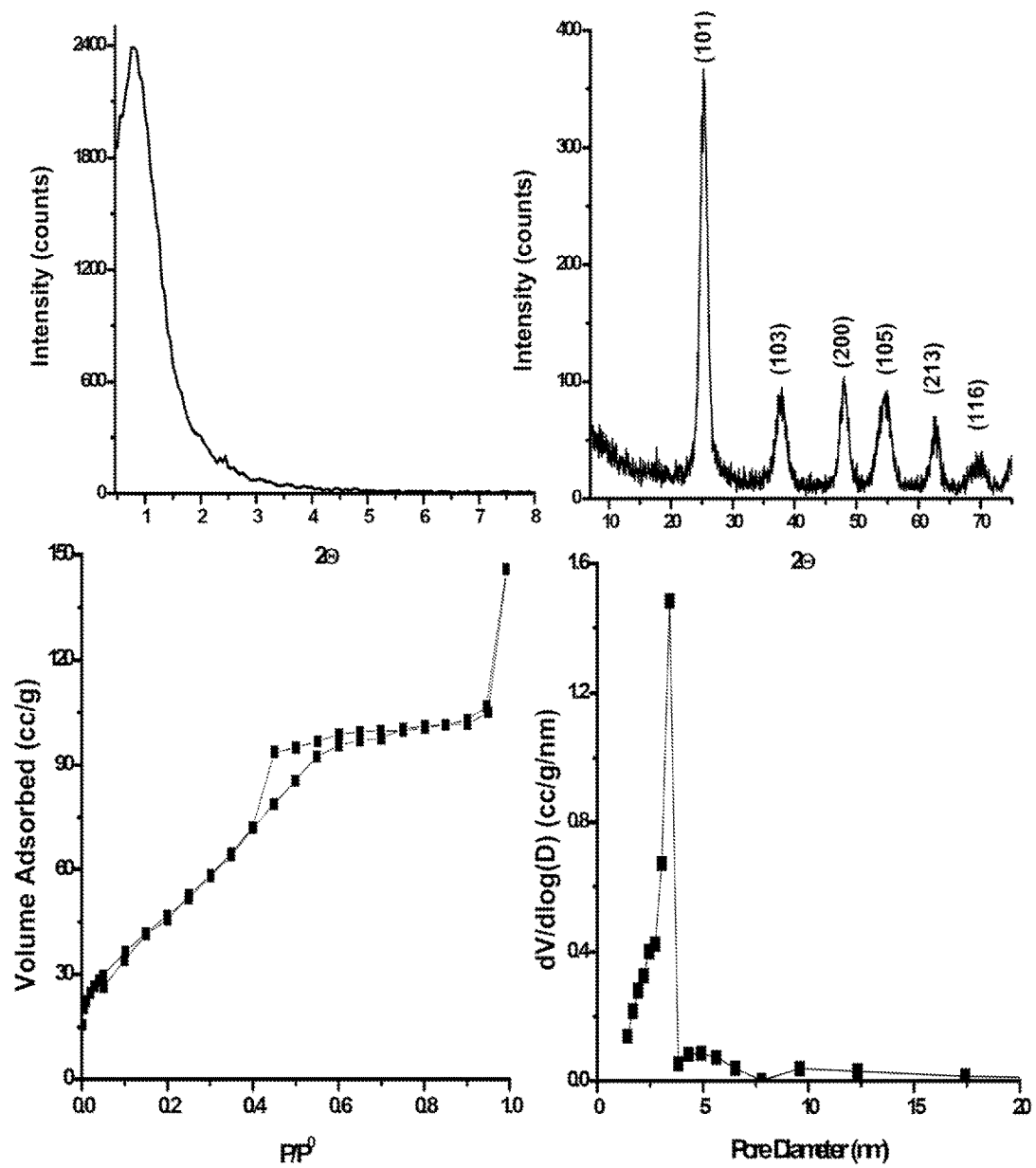
FIG. 36 depicts low angle and wide angle PXRD patterns and $N_2$ sorption isotherms of UCT-49 (in situ S—$TiO_2$) materials along with BJH desorption pore size distributions.
Figure 37:
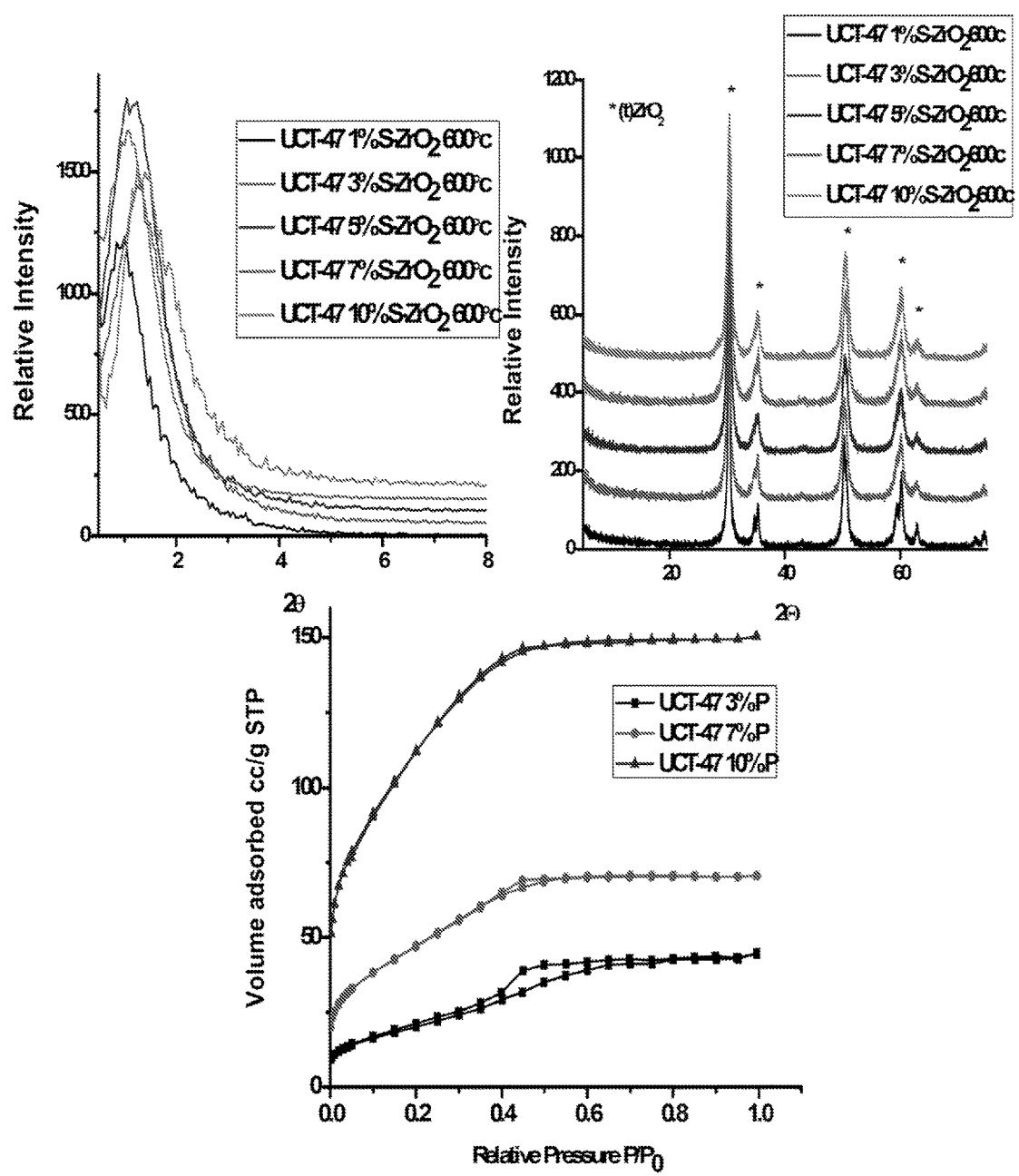
FIG. 37 depicts low angle and wide angle PXRD patterns and $N_2$ sorption isotherms of UCT-48 (in situ S—$ZrO_2$) materials.

FIG. 36 and FIG. 37 show PXRD and $N_2$ sorption data of sulfated titania (UCT-49) and sulfated zirconia (UCT-48) respectively. Use of sulfate does not affect the formation of the mesostructure. Regardless of sulfate amount the final material preserves the mesostructure. However, the low angle diffraction peak position shifts to higher angles by increasing the sulfate loading. This is evidence that shows that sulfate hinders the crystal growth which occurs during the calcinations by covering the surface of nanocrystals. Assembly of smaller particles yields smaller mesopore sizes. As seen from $N_2$ sorption isotherms, the nitrogen adsorption step occurs at lower relative pressure for sulfated zirconia than mesopore zirconia (FIG. 37). BJH pore size distributions also are supportive of this concept. The pore size even drops down to the micropore range (1.7 nm) for 10% S—Zr (see FIG. 2).

Figure 38:
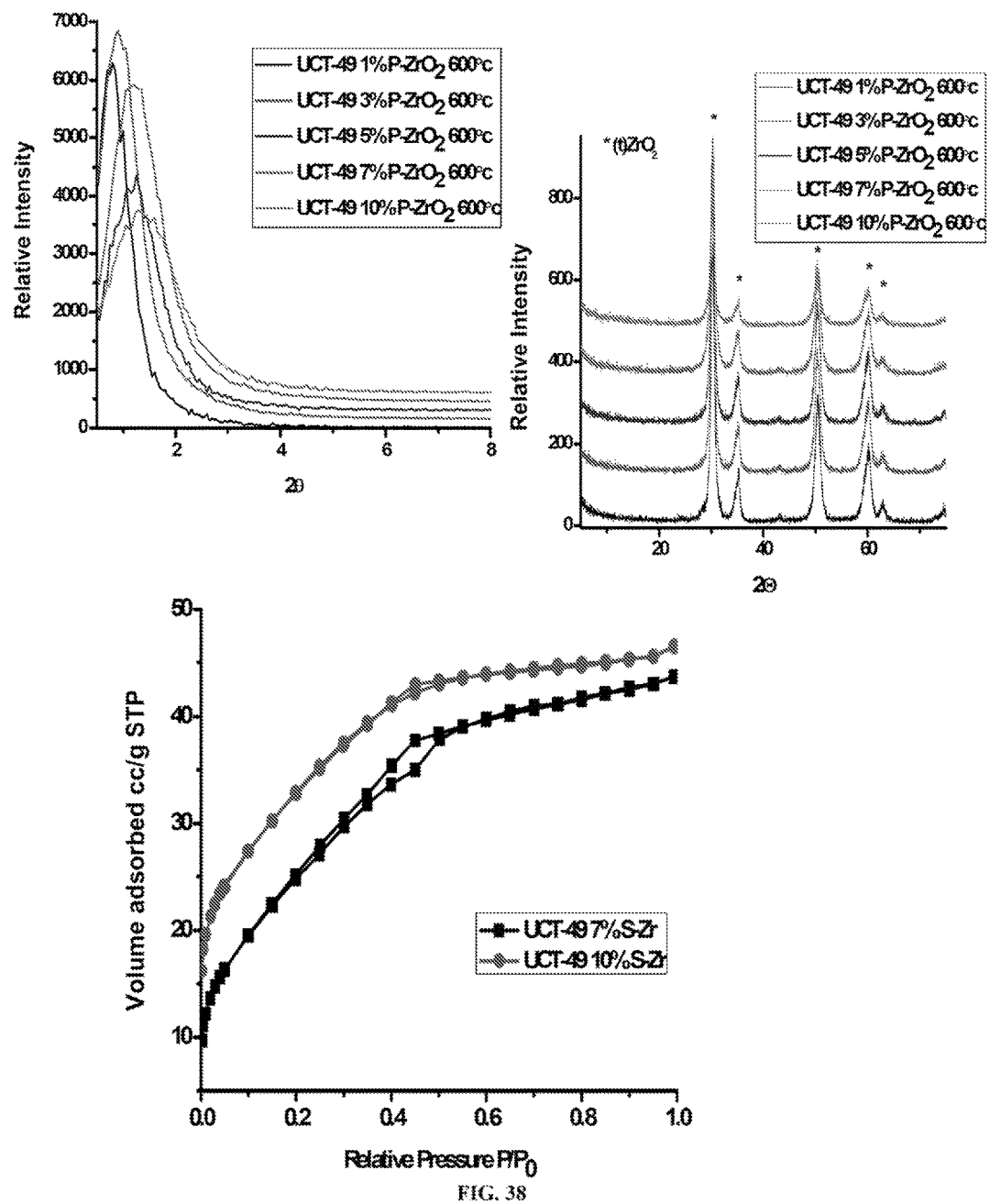
FIG. 38 depicts low angle and wide angle PXRD patterns and $N_2$ sorption isotherms of UCT-50 (in situ P—$ZrO_2$) materials.
Figure 39:
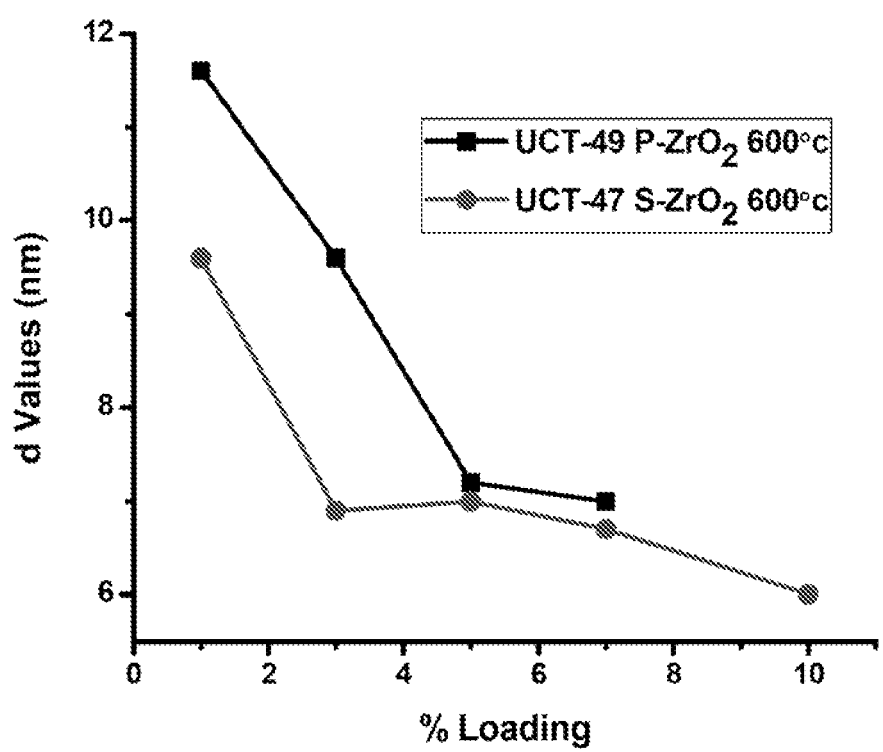
FIG. 39 depicts the change at low angle peak position by sulphate and phosphate loading on UCT-48 (in situ S—$ZrO_2$) and UCT-50 (in situ P—$ZrO_2$).

Phosphated zirconia is another solid acid catalyst. Compared to S—Zr (UCT-48), P—Zr (UCT-50) has moderate acidity, which can be very important for selectively converting a material in a mixture. For example, a moderate acid can do acetalization of aldehydes but not ketalization of ketones. One can convert selectively aldehydes in an aldehyde-ketone mixture. With the current approach phosphoric acid can also be used to produce mesoporous solid acids. FIG. 38 shows PXRD patterns and $N_2$ sorption isotherms. UCT-50 materials preserve the mesostructure and mesoporosity. In addition, UCT-48 and UCT-50 both show a shift of the low angle diffraction lines upon increased loading, indicating formation of phosphate and sulfate on the surface of the nanocrystals. Detailed low angle peak positions for S—Zr (UCT-48) and P—Zr (UCT-50) can be seen in FIG. 39. For both solid acids, the peak positions (nanocrystal size) change until 5% loading. Therefore, 5% loading of sulfate or phosphate can be assumed to be the amount required for total surface coverage. When these ions are attached on the surface of zirconia nanocrystals, they prevent sintering and crystal growth. This role of sulfate and phosphate has also been observed in several other studies. Further loading of these ions probably remains on the surface as salt and is burned out during the calcination process. After calcination zirconia supports have a crystal structure of tazherite (tetragonal) which is known to be the active phase of zirconia for forming strong solid acids (FIG. 37 and FIG. 38).

Figure 40:
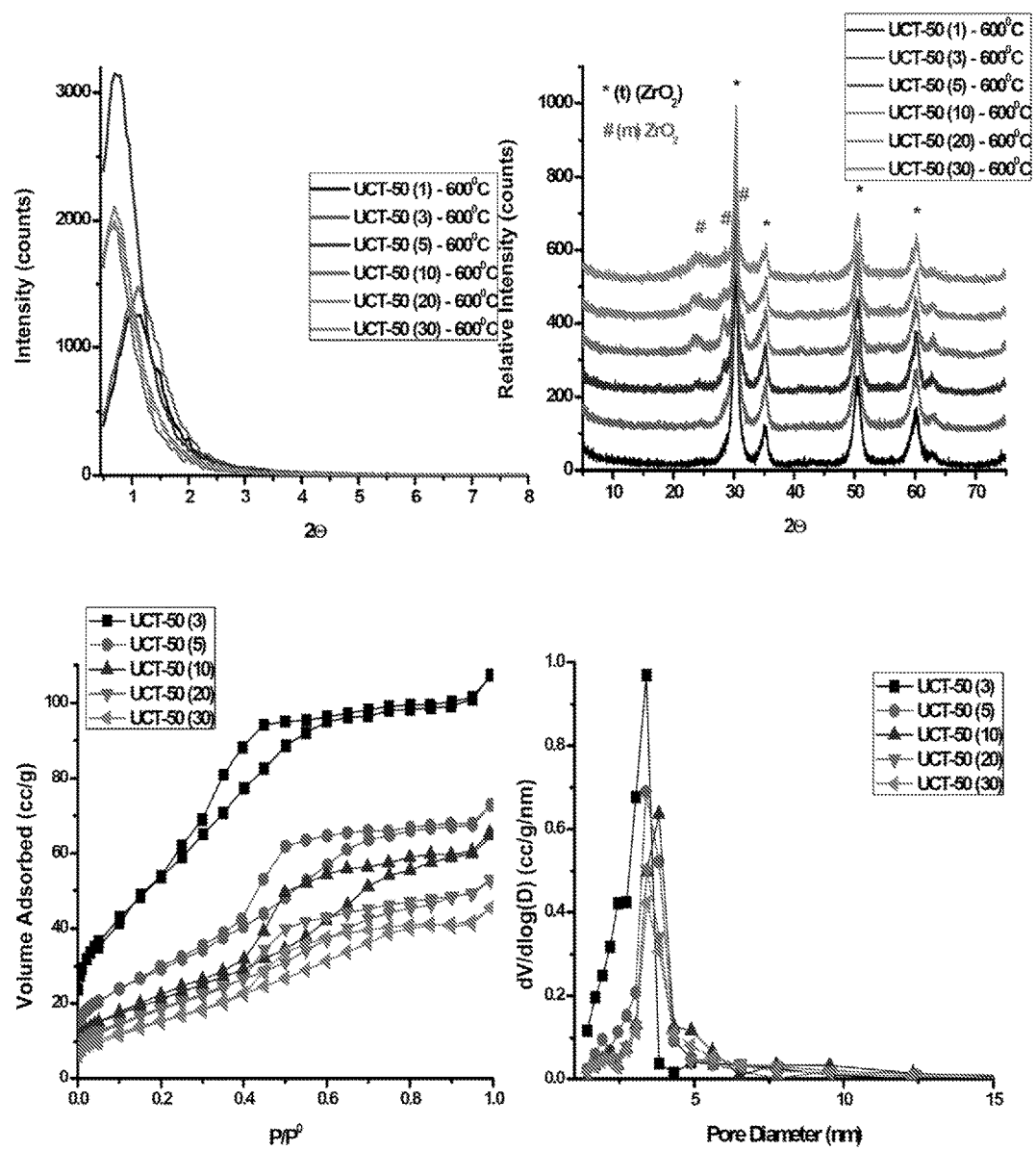
FIG. 40 depicts low angle and wide angle PXRD patterns and $N_2$ sorption isotherms of UCT-51 (in situ W—$ZrO_2$) materials along with BJH desorption pore size distributions.
Figure 41:
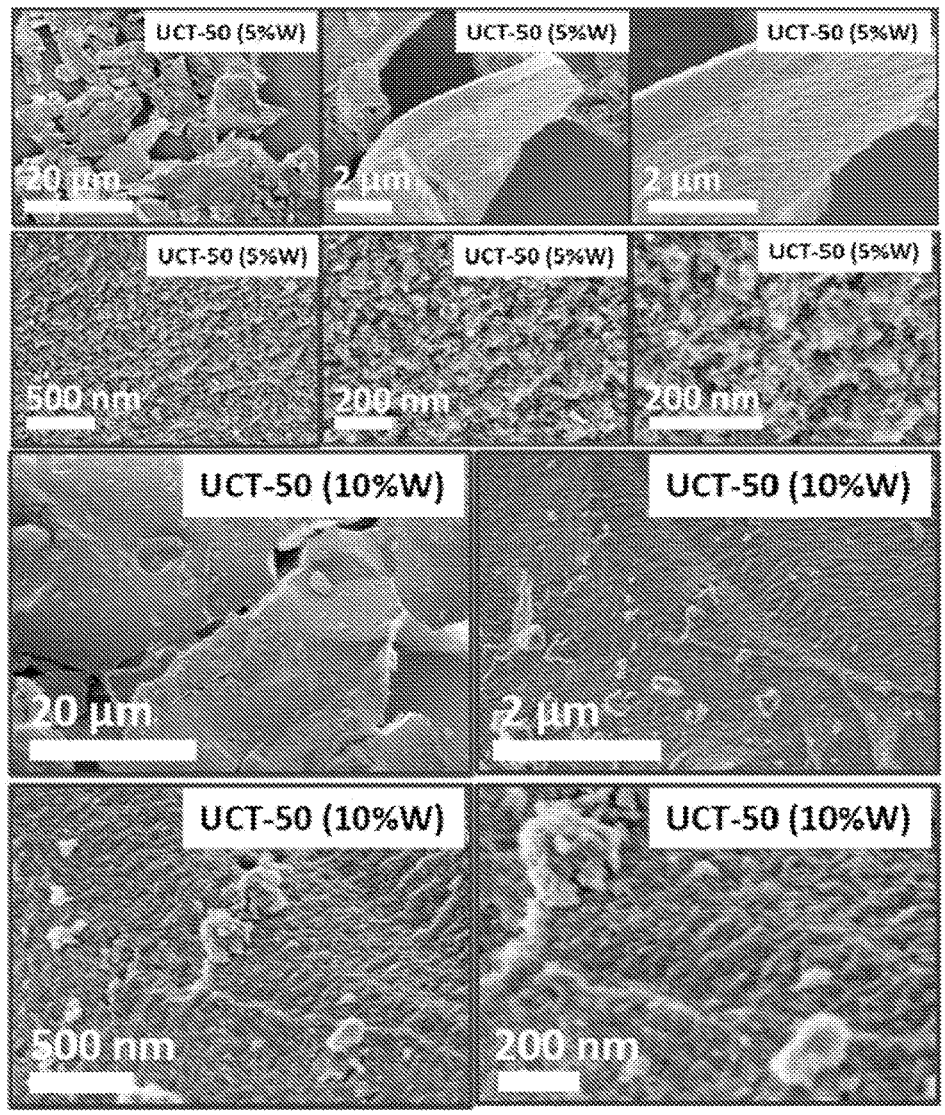
FIG. 41 depicts SEM images of UCT-51 (5% and 10% in situ W—$ZrO_2$).

Tungsten nanoclusters on amphoteric zirconia surfaces are also known to be effective to form strong solid acids. Mesoporous W—Zr (UCT-51) can also be synthesized with the current approach by using ammonium metatungstate as the tungsten source. Metatungstate is insoluble in reaction media and therefore was introduced by dissolution in water-ethanol mixtures. Immediately a white (opaque) gel formation was observed after addition of tungsten solution, indicating a strong interaction with zirconia gel. FIG. 40 shows low and wide angle PXRD patterns. All mesoporous W—Zr samples show a low angle diffraction line indicating the existence of mesostructure. However, increasing tungsten loading causes a change at the crystal structure of zirconia support. New diffraction lines appeared at high tungsten loadings (FIG. 40). The new lines can be assigned to the monoclinic phase of zirconia. However, no diffraction lines of formed tungsten oxide clusters were encountered even at high loading percentages (as high as 30%) indicating the nano nature of formed tungsten oxides. All W—Zr samples have a Type IV adsorption isotherm with a Type I hysteresis loop indicating regular cylindrical mesopores (FIG. 40). BJH pore sizes of W—Zr (UCT-51) are around 3.5 nm (see FIG. 2 for exact values). All solid acid catalysts were catalytically tested and have higher performance than their nonporous analogs.

Figure 42:
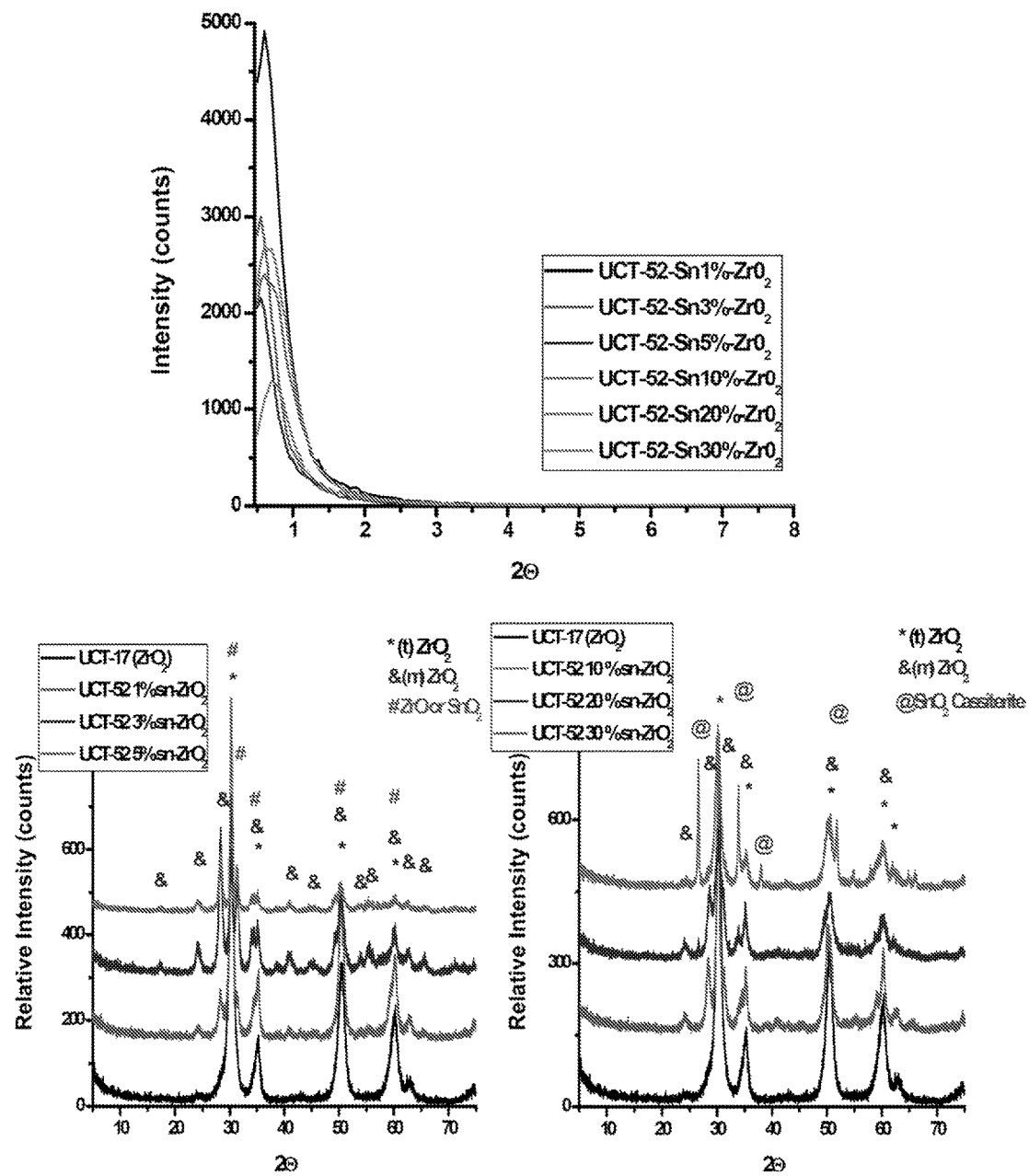
FIG. 42 depicts low angle and wide angle PXRD patterns of UCT-53 (in situ Sn—$ZrO_2$) materials.
Figure 43:
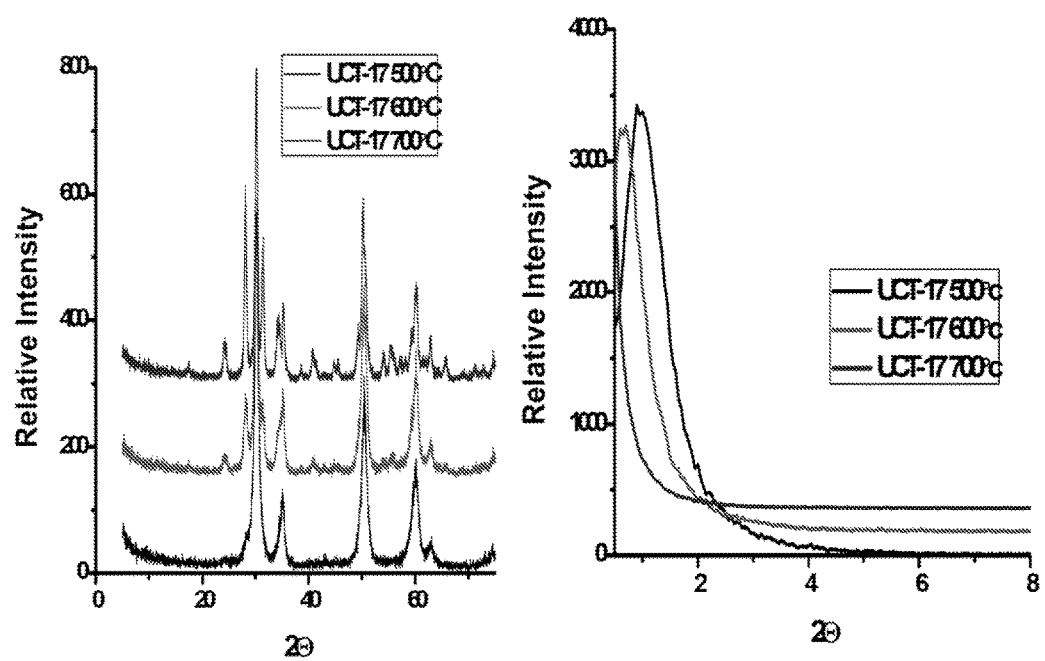
FIG. 43 depicts low angle and wide angle PXRD patterns of UCT-17 ($ZrO_2$) calcined at three different temperatures.

Despite the strengths and amounts of acid sites being very important, the type of acid sites is also very crucial for selectivity. Sulfated and tungstated zirconia are two of the known Brönsted dominated solid acids. Tin doping is known to be a very useful tool to create strong Lewis acids on zirconia supports. Therefore tin chloride was used to synthesize mesoporous Sn—Zr (UCT-53) material. All UCT-53 samples have characteristic low angle diffraction lines indicating the mesostructured nature (FIG. 42). Different from S—Zr, P—Zr; and Sn—Zr UCT-53 shows a change at the crystal structure of the support. The crystal phase of zirconia changes from tetragonal to monoclinic. The tetragonal phase of zirconia is known to be more active and forms stronger acid sites. Sulfate and phosphate modifications preserve the tetragonal phase. In order to investigate the role of sulfate and phosphate on the crystal structure of zirconia support UCT-17 (Zr) was calcined at different temperatures (FIG. 43). The monoclinic phase starts forming at 600° C. and becomes the dominant phase when temperature reaches 700° C. Formation of the monoclinic phase also destroys the mesostructure and the low angle diffraction peak disappears (FIG. 43). Therefore, modifying zirconia (S, P, or W) increases the stability of both the mesostructure and the tetragonal phase of the zirconia support.

Figure 46:
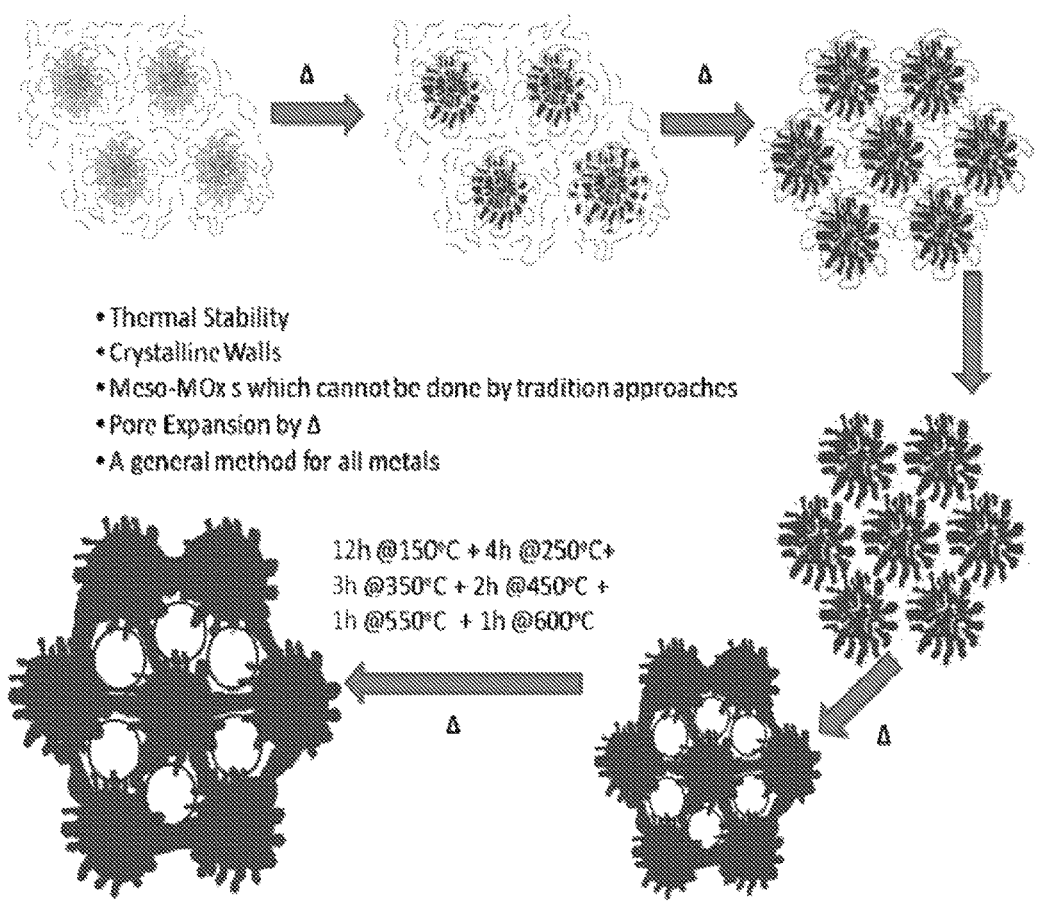
FIG. 46 depicts a proposed mechanism for the formation of highly ordered mesoporous material in accordance with this disclosure.

FIG. 44 depicts the sol gel micelle process for preparing well ordered metal oxide mesoporous materials with monomodal uniform pore sizes in accordance with this disclosure. FIG. 45 depicts a proposed mechanism for the formation of highly ordered mesoporous $Mn_2O_3$ in accordance with this disclosure. FIG. 46 depicts a proposed mechanism for the formation of highly ordered mesoporous metal oxide in accordance with this disclosure.

Synthesis of Methyl Levulinate from Carbohydrates and Biomass Resources

Titanium oxide nanoparticles were synthesized by co-precipitation of $TiOSO_4.xH_2SO_4$ (Alfa Aesar) and ammonia solution in hot water (85° C.). The pH was controlled at 3 during the precipitation. The resultant suspension was then refluxed at 100° C. overnight. Impurities and by products, such as $SO_4^{2-}$ and $NH_4+$ ions, were removed by filtration and washing with adequate amount of deionized water (D.I. water). The obtained powder was then dried overnight at 120° C.

All experiments were carried out in a 50 milliliter autoclave. In a typical reaction, 1 mmol of carbohydrate (0.18 grams of fructose/glucose or 0.09 grams of sucrose) or biomass resources (MW calculated as fructose), catalyst (0.01 to 0.2 grams), and solvent (methanol, 20 milliliters) were charged into the autoclave, followed by pressurizing with nitrogen (20 bar). The autoclave was heated to designated temperatures for various reaction times with stirring. After reaction was done, the autoclave was cooled in ice bath and the reaction mixture was filtered and analyzed.

Figure 47:
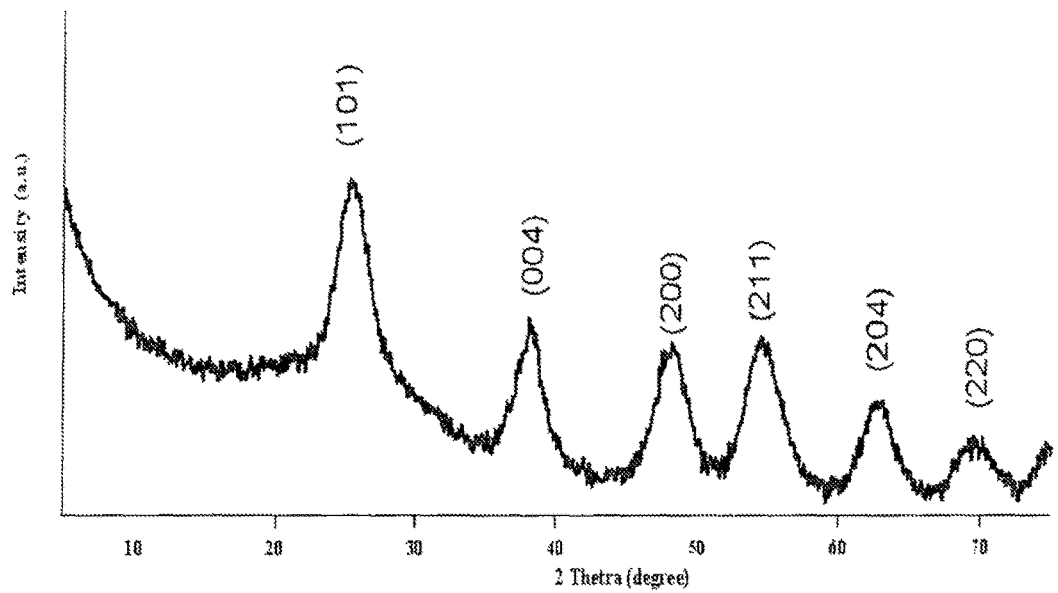
FIG. 47 shows the X-ray powder diffraction (XRD) pattern of synthesized sulfated $TiO_2$ nanoparticles.

FIG. 47 shows the X-ray powder diffraction (XRD) pattern of the synthesized sulfated $TiO_2$ nanoparticles. The results indicate a pure anatase phase titanium oxide crystal structure with broad peaks. The broad peaks are known to occur when the particle sizes are small. The average crystal size calculated from Schemer's equation is 4 nm, showing that the obtained powder has very small particle sizes, which can help for mass transfer during the biomass conversion process.

Figure 48:
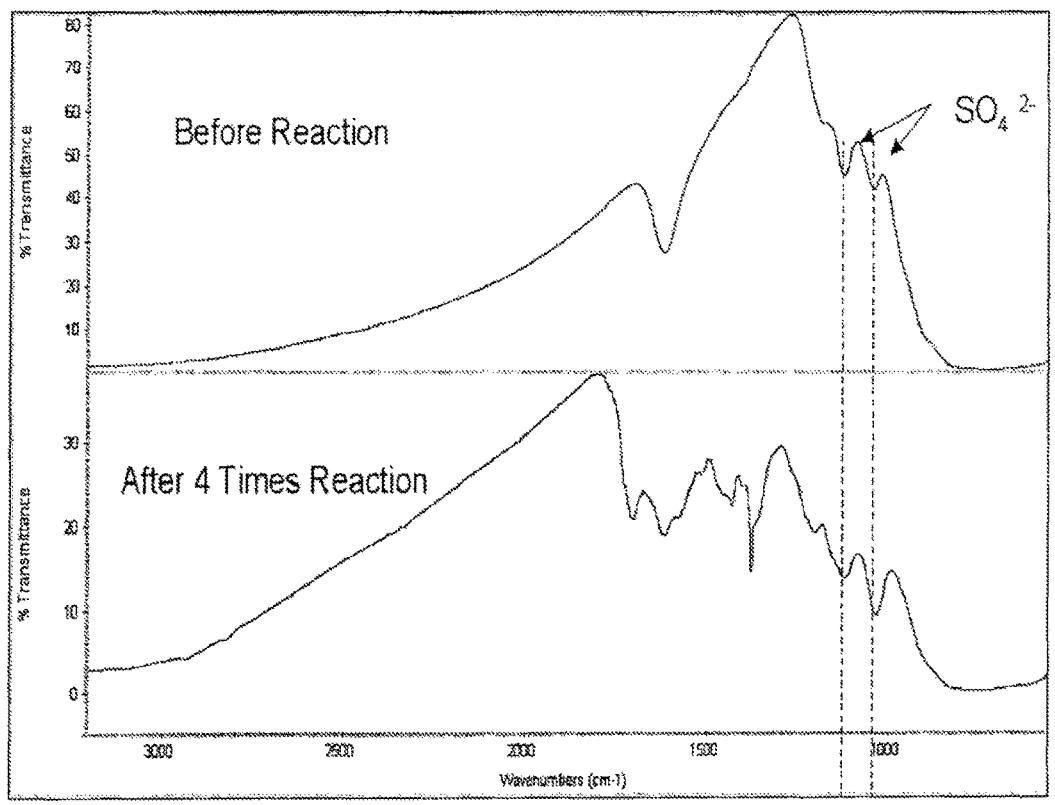
FIG. 48 shows Fourier transform infrared spectroscopy (FTIR) analysis indicating the surface functional groups ($SO_4^{2-}$) of synthesized $TiO_2$ nanoparticles before and after a biomass reaction.

Fourier transform infrared spectroscopy (FTIR) analysis indicated the surface functional groups ($SO_4^{2-}$) of the synthesized $TiO_2$ nanoparticles before and after the biomass reaction. After four recycling times, the functional groups still appear, showing the stability of the active sites of the nanoparticles. See FIG. 48.

Figure 49:
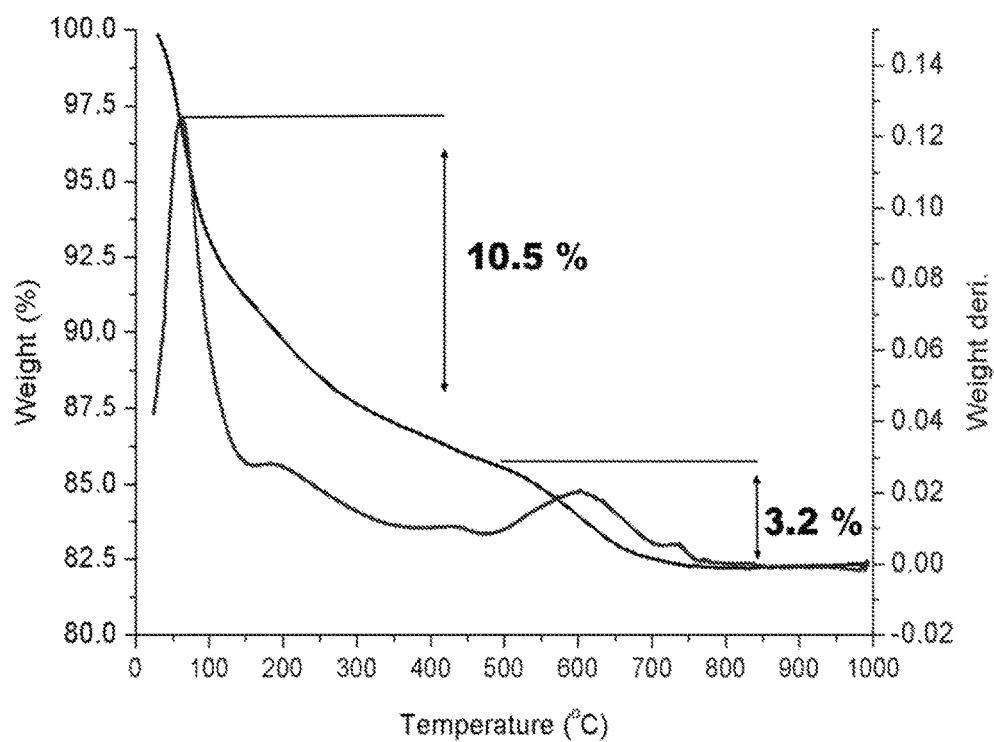
FIG. 49 shows thermogravimetric analysis (TGA) analysis of nanoparticles under 20 mL/min air flow.

Thermogravimetric analysis (TGA) analysis showed around 10% mass loss at around 550° C. The mass loss is due to surface adsorbed water and the hydroxyl groups attached to the surface of the materials. The second mass change can be assigned to the loss of active $SO_4^{2-}$ groups on the surface as confirmed in FTIR analyses. See FIG. 49.

Figure 50A:
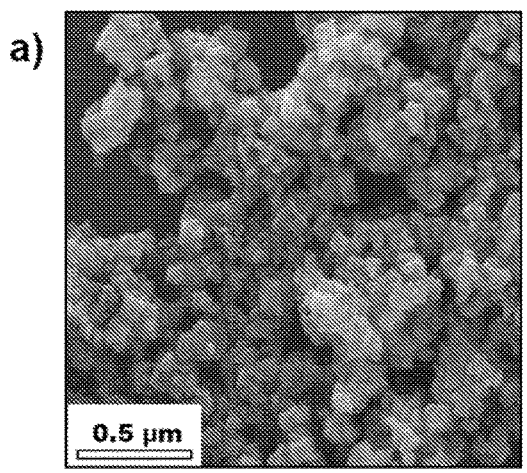
FIG. 50 shows high resolution scanning electron microscopy (HRSEM) images of synthesized titanium oxide nanoparticles (a) before catalytic reaction; (b) after 6 times catalytic reaction.
Figure 50B:
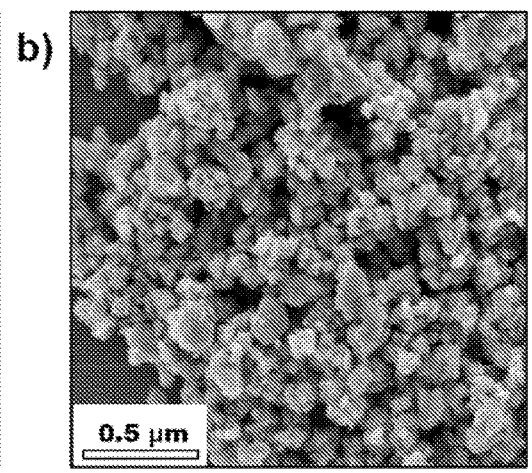

High resolution scanning electron microscopy (HRSEM) shows the images of the synthesized titanium oxide nanoparticles, indicating the very fine particles obtained. The image of the used catalysts (FIG. 50 (*b*)) indicates that the main characteristics of the catalyst were preserved during recycling. See FIGS. 50 (*a*) and (*b*).

Figure 51:
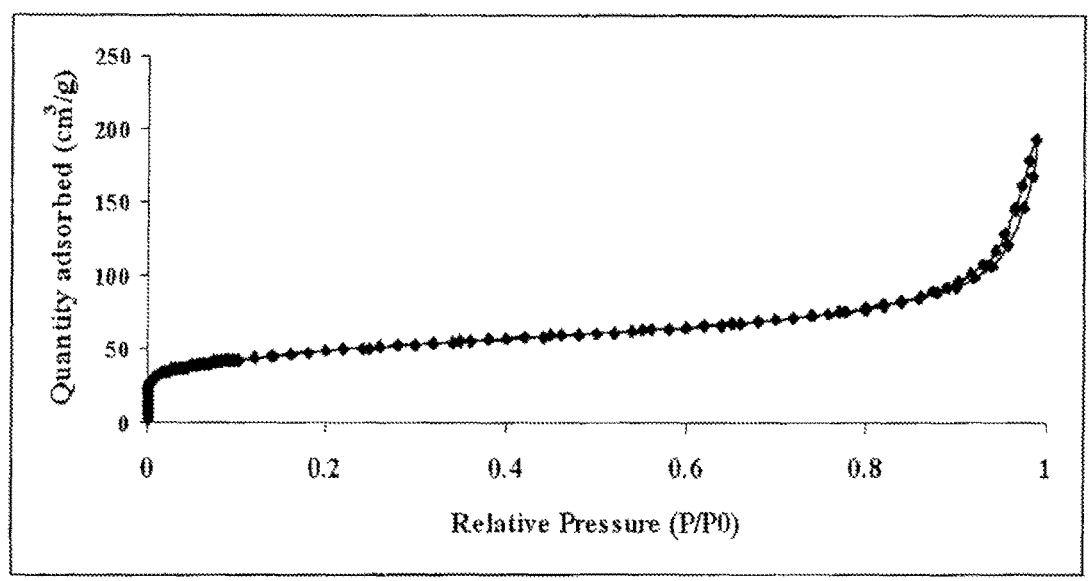
FIG. 51 shows $N_2$ physisorption for sulfated $TiO_2$ nanoparticles that shows a typical isotherm with hysteresis for that of porous materials.

Surface are (SA) and porosity were evaluated. $N_2$ physisorption for the obtained sulfated $TiO_2$ nanoparticles showed a typical isotherm with hysteresis for that of porous materials. See FIG. 51. The BET surface area of the material is 160 m$^2$/g, which is a relatively high surface area.

Figure 52:
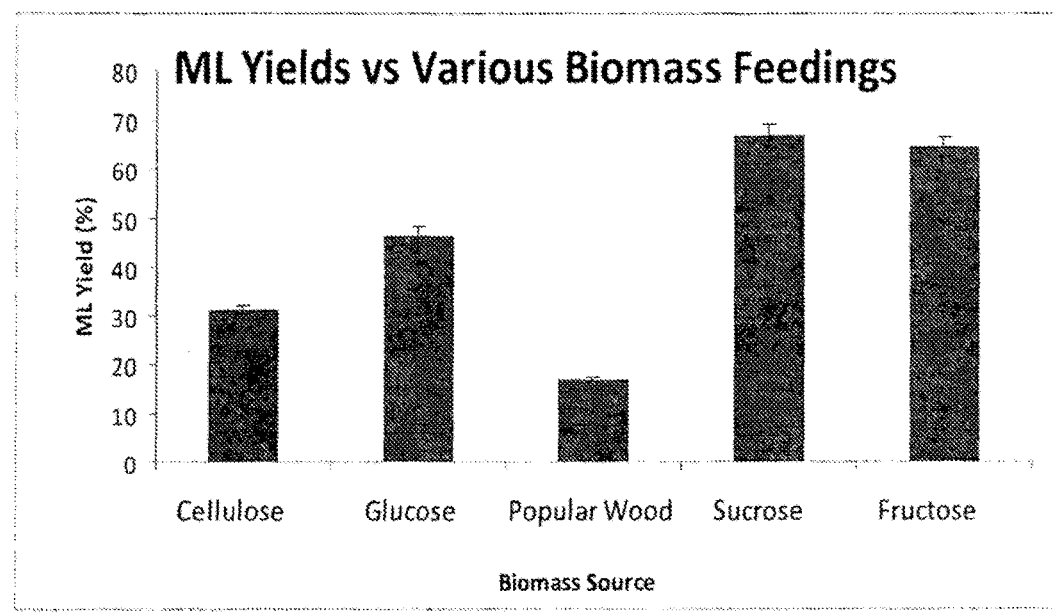
FIG. 52 shows methyl levulinate yields as a function of various biomass feedings at reaction temperature of 200° C.
Figure 53:
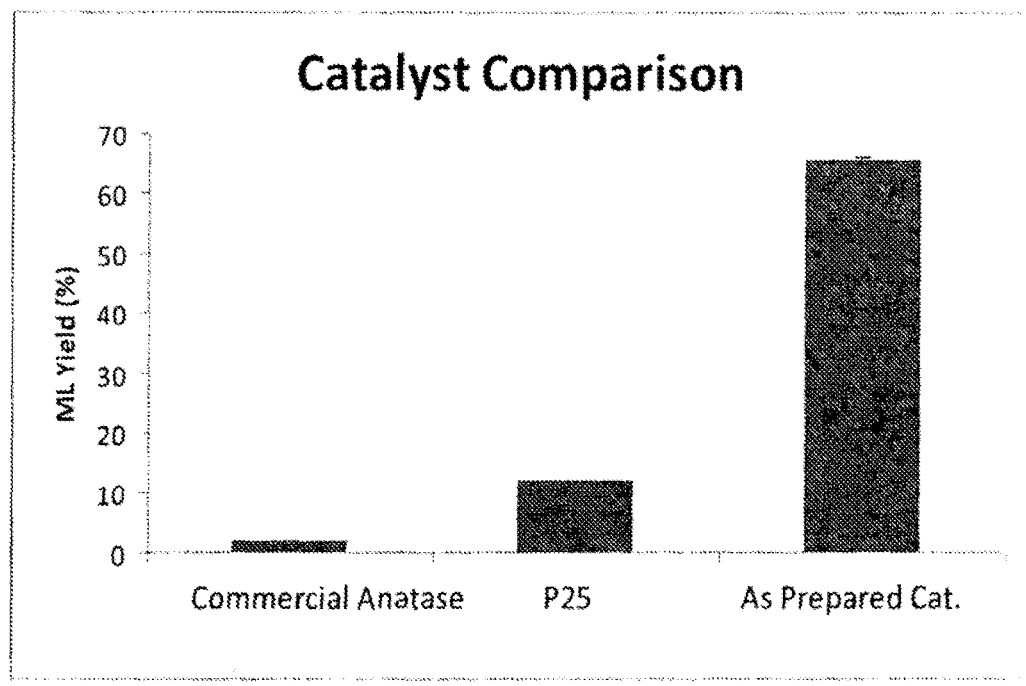
FIG. 53 shows a comparison of catalytic activity of nanoparticles with commercial anatase $TiO_2$ and P25 (titania commercially available from Degussa).
Figure 54:
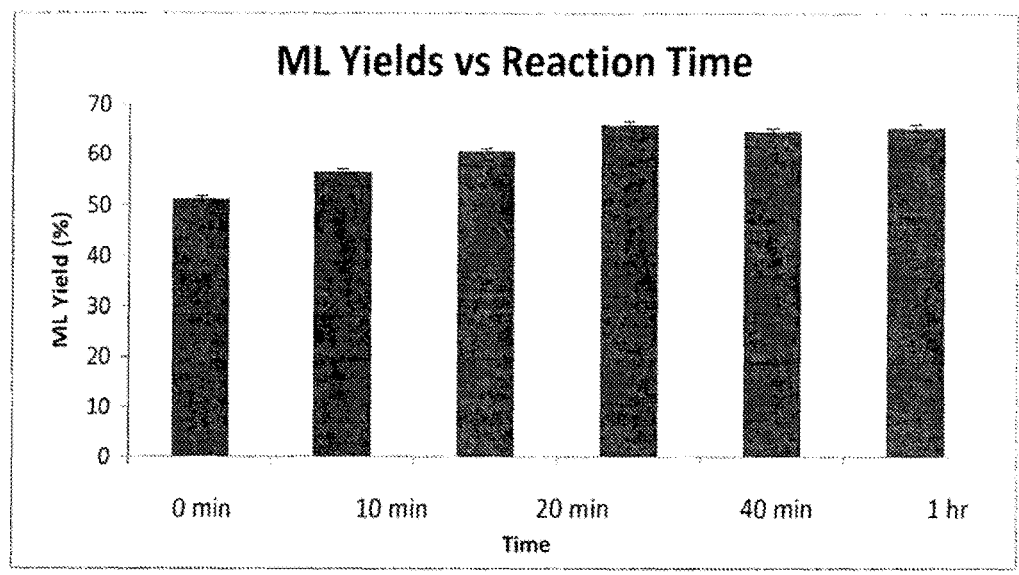
FIG. 54 shows the results of methyl levulinate yields as a function of reaction time after the reactant reached the designed reaction temperature.
Figure 55:
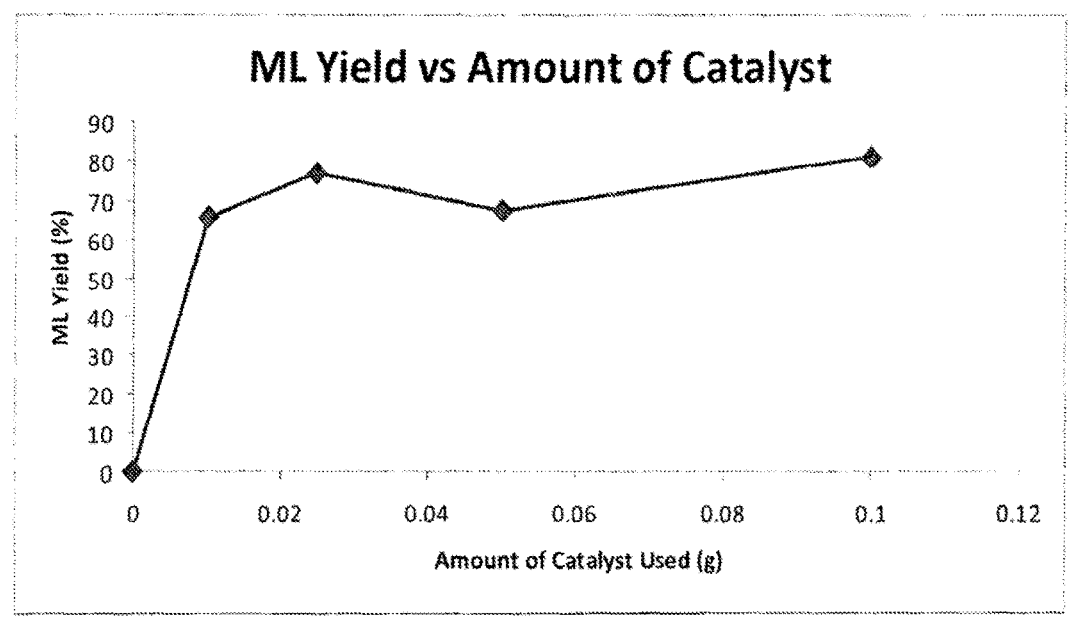
FIG. 55 shows the results of methyl levulinate yields as a function of various amounts of catalyst loading.
Figure 56:
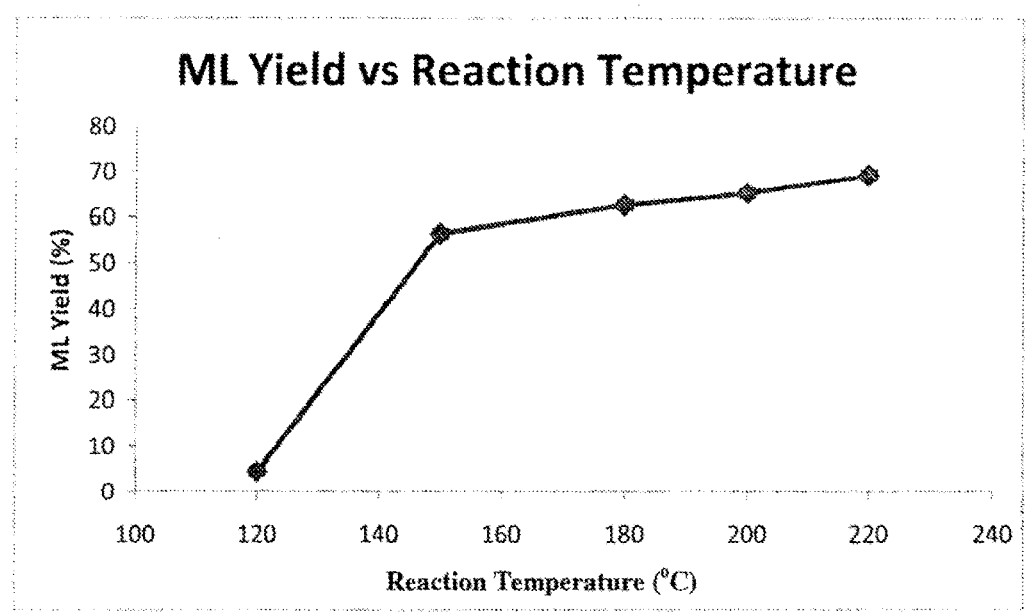
FIG. 56 shows the results of methyl levulinate yields as a function of reaction temperature.
Figure 57:
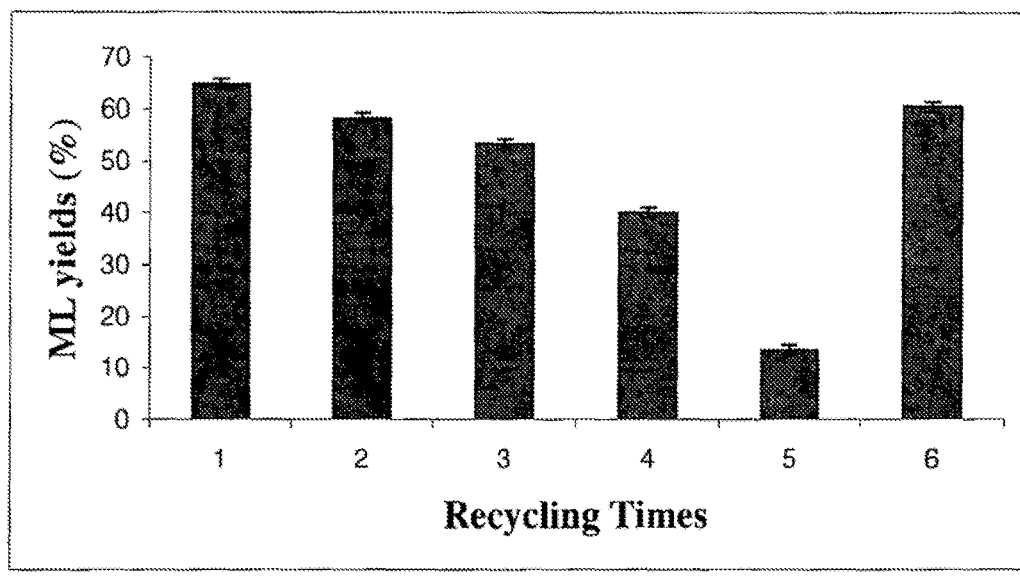
FIG. 57 shows the results of catalyst reusability tests. After 5 times reaction, the catalyst was collected and calcined in air at 400° C. for 5 hours. The results (recycling time=6) show that the catalyst can be regenerated.
Figure 58:
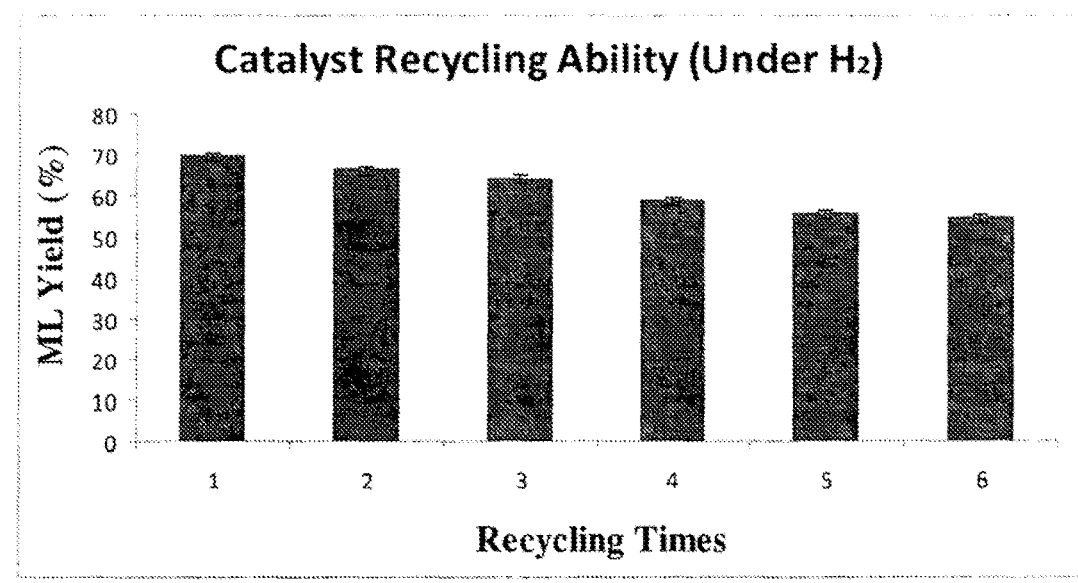
FIG. 58 shows the results of catalyst reusability tests under $H_2$ atmosphere. The results indicate that $H_2$ atmosphere helps stabilize the catalytic activity for long periods of time.

The catalytic activity of the synthesized $TiO_2$ nanoparticles was evaluated for various biomass feeds. FIG. 52 shows the methyl levulinate yields on the prepared catalysts as a function of biomass feeds. Higher than 70% of methyl levulinate yield was obtained when using fructose/sucrose as the feeds. The purity of the products in the liquid methanol solution was tested by NMR without further purification processes, resulting in higher than 95% pure methyl levulinate. When using popular wood, cellulose, and glucose as the feeds, yields were also obtained with the same purity. All the results show high catalytic activity and selectivity of the catalyst under mild reaction conditions. However, when using commercial anatase $TiO_2$ and P25 as the catalysts under the same reaction conditions, only a small amount (less than 10%) of methyl levulinate was produced, as shown in FIG. 53, and the main product was char residue since very few compounds were detected by GC/MS analysis in the liquid phase and no sugar remained based on HPLC analysis. FIGS. 54-58 give detailed data with respect to the catalytic yields of the synthesized $TiO_2$ nanoparticles. All the results indicate desired activity, selectivity, and stability of the nanoparticles for biomass conversions and open up possibilities of cost effective biomass refinery processes producing affordable biochemicals and biofuels.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A process for preparing a mesoporous material, said process comprising:
   preparing an acidic solution comprising nitric acid, one or more metal precursors, one or more surfactants, one or more interface modifiers, and optionally one or more lyotropic ion precursors or one or more organic and/or inorganic additives, wherein water is eliminated or minimized to prevent aggregation of metal oxide clusters;
   forming inverse micelles, said micellar solution including a dispersion of micelles in which at least a portion of said one or more metal precursors are solubilized in the micelles; and
   heating the micellar solution at a temperature and for a period of time sufficient to form the mesoporous material.

2. The process of claim 1, wherein the process is a sol-gel micelle based process.

3. The process of claim 1, wherein micellization and inter-micellar interaction are controlled by said one or more metal precursors, one or more surfactants, one or more interface modifiers, one or more lyotropic ion precursors, and optionally one or more organic and/or inorganic additives.

4. The process of claim 1, wherein the heating step comprises:
   heating the micellar solution at a temperature and for a period of time sufficient to form a dried powder; and
   heating the dried powder at a temperature and for a period of time sufficient to form the mesoporous material.

5. The process of claim 4, wherein the micellar solution is heated sequentially as follows:
   at a temperature from about 75° C. to about 150° C. for a period from about 1 to about 12 hours; and
   at a temperature from about 40° C. to about 80° C. for a period from about 1 to about 12 hours.

6. The process of claim 4, wherein the dried powder is heated sequentially as follows:
   at a temperature from about 100° C. to about 200° C. for a period from about 2 to about 20 hours;
   at a temperature from about 200° C. to about 300° C. for a period from about 1 to about 10 hours;
   at a temperature from about 300° C. to about 400° C. for a period from about 1 to about 8 hours;
   at a temperature from about 400° C. to about 500° C. for a period from about 0.5 to about 4 hours; and
   at a temperature from about 500° C. to about 600° C. for a period from about 0.1 to about 2 hours.

7. The process of claim 4, wherein the dried powder is heated sequentially as follows:
   at a temperature of about 150° C. for a period of about 12 hours;
   at a temperature of about 250° C. for a period of about 4 hours;
   at a temperature of about 350° C. for a period of about 3 hours;
   at a temperature of about 450° C. for a period of about 2 hours; and
   at a temperature of about 550° C. for a period of about 1 hour.

8. The process of claim 1, wherein the mesoporous material comprises an oxide, a sulfide, a selenide or a telluride of the following:
   a transition metal selected from the group consisting of Cr, Zr, Nb, Hf and Ta;
   a Lanthanide selected from the group consisting of Nd, Sm, Ce and Gd;
   a post-transition metal comprising Sn; or
   a mixed metal or a solid acid selected from the group consisting of P Zr, W Zr, S Ti, Sn Zr and S Zr.

9. The process of claim 1, wherein the mesoporous material comprises at least one of:
   a transition metal oxide selected from the group consisting of $Cr_2O_3$, $ZrO_2$, $Nb_2O_5$, $HfO_2$ and $Ta_2O_5$;
   a post-transition metal oxide comprising $SnO_2$; or
   a Lanthanide oxide selected from the group consisting of $CeO_2$, $Nd_2O_3$, $Sm_2O_3$ and $Gd_2O_3$.

10. The process of claim 1, wherein the mesoporous material is selected from the group consisting of:
    a transition metal oxide, sulfide, selenide or telluride;
    a Lanthanide metal oxide, sulfide, selenide or telluride;
    a post-transition metal oxide, sulfide, selenide or telluride;
    a metalloid oxide, sulfide, selenide or telluride; and mixtures thereof.

11. The process of claim 10, wherein the transition metal oxide, sulfide, selenide or telluride comprises a Group 3-12 transition metal oxide, sulfide, selenide or telluride.

12. The process of claim 11, wherein the Group 3-12 transition metal oxide, sulfide, selenide or telluride is selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride.

13. The process of claim 10, wherein the transition metal oxide is selected from a Group 6-12 transition metal oxide, sulfide, selenide or telluride.

14. The process of claim 13, wherein the Group 6-12 transition metal oxide, sulfide, selenide or telluride is selected from the group consisting of a Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride.

15. The process of claim 10, wherein
    the Lanthanide metal oxide, sulfide, selenide or telluride is selected from the group consisting of a La, Ce, Pr, Nd, Pm, Sm, Eu, Gd, Tb, Dy, Ho, Er, Tm, Yb and Lu oxide, sulfide, selenide or telluride;
    the post-transition metal oxide, sulfide, selenide or telluride is selected from the group consisting of an Al, Ga, In, Tl, Sn, Pb and Bi oxide, sulfide, selenide or telluride; and
    the metalloid oxide, sulfide, selenide or telluride is selected from the group consisting of a B, Si, Ge, As, Sb, Te, Po and At oxide, sulfide, selenide or telluride.

16. The process of claim 1, wherein
the one or more metal precursors are selected from the group consisting of a metal halide, a metal phosphate, a metal acetate, a metal nitrate, a metal alkoxide, and a $M_xO_y$ oxide that is capable of dissolving in $HNO_3$;
the one or more interface modifiers comprise an aliphatic, alicyclic or aromatic hydrocarbon of between about 1 and about 20 carbon atoms, or mixtures thereof; and
the one or more surfactants comprise an anionic, cationic, nonionic, or zwitterionic surfactant, or mixtures thereof.

17. A mesoporous material produced by a process of claim 1.

18. The mesoporous material of claim 17, wherein the process is a sol-gel micelle based process.

19. The mesoporous material of claim 17, wherein micellization and inter-micellar interaction in said process are controlled by said one or more metal precursors, one or more surfactants, one or more interface modifiers, one or more lyotropic ion precursors, and optionally one or more organic and/or inorganic additives.

20. The mesoporous material of claim 17, wherein the heating step comprises:
heating the micellar solution at a temperature and for a period of time sufficient to form a dried powder; and
heating the dried powder at a temperature and for a period of time sufficient to form the mesoporous material.

21. The mesoporous material of claim 17, wherein the micellar solution is heated sequentially as follows:
at a temperature from about 75° C. to about 150° C. for a period from about 1 to about 12 hours; and
at a temperature from about 40° C. to about 80° C. for a period from about 1 to about 12 hours.

22. The mesoporous material of claim 17, wherein the dried powder is heated sequentially as follows:
at a temperature from about 100° C. to about 200° C. for a period from about 2 to about 20 hours;
at a temperature from about 200° C. to about 300° C. for a period from about 1 to about 10 hours;
at a temperature from about 300° C. to about 400° C. for a period from about 1 to about 8 hours;
at a temperature from about 400° C. to about 500° C. for a period from about 0.5 to about 4 hours; and
at a temperature from about 500° C. to about 600° C. for a period from about 0.1 to about 2 hours.

23. The mesoporous material of claim 17, wherein the dried powder is heated sequentially as follows:
at a temperature of about 150° C. for a period of about 12 hours;
at a temperature of about 250° C. for a period of about 4 hours;
at a temperature of about 350° C. for a period of about 3 hours;
at a temperature of about 450° C. for a period of about 2 hours; and
at a temperature of about 550° C. for a period of about 1 hour.

24. The mesoporous material of claim 17, wherein the mesoporous material comprises an oxide, a sulfide, a selenide or a telluride of the following:
a transition metal selected from the group consisting of Cr, Zr, Nb, Hf and Ta;
a Lanthanide selected from the group consisting of Nd, Sm, Ce and Gd;
a post-transition metal comprising Sn; or
a mixed metal or a solid acid selected from the group consisting of P Zr, W Zr, S Ti, Sn Zr and S Zr.

25. The mesoporous material of claim 17, wherein the mesoporous material comprises at least one of:
a transition metal oxide selected from the group consisting of $Cr_2O_3$, $ZrO_2$, $Nb_2O_5$, $HfO_2$ and $Ta_2O_5$;
a post-transition metal oxide comprising $Sn)_2$; or
a Lanthanide oxide selected from the group consisting of $CeO_2$, $Nd_2O_3$, $Sm_2O_3$ and $Gd_2O_3$.

26. The mesoporous material of claim 17, wherein the mesoporous material is selected from the group consisting of
a transition metal oxide, sulfide, selenide or telluride;
a Lanthanide metal oxide, sulfide, selenide or telluride;
a posttransition metal oxide, sulfide, selenide or telluride;
a metalloid oxide, sulfide, selenide or telluride; and mixtures thereof.

27. The mesoporous material of claim 26, wherein the transition metal oxide, sulfide, selenide or telluride comprises a Group 3-12 transition metal oxide, sulfide, selenide or telluride.

28. The mesoporous material of claim 27, wherein the Group 3-12 transition metal oxide, sulfide, selenide or telluride is selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide, sulfide, selenide or telluride.

29. The mesoporous material of claim 26, wherein the transition metal oxide is selected from a Group 6-12 transition metal oxide, sulfide, selenide and telluride.

30. The mesoporous material of claim 29, wherein the Group 6-12 transition metal oxide, sulfide, selenide or telluride is selected from the group consisting of a Cr, Mo, W, Mn, Tc, Re, Fe, Ru, Os, Co, Rh, Ir, Ni, Pd, Pt, Cu, Ag, Au, Zn, Cd, and Hg oxide, sulfide, selenide or telluride.

31. The mesoporous material of claim 26, wherein
the Lanthanide metal oxide, sulfide, selenide or telluride is selected from the group consisting of a La, Ce, Pr, Nd, Pm, Sm, Eu, Gd, Tb, Dy, Ho, Er, Tm, Yb and Lu oxide, sulfide, selenide or telluride;
the post-transition metal oxide, sulfide, selenide or telluride is selected from the group consisting of an Al, Ga, In, Tl, Sn, Pb and Bi oxide, sulfide, selenide or telluride; and
the metalloid oxide, sulfide, selenide or telluride is selected from the group consisting of a B, Si, Ge, As, Sb, Te, Po and At oxide, sulfide, selenide or telluride.

* * * * *